United States Patent
Qiao et al.

(10) Patent No.: US 12,081,966 B2
(45) Date of Patent: *Sep. 3, 2024

(54) CAPABILITY OF POSITIONING SERVICE LEVEL FOR WIRELESS DEVICE

(71) Applicant: Ofinno, LLC, Reston, VA (US)

(72) Inventors: Weihua Qiao, Herndon, VA (US); Esmael Hejazi Dinan, McLean, VA (US); Kyungmin Park, Vienna, VA (US); Jinsook Ryu, Oakton, VA (US); Peyman Talebi Fard, Vienna, VA (US); Taehun Kim, Fairfax, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,530

(22) Filed: May 15, 2023

(65) Prior Publication Data
US 2023/0283990 A1   Sep. 7, 2023

Related U.S. Application Data

(63) Continuation of application No. 17/323,546, filed on May 18, 2021, now Pat. No. 11,653,178.
(Continued)

(51) Int. Cl.
*H04W 4/029* (2018.01)
*H04W 4/02* (2018.01)
(Continued)

(52) U.S. Cl.
CPC .......... *H04W 4/029* (2018.02); *H04W 4/023* (2013.01); *H04W 4/026* (2013.01); *H04W 4/027* (2013.01); *H04W 48/16* (2013.01); *H04W 60/00* (2013.01)

(58) Field of Classification Search
CPC ..... H04W 4/029; H04W 4/023; H04W 4/026; H04W 4/027; H04W 48/16; H04W 60/00
See application file for complete search history.

(56) References Cited

U.S. PATENT DOCUMENTS

2020/0037283 A1   1/2020 Edge et al.
2020/0092776 A1   3/2020 Edge

FOREIGN PATENT DOCUMENTS

WO   2020/036848 A1   2/2020

OTHER PUBLICATIONS

3GPP TS 22.261 V17.2.0 (Mar. 2020); 3rd Generation Partnership Project; Technical Specification Group Services and System Aspects; Service requirements for the 5G system; Stage 1; (Release 17).
(Continued)

*Primary Examiner* — Umair Ahsan
(74) *Attorney, Agent, or Firm* — Peter Flanagan; Kavon Nasabzadeh; Philip R. Smith

(57) ABSTRACT

A gateway mobile location center (GMLC) may include processor(s) and memory storing instructions. The instructions, when executed by the processor(s), may cause the GMLC to perform operations that include receiving, from a location services (LCS) client, a request for a capability of a positioning service level for a wireless device. The operations may also include receiving, from a network function, a second message indicating at least one of: a positioning capability of the wireless device; and a positioning capability of at least one base station. The operations may further include determining the capability of the positioning service level for the wireless device, based on the second message. The operations may additionally include sending, by the GMLC to the LCS client, a response that includes the capability of the positioning service level. The capability of
(Continued)

the positioning service level may include a parameter indicating an absolute or a relative positioning.

20 Claims, 31 Drawing Sheets

Related U.S. Application Data

(60) Provisional application No. 63/026,420, filed on May 18, 2020.

(51) Int. Cl.
*H04W 48/16* (2009.01)
*H04W 60/00* (2009.01)

(56) References Cited

OTHER PUBLICATIONS

3GPP TR 22.872 V16.1.0 (Sep. 2018);3rd Generation Partnership Project; Technical Specification Group Services and System Aspects; Study on positioning use cases; Stage 1; (Release 16).
3GPP TS 23.271 V15.2.0 (Dec. 2019); 3rd Generation Partnership Project; Technical Specification Group Services and System Aspects; Functional stage 2 description of Location Services (LCS); (Release 15).
3GPP TS 23.273 V16.3.0 (Mar. 2020); 3rd Generation Partnership Project; Technical Specification Group Services and System Aspects; 5G System (5GS) Location Services (LCS); Stage 2; (Release 16).
3GPP TR 23.731 V16.0.0 (Dec. 2018); 3rd Generation Partnership Project; Technical Specification Group Services and System Aspects; Study on Enhancement to the 5GC LoCation Services; (Release 16).
3GPP TS 24.501 V16.4.1 (Mar. 2020); 3rd Generation Partnership Project; Technical Specification Group Core Network and Terminals; Non-Access-Stratum (NAS) protocol for 5G System (5GS); Stage 3; (Release 16).
3GPP TS 36.305 V16.0.0 (Mar. 2020); 3rd Generation Partnership Project; Technical Specification Group Radio Access Network; Evolved Universal Terrestrial Radio Access Network (E-UTRAN); Stage 2 functional specification of User Equipment (UE) positioning in E-UTRAN; (Release 16).
3GPP TS 37.355 V16.0.0 (Mar. 2020); 3rd Generation Partnership Project; Technical Specification Group Radio Access Network; LTE Positioning Protocol (LPP); (Release 16).
3GPP TS 38.300 V16.0.0 (Dec. 2019); 3rd Generation Partnership Project; Technical Specification Group Radio Access Network; NR; NR and NG-RAN Overall Description; Stage 2; (Release 16).
3GPP TS 38.305 V15.5.0 (Dec. 2019); 3rd Generation Partnership Project; Technical Specification Group Radio Access Network; NG Radio Access Network (NG-RAN); Stage 2 functional specification of User Equipment (UE) positioning in NG-RAN; (Release 15).
3GPP TS 38.331 V15.7.0 (Sep. 2019); 3rd Generation Partnership Project; Technical Specification Group Radio Access Network; NR; Radio Resource Control (RRC) protocol specification; (Release 15).
3GPP TS 38.413 V16.0.0 (Dec. 2019); 3rd Generation Partnership Project; Technical Specification Group Radio Access Network; NG-RAN; NG Application Protocol (NGAP); (Release 16).
3GPP TS 38.423 V16.0.0 (Dec. 2019); 3rd Generation Partnership Project; Technical Specification Group Radio Access Network; NG-RAN; Xn application protocol (XnAP); (Release 16).
3GPP TS 38.455 V15.2.1 (Jan. 2019); 3rd Generation Partnership Project; Technical Specification Group Radio Access Network; NG-RAN; NR Positioning Protocol A (NRPPa); (Release 15).
3GPP TR 38.856 V16.0.0 (Dec. 2019); 3rd Generation Partnership Project; Technical Specification Group Radio Access Network; Study on local NR positioning in NG-RAN; (Release 16).
R2-1903949; 3GPP TSG RAN WG2 Meeting #105bis; Xian, China, Apr. 8-12, 2019; Agenda item: 11.8.2.1; Source: Intel Corporation; Title: Supported positioning methods for NR dependent positioning; Document for: Discussion and decision.
R2-2003822; 3GPP TSG-RAN WG2 109-bis; Electronic Meeting, Apr. 20-30, 2020; Agenda Item: 6.8.2.3 Source: Ericsson, Deutsche Telekom; Title: Measurement Reporting for UE based positioning; Document for: Discussion, Decision.
R3-200063; 3GPP TSG-RAN WG3 #107-e; Online, Feb. 24-Mar. 6, 2020; Change Request; 38.455 CR 0008 rev 9 Current version: 15.2.1; Title: Introduction of NR Positioning in NRPPa.
S1-182585; 3GPP TSG-SA WG1 Meeting #83; West Palm Beach, Florida, USA, Aug. 20-24, 2018; Change Request; 22.261 CR 0269; REV 2; Current Version 16.4.0; Title: KPIs for horizontal and vertical positioning service levels in clause 7.3.2.
S2-1907447; SA WG2 Meeting #134; Jun. 24-28, 2019, Sapporo, Japan; Source: Qualcomm Incorporated; Title: DL-only UE-based positioning; Document for: Approval; Agenda Item: 6.13.2; Work Item / Release: 5G_eLCS/Rel-16.
S2-2003111; SA WG2 Meeting #S2-138E; Apr. 20-24, 2020, Electronic meeting; Change Request; 23.273 CR 0124; REV; Current Version 16.3.0; Title: Resolve EN for NG-RAN Location Service Exposure.
SP-190452; 3GPP TSG SA Meeting #84; Jun. 5-7, 2019, Newport Beach, USA; S2-1906723; SA WG2 Meeting #133; May 13-17, 2019, Reno, USA; Source: SA WG2; Title: New SID: Study on Enhancement to the 5GC Location Services—Phase 2; Document for: Approval; Agenda Item: 6.2.
User Plane Location Protocol; Candidate Version 3.0—Sep. 20, 2011; Open Mobile Alliance; OMA-TS-ULP-V3_0-20110920-C.
S2-2001812; 3GPP SA WG2 Meeting #137E; Feb. 24-27, 2020, Elbonia (E-meeting); Source: CATT; Title: New WID: Enhancement to the 5GC Location Services—Phase 2; Document for: Approval; Agenda Item: 9.1.
3GPP TS 36.355 V11.1.0 (Dec. 2012); Technical Specification; 3rd Generation Partnership Project; Technical Specification Group Radio Access Network; Evolved Universal Terrestrial Radio Access (E-UTRA); LTE Positioning Protocol (LPP); (Release 11).

RM State Transition in UE

RM State Transition in AMF

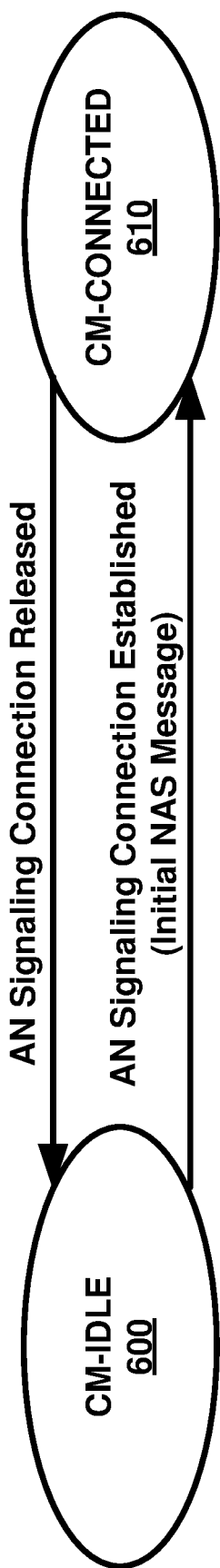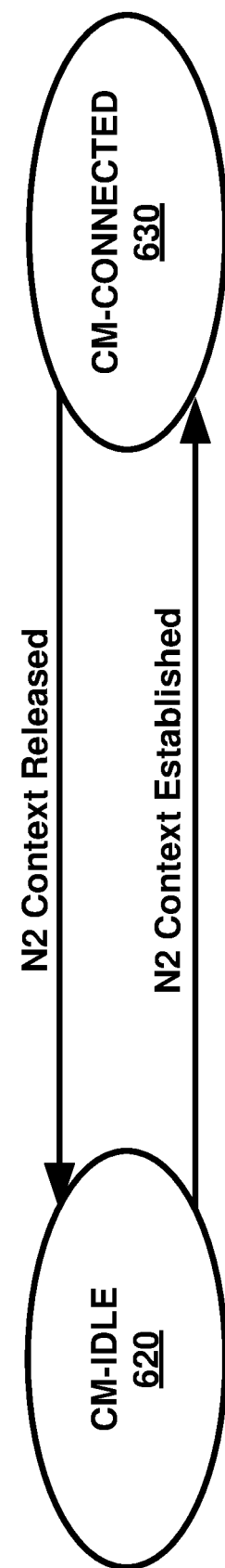
FIG. 6A CM State Transition in UE
FIG. 6B CM State Transition in AMF

| Positioning service level | Absolute(A) or Relative(R) positioning | Accuracy (95% confidence) | | Positioning service availability | Positioning service latency | Coverage, environment of use and UE velocity | | |
|---|---|---|---|---|---|---|---|---|
| | | Horizontal Accuracy | Vertical Accuracy | | | 5G positioning service area | 5G enhanced positioning service area | |
| | | | | | | | Outdoor and tunnels | Indoor |
| 1 | A | 10 m | 3 m | 95% | 1 s | Indoor - up to 30 km/h<br>Outdoor (rural and urban) up to 250 km/h | NA | Indoor - up to 30 km/h |
| 2 | A | 3 m | 3 m | 99% | 1 s | Outdoor (rural and urban) up to 500 km/h for trains and up to 250 km/h for other vehicles | Outdoor (dense urban) up to 60 km/h<br>Along roads up to 250 km/h and along railways up to 500 km/h | Indoor - up to 30 km/h |
| 3 | A | 1 m | 2 m | 99% | 1 s | Outdoor (rural and urban) up to 500 km/h for trains and up to 250 km/h for other vehicles | Outdoor (dense urban) up to 60 km/h<br>Along roads up to 250 km/h and along railways up to 500 km/h | Indoor - up to 30 km/h |
| 4 | A | 1 m | 2 m | 99.9% | 15 ms | NA | NA | Indoor - up to 30 km/h |
| 5 | A | 0.3 m | 2 m | 99% | 1 s | Outdoor (rural) up to 250 km/h | Outdoor (dense urban) up to 60 km/h<br>Along roads and along railways up to 250 km/h | Indoor - up to 30 km/h |
| 6 | A | 0.3 m | 2 m | 99.9% | 10 ms | NA | Outdoor (dense urban) up to 60 km/h | Indoor - up to 30 km/h |
| 7 | R | 0.2 m | 0.2 m | 99% | 1 s | Indoor and outdoor (rural, urban, dense urban) up to 30 km/h<br>Relative positioning is between two UEs within 10 m of each other or between one UE and 5G positioning nodes within 10 m of each other | | |

FIG. 21

```
ProvideCapabilities ::= SEQUENCE {
    criticalExtensions      CHOICE {
        c1                  CHOICE {
            provideCapabilities-r9      ProvideCapabilities-r9-IEs,
            ue-Velocity         UE-Velocity,
            ue-ServiceArea      ENUMERATED{Indoor, Outdoor}},
        criticalExtensionsFutureSEQUENCE {}
    }
}

ProvideCapabilities-r9-IEs ::= SEQUENCE {
    commonIEsProvideCapabilities    CommonIEsProvideCapabilities    OPTIONAL,
    a-gnss-ProvideCapabilities      A-GNSS-ProvideCapabilities      OPTIONAL,
    otdoa-ProvideCapabilities       OTDOA-ProvideCapabilities       OPTIONAL,
    ecid-ProvideCapabilities        ECID-ProvideCapabilities        OPTIONAL,
    epdu-ProvideCapabilities        EPDU-Sequence                   OPTIONAL,
    ...,
    [[  sensor-ProvideCapabilities-r13 Sensor-ProvideCapabilities-r13  OPTIONAL,
        tbs-ProvideCapabilities-r13    TBS-ProvideCapabilities-r13     OPTIONAL,
        wlan-ProvideCapabilities-r13   WLAN-ProvideCapabilities-r13    OPTIONAL,
        bt-ProvideCapabilities-r13     BT-ProvideCapabilities-r13      OPTIONAL
    ]],
    [[  nr-ECID-ProvideCapabilities-r16    NR-ECID-ProvideCapabilities-r16 OPTIONAL,
        nr-Multi-RTT-ProvideCapabilities-r16
                                NR-Multi-RTT-ProvideCapabilities-r16 OPTIONAL,
        nr-DL-AoD-ProvideCapabilities-r16
                                NR-DL-AoD-ProvideCapabilities-r16    OPTIONAL,
        nr-DL-TDOA-ProvideCapabilities-r16
                                NR-DL-TDOA-ProvideCapabilities-r16   OPTIONAL,
        nr-UL-ProvideCapabilities-r16   NR-UL-ProvideCapabilities-r16 OPTIONAL
    ]]
    no-Support-Capability   NO-Support-Capability   OPTIONAL
}

UE-Velocity ::= SEQUENCE {
    HorizontalVelocity  INTEGER(0..2047),
    VerticalVelocity    INTEGER(0..2047)
}
```

FIG. 23

REGISTRATION REQUEST message content

| Information Element | Type/Reference | Presence |
|---|---|---|
| Extended protocol discriminator | Extended Protocol discriminator | M |
| Security header type | Security header type | M |
| Spare half octet | Spare half octet | M |
| Registration request message identity | Message type | M |
| 5GS registration type | 5GS registration type | M |
| 5GS mobile identity | 5GS mobile identity | M |
| 5GMM capability | 5GMM capability | O |
| UE security capability | UE security capability | O |
| Requested NSSAI | NSSAI | O |
| Last visited registered TAI | 5GS tracking area identity | O |
| S1 UE network capability | S1 UE network capability | O |
| PDU session status | PDU session status | O |
| MICO indication | MICO indication | O |
| UE status | UE status | O |
| Requested DRX parameters | 5GS DRX parameters | O |
| Network slicing indication | Network slicing indication | O |
| NAS message container | NAS message container | O |
| UE radio capability ID | UE radio capability ID | O |
| Requested mapped NSSAI | Mapped NSSAI | O |
| N5GC indication | N5GC indication | O |
| UE positioning capability | UE positioning capability | O |
| UE service area | UE service area | O |
| UE velocity | UE velocity | O |

FIG. 24

Positioning Capability Report message content

| IE/Group Name | Presence | IE type and reference |
|---|---|---|
| Message Type | M | Positioning Capability Report |
| NRPPa Transaction ID | M | INTEGER (0..32767) |
| (R)AN positioning capability | O | (R)AN positioning capability |
| UE positioning capability | O | UE positioning capability |
| UE service area | O | UE service area |
| UE velocity | O | UE velocity |

FIG. 25

CAPABILITY OF POSITIONING SERVICE LEVEL FOR WIRELESS DEVICE

CROSS-REFERENCE TO RELATED APPLICATIONS

This application is a continuation of U.S. application Ser. No. 17/323,546, filed May 18, 2021, which claims the benefit of Provisional Application No. 63/026,420, filed May 18, 2020, all of which are hereby incorporated by reference in their entireties.

BRIEF DESCRIPTION OF THE SEVERAL VIEWS OF THE DRAWINGS

Examples of several of the various embodiments of the present invention are described herein with reference to the drawings.

FIG. 6A and FIG. 6B depict two connection management state models in UE 100 and AMF 155 as per an aspect of embodiments of the present disclosure.

FIG. 21 is an example diagram depicting Performance requirements for different positioning service levels as per an aspect of an embodiment of the present disclosure.

FIG. 23 is an example diagram depicting a ProvideCapabilities message body as per an aspect of an embodiment of the present disclosure.

FIG. 24 is an example diagram depicting a REGISTRATION REQUEST message body as per an aspect of an embodiment of the present disclosure.

FIG. 25 is an example diagram depicting a Positioning Capability Report message body as per an aspect of an embodiment of the present disclosure.

DETAILED DESCRIPTION

Example embodiments of the present invention enable implementation of enhanced features and functionalities in 5G systems. More particularly, the embodiments of the technology positioning service level and service area control (e.g. for 5G or future communication system). Throughout the present disclosure, UE, wireless device, vehicle terminal, and mobile device are used interchangeably. Throughout the present disclosure, base station, (Radio) Access Network ((R)AN), Next Generation Radio Access Network (NG-RAN), New radio Node B (gNB), Next Generation eNodeB (ng-eNBs) are used interchangeably. Throughout the present disclosure, base station, Radio Access Network (RAN), eNodeB are used interchangeably.

Figure 4:
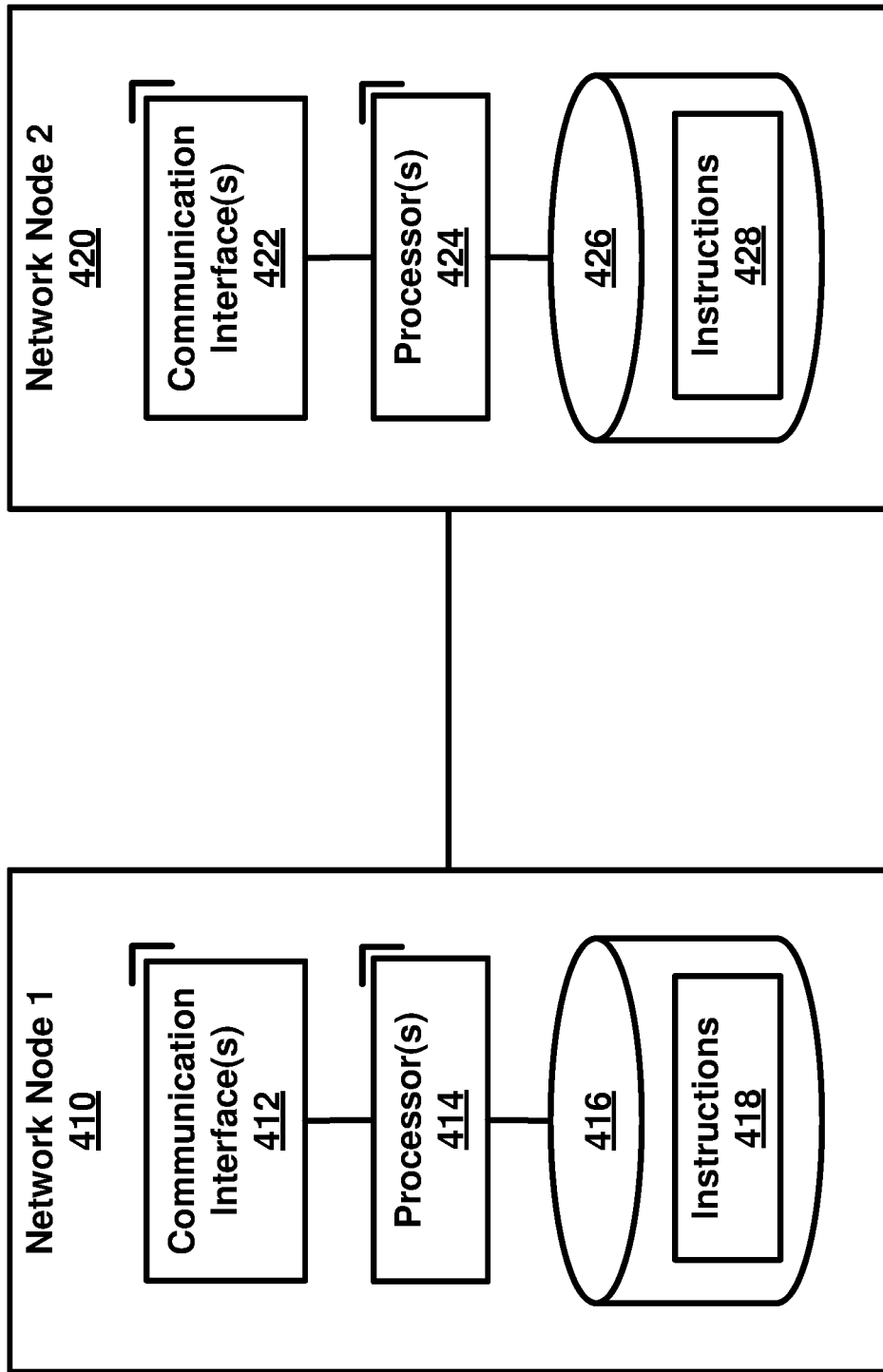
FIG. 4 is a system diagram of an example wireless device as per an aspect of an embodiment of the present disclosure.

Throughout the present disclosure, AMF, LMC, LMF, UDM, OAM, GMLC, LCS client, NEF and AF are example network functions which may be implemented either as a network element on a (dedicated) hardware, and/or a network node as depicted FIG. 4, or as a software instance running on a (dedicated) hardware and/or shared hardware, or as a virtualized function instantiated on an appropriate platform.

Figure 1:
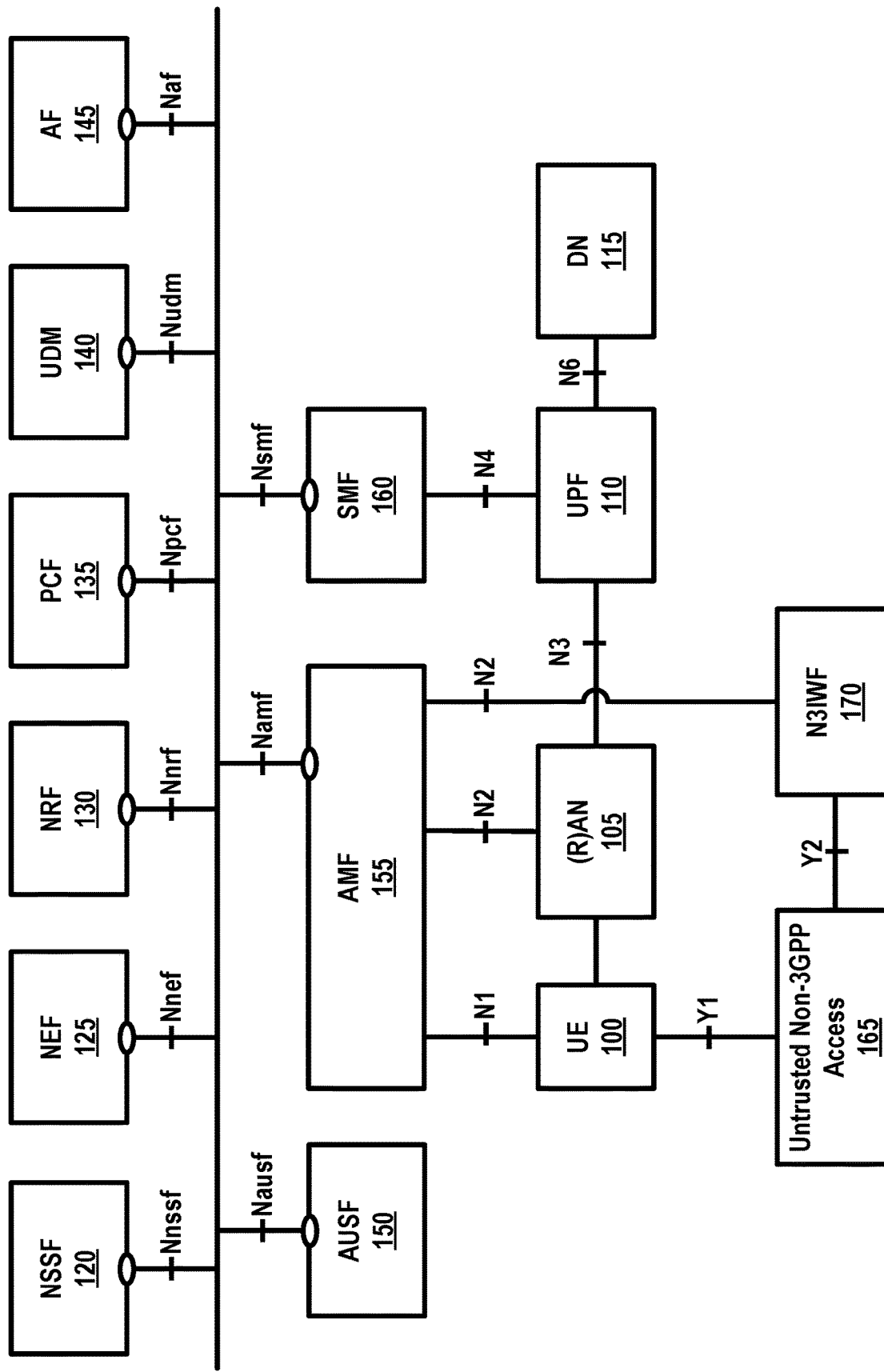
FIG. 1 is a diagram of an example 5G system architecture as per an aspect of an embodiment of the present disclosure.
Figure 2:
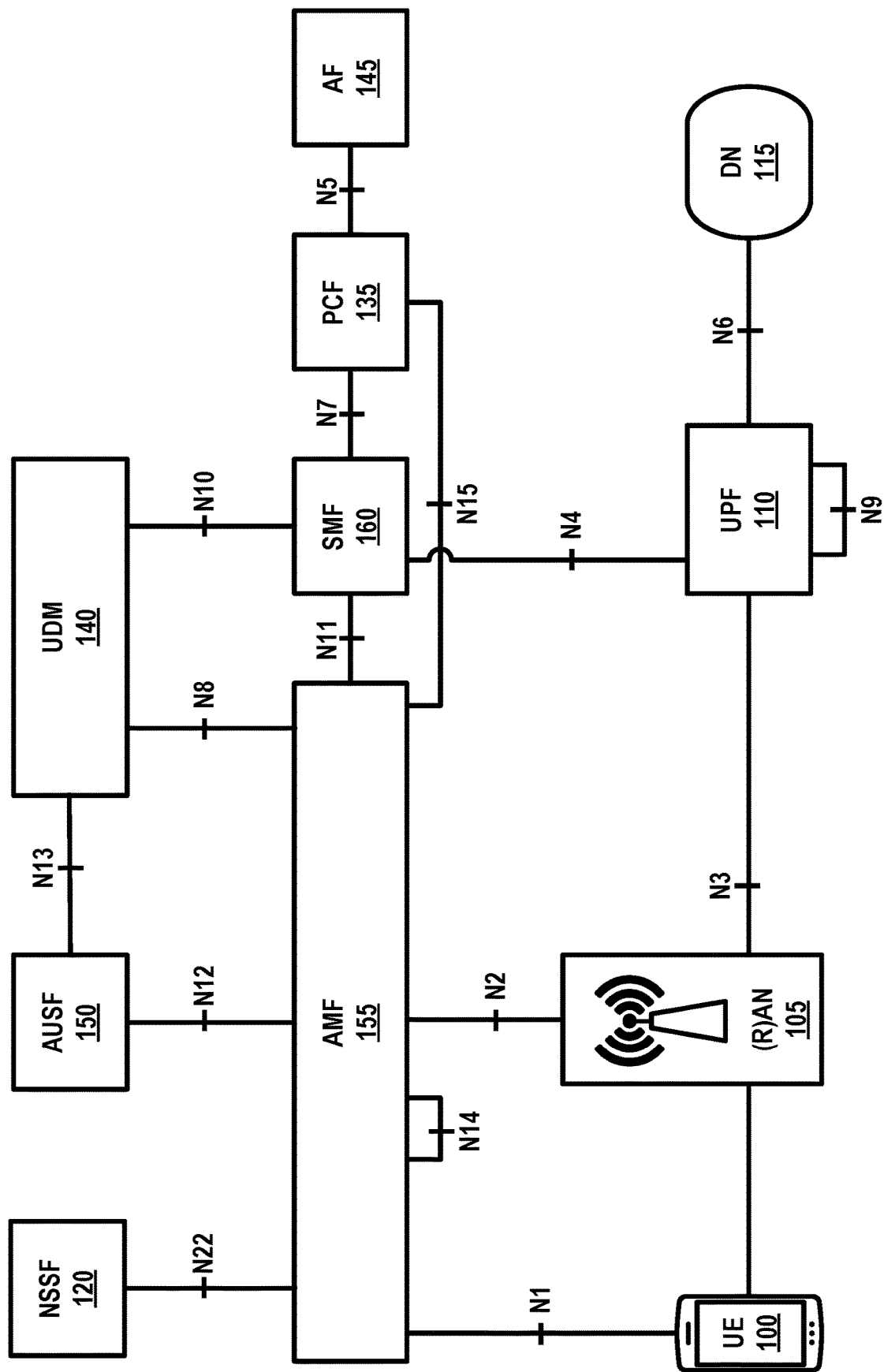
FIG. 2 is a diagram of an example 5G System architecture as per an aspect of an embodiment of the present disclosure.

The following acronyms are used throughout the present disclosure:
5G 5th generation mobile networks
5GC 5G Core Network
5GS 5G System
5G-AN 5G Access Network
5QI 5G QoS Indicator ACK Acknowledgement
AF Application Function
AMBR Aggregate Maximum Bit Rate
AMF Access and Mobility Management Function
AN Access Network
ANDSP Access Network Discovery & Selection Policy
APN Access Point Name
ARP Allocation and Retention Priority
BD Billing Domain
BPS Barometric Pressure Sensor
CCNF Common Control Network Functions
CDR Charging Data Record
CHF Charging Function
CIoT Cellular IoT
CN Core Network
CP Control Plane
C-V2X Cellular Vehicle-To-Everything
DAB Digital Audio Broadcasting
DDN Downlink Data Notification
DDoS Distributed Denial of Service
DL Downlink
DN Data Network
DN-AAA Data Network Authentication Authorization and Accounting
DNN Data Network Name
DTMB Digital Terrestrial Multimedia Broadcast
ECGI E-UTRAN Cell Global Identifier
ECID Enhanced Cell Identity
E-CSCF Emergency Call Session Control Function
eNodeB evolved Node B
EPS Evolved Packet System
E-UTRAN Evolved Universal Terrestrial Radio Access Network
FDD Frequency Division Duplex
FQDN Fully Qualified Domain Name
F-TEID Fully Qualified TEID
GAD Geographical Area Description
GMLC Gateway Mobile Location Centre
gNB Next Generation Node B
gNB-CU-CP gNB Central Unit Control Plane
GNSS Global Navigation Satellite System
GPSI Generic Public Subscription Identifier
GTP GPRS Tunneling Protocol
GUTI Globally Unique Temporary Identifier
GW Gateway
HGMLC Home GMLC
HTTP Hypertext Transfer Protocol
ID Identifier
IMEI International Mobile Equipment Identity
IMEI DB IMEI Database
IMS IP Multimedia Subsystem
IMSI International Mobile Subscriber Identity
IP Internet Protocol
IP-CAN IP Connectivity Access Network
L2 Layer 2 (data link layer)
L3 Layer 3 (network layer)
LADN Local Area Data Network
LAN local area network
LCS LoCation Services
LI Lawful Intercept
LMC Location Management Component
LMF Location Management Function
LPP LTE Positioning Protocol
LRF location retrieval function
MAC Media Access Control
MEI Mobile Equipment Identifier
MICO Mobile Initiated Connection Only
MME Mobility Management Entity
MO Mobile Originated
MO-LR Mobile Originated Location Request
MSISDN Mobile Subscriber ISDN
MT Mobile Terminating
MT-LR Mobile Terminated Location Request
N3IWF Non-3GPP InterWorking Function
NAI Network Access Identifier
NAS Non Access Stratum
NAT Network address translation
NB-IoT Narrow Band IoT
NCGI NR Cell Global Identity
NEF Network Exposure Function
NF Network Function
NGAP Next Generation Application Protocol
ng-eNB Next Generation eNB
NG-RAN NR Radio Access Network
NI-LR Network Induced Location Request
NR New Radio
NRF Network Repository Function
NRPPA New Radio Positioning Protocol A
NSI Network Slice Instance
NSSAI Network Slice Selection Assistance Information
NSSF Network Slice Selection Function
NWDAF Network Data Analytics Function
OAM Operation Administration and Maintenance
OCS Online Charging System
OFCS Offline Charging System
OTDOA Observed Time Difference of Arrival
PCC Policy and Charging Control
PCF Policy Control Function
PCRF Policy and Charging Rules Function
PDN Packet Data Network
PDU Packet Data Unit
PEI Permanent Equipment Identifier
PGW PDN Gateway
PLMN Public Land Mobile Network
ProSe Proximity-based Services
QFI QoS Flow Identifier
QoS Quality of Service
RM Registration Management
RA Random Access
RAN Radio Access Network
RAT Radio Access Technology
RRC Radio Resource Control
RM Registration Management
S1-AP S1 Application Protocol
SBA Service Based Architecture
SEA Security Anchor Function
SGW Serving Gateway
SCM Security Context Management
SM Session Management
SMF Session Management Function
SMSF SMS Function
S-NSSAI Single Network Slice Selection Assistance information
SS Synchronization Signal
SSC Session and Service Continuity
SUCI Served User Correlation ID
SUPI Subscriber Permanent Identifier
TA Tracking Area
TAI Tracking Area Identity
TBS Terrestrial Beacon System
TCP Transmission Control Protocol
TEID Tunnel Endpoint Identifier
TMSI Temporary Mobile Subscriber Identity
TNAN Trusted Non-3GPP Access Network TNGF Trusted Non3GPP Gateway
TRP Transmission and Reception Point
UCMF UE radio Capability Management Function
UDR Unified Data Repository
UDM Unified Data Management
UDP User Datagram Protocol
UE User Equipment
UL Uplink
UL CL Uplink Classifier
UPF User Plane Function
V2X Vehicle-To-Everything
WLAN Wireless Local Area Network
XML Extensible Markup Language Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
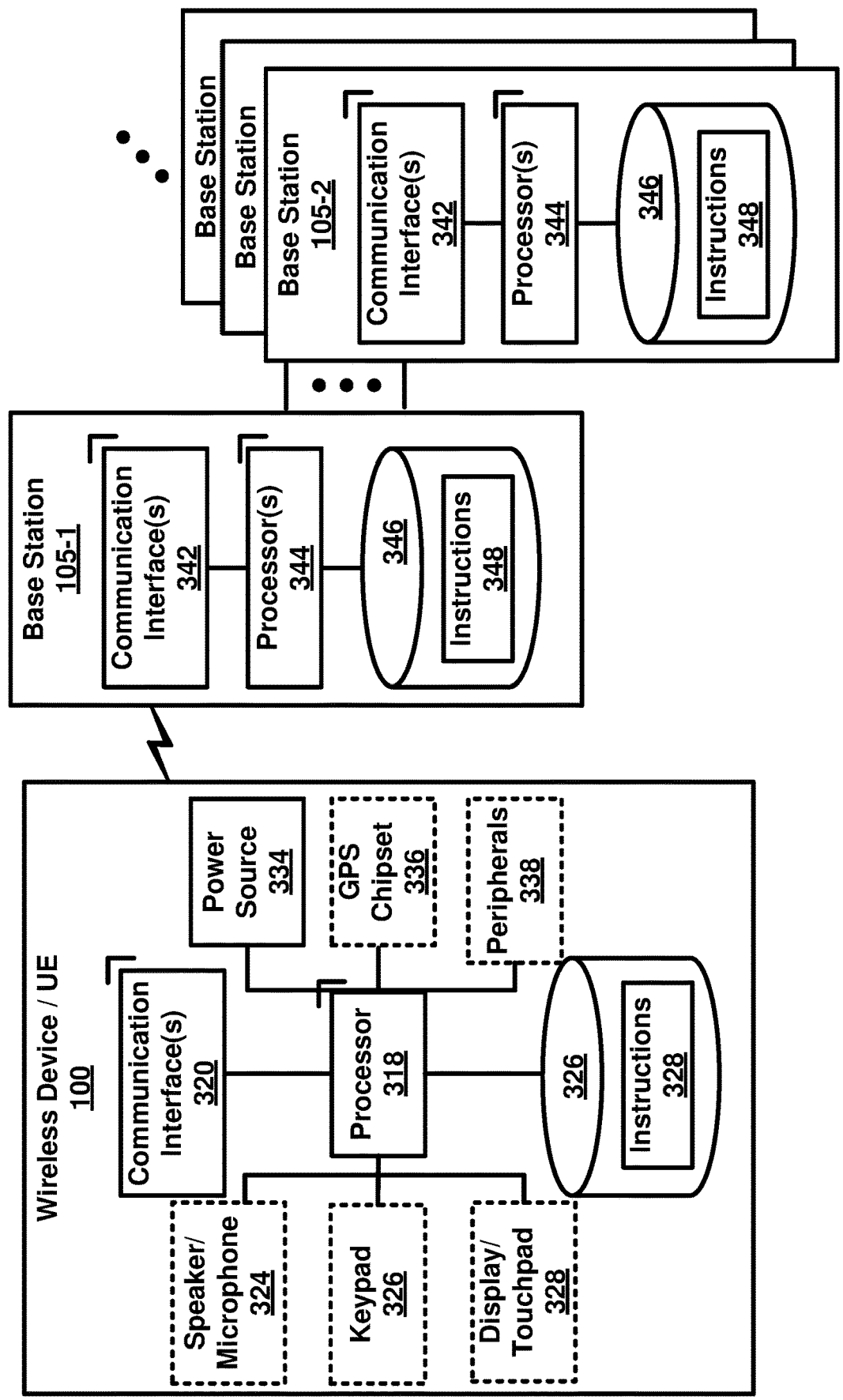
FIG. 3 is a system diagram of an example wireless device and a network node in a 5G system as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, an network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(*s*) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function, AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

Figure 5A:
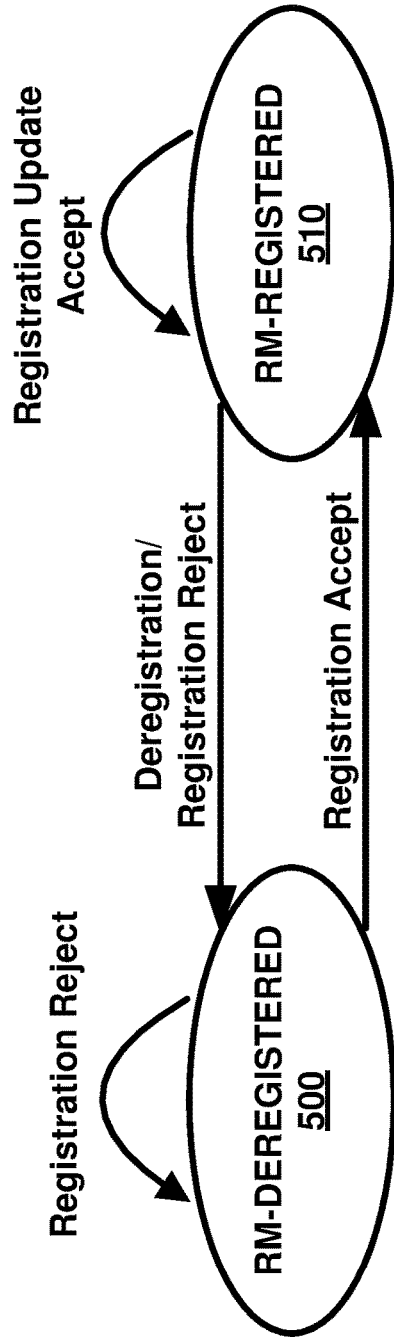
FIG. 5A and FIG. 5B depict two registration management state models in UE 100 and AMF 155 as per an aspect of embodiments of the present disclosure.
Figure 5B:
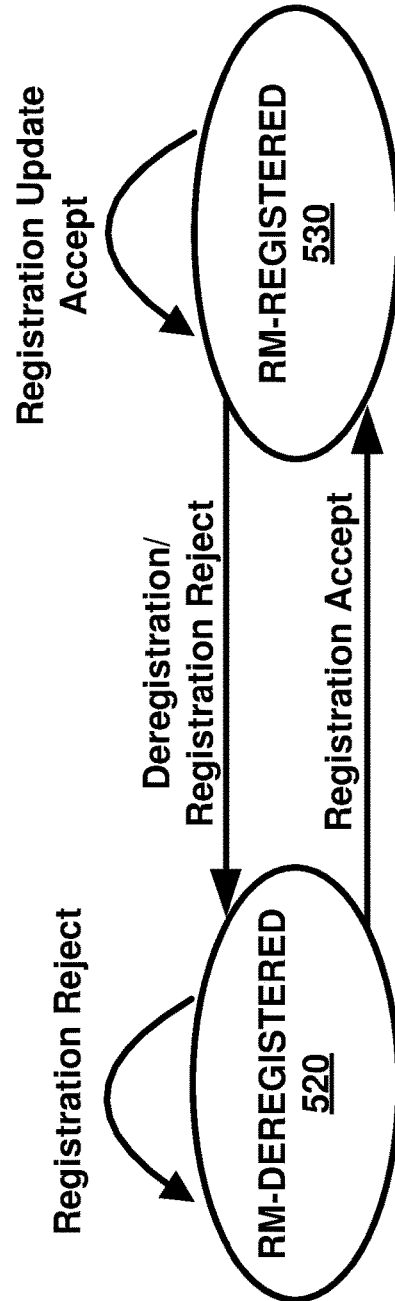

In an example, as depicted in example FIG. 5A and FIG. 5B, the registration management, RM may be employed to register or de-register a UE/user 100 with the network, and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
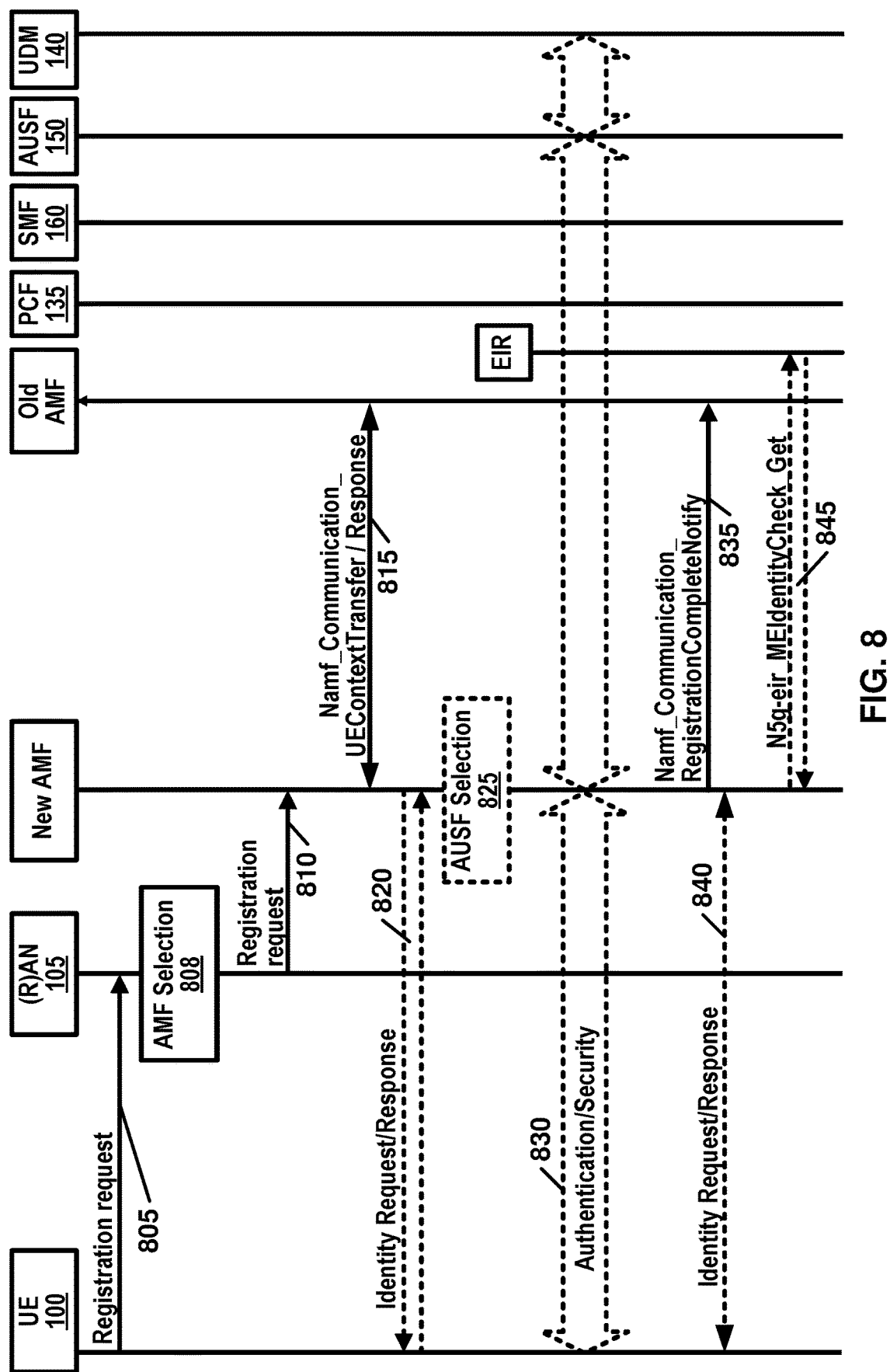
FIG. 8 is an example call flow for registration procedure as per an aspect of an embodiment of the present disclosure.
Figure 9:
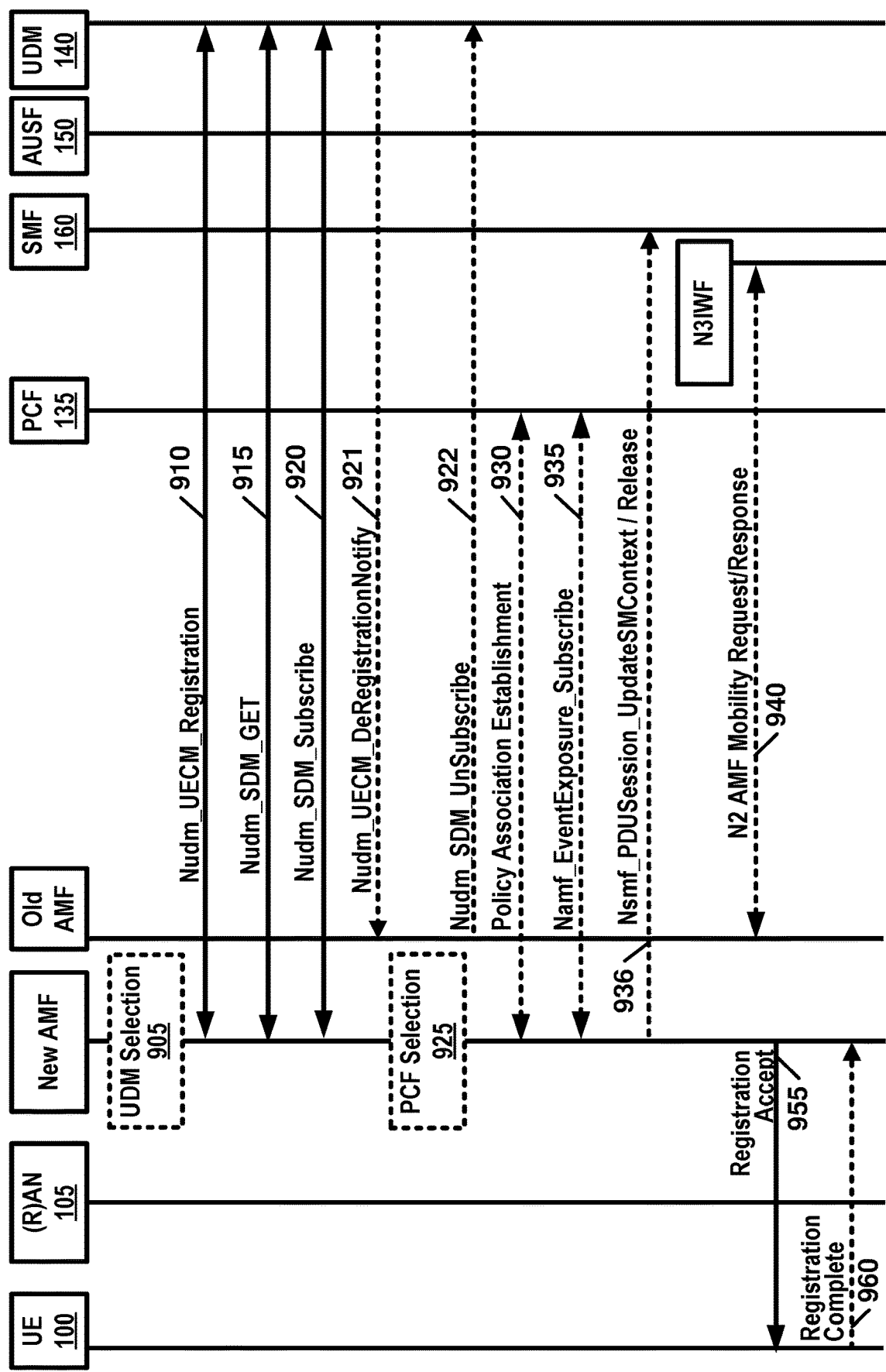
FIG. 9 is an example call flow for registration procedure as per an aspect of an embodiment of the present disclosure.

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the signaling connection between the UE 100 and the (R)AN 105 (e.g. RRC connection over 3GPP access) and the N2 connection for the UE 100 between the and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 may perform cell selection, cell reselection, PLMN selection, and/or the like. A UE 100 in CM-CONNECTED 610 state may have a NAS signaling connection with the AMF 155 over N1.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
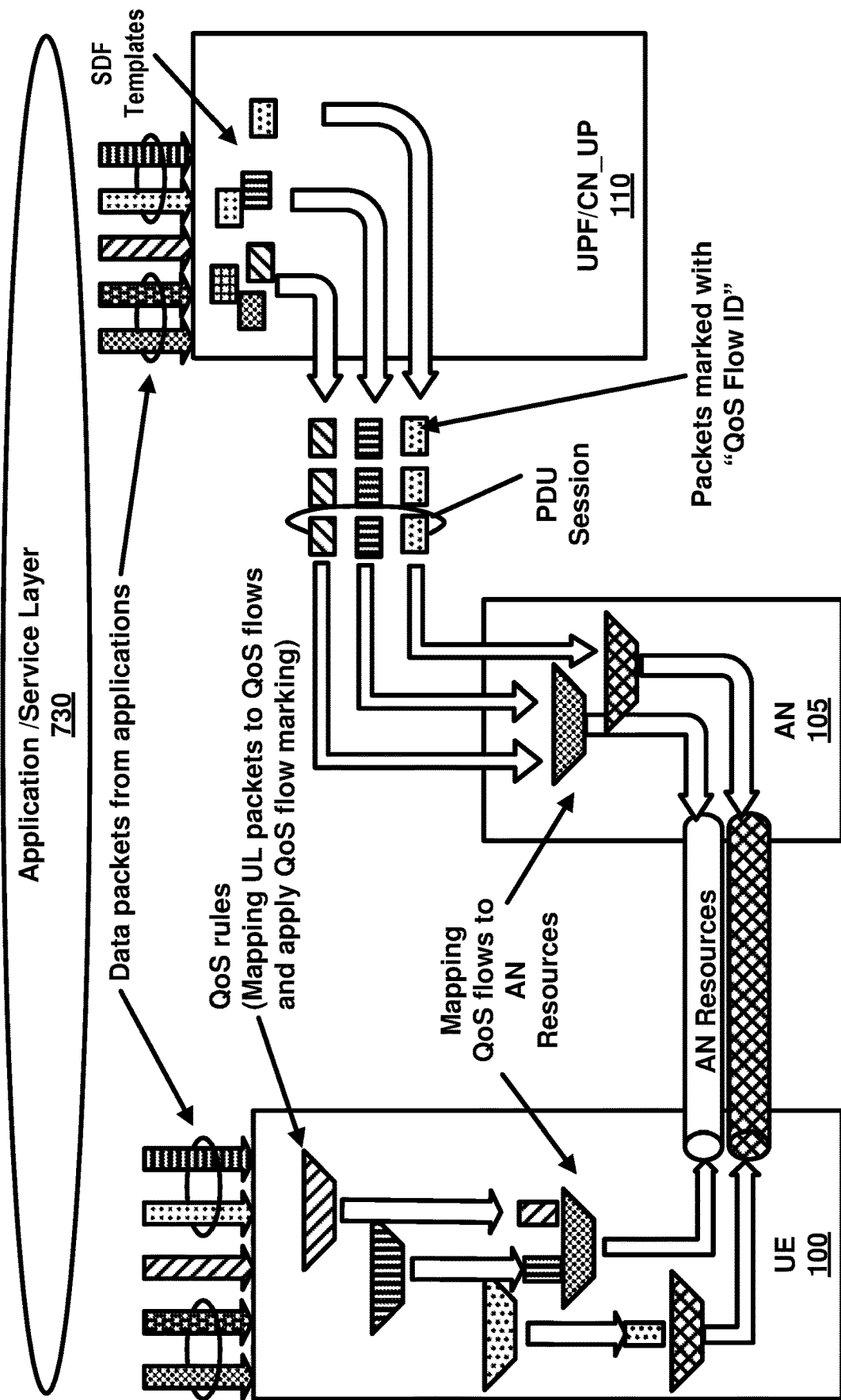
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like.).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEf 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer. The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 should be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to the a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by each PLMN based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message 805 (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the parameters may include e.g. SUCI or SUPI or the 5G-GUTI, the Selected PLMN ID and requested NSSAI, and/or the like. In an example, the parameters may comprise establishment cause. The establishment cause may provide the reason for requesting the establishment of an RRC connection. In an example, the registration type may indicate if the UE 100 wants to perform an initial registration (i.e. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (i.e., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (i.e. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of each S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects 808 an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection 808.

In an example, the (R)AN 105 may send to the new AMF 155 an N2 message 810 (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 an Namf_Communication_UEContextTransfer (complete registration request) 815. In an example, if the UE's 5G-GUTI was included in the registration request and the serving AMF 155 has changed since last registration procedure, the new AMF 155 may invoke the Namf_Communication_UEContextTransfer service operation 815 on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by each NF consumer, for the UE, to the new AMF 155. In an example, if the UE 100 identifies itself with PEI, the SUPI request may be skipped.

In an example, the old AMF 155 may send to new AMF 155 a response 815 to Namf_Communication_UEContext-Transfer (SUPI, MM context, SMF 160 information, PCF ID). In an example, the old AMF 155 may respond to the new AMF 155 for the Namf_Communication_UEContext-Transfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure 820 may be initiated by the AMF 155 sending an identity request message to the UE 100 requesting the SUCI.

In an example, the UE 100 may respond with an identity response message 820 including the SUCI. The UE 100 may derive the SUCI by using the provisioned public key of the HPLMN.

In an example, the AMF 155 may decide to initiate UE 100 authentication 825 by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration the AMF 155 may skip the authentication and security setup or the AMF 155 may accept that the authentication may fail and may continue the registration procedure.

In an example, the authentication 830 may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify 835. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(s) to locally release the UE's SM context by invoking the Nsmf_PDUSession_ReleaseSMContext service operation.

In an example, the new AMF 155 may send to the UE 100 an identity request/response 840 (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check 845 by invoking the N5g-eir_EquipmentIdentity-Check_Get service operation 845.

In an example, the new AMF 155, based on the SUPI, may select 905 a UDM 140. The UDM 140 may select a UDR instance. In an example, the AMF 155 may select a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration 910 and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get 915. The UDM 140 may retrieve this information from UDR by Nudr_UDM_Query (access and mobility subscription data). After a successful response is received, the AMF 155 may subscribe to be notified using Nudm_SDM_Subscribe 920 when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification 921 to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe 922.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select 925 a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select 925 a PCF 135.

In an example, the new AMF 155 may perform a policy association establishment 930 during registration procedure. If the new AMF 155 contacts the PCF 135 identified by the (V-)PCF ID received during inter-AMF 155 mobility, the new AMF 155 may include the PCF-ID in the Npcf_AM-PolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_Event-Exposure_Subscribe service operation 935 for UE 100 event subscription.

In an example, the AMF 155 may send to the SMF 160 a Nsmf_PDUSession_UpdateSMContext 936. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160(s) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155155 may send to a N3IWF an N2 AMF 155 mobility request 940. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response 940.

In an example, the new AMF 155 may send to the UE 100 a registration accept 955 (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message 955. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of each S-NSSAI of the allowed NSSAI to the S-NSSAIs of the configured NSSAI for the HPLMN. The AMF 155 may include in the registration accept message 955 the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete 960 message. In an example, the UE 100 may send the registration complete message 960 to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
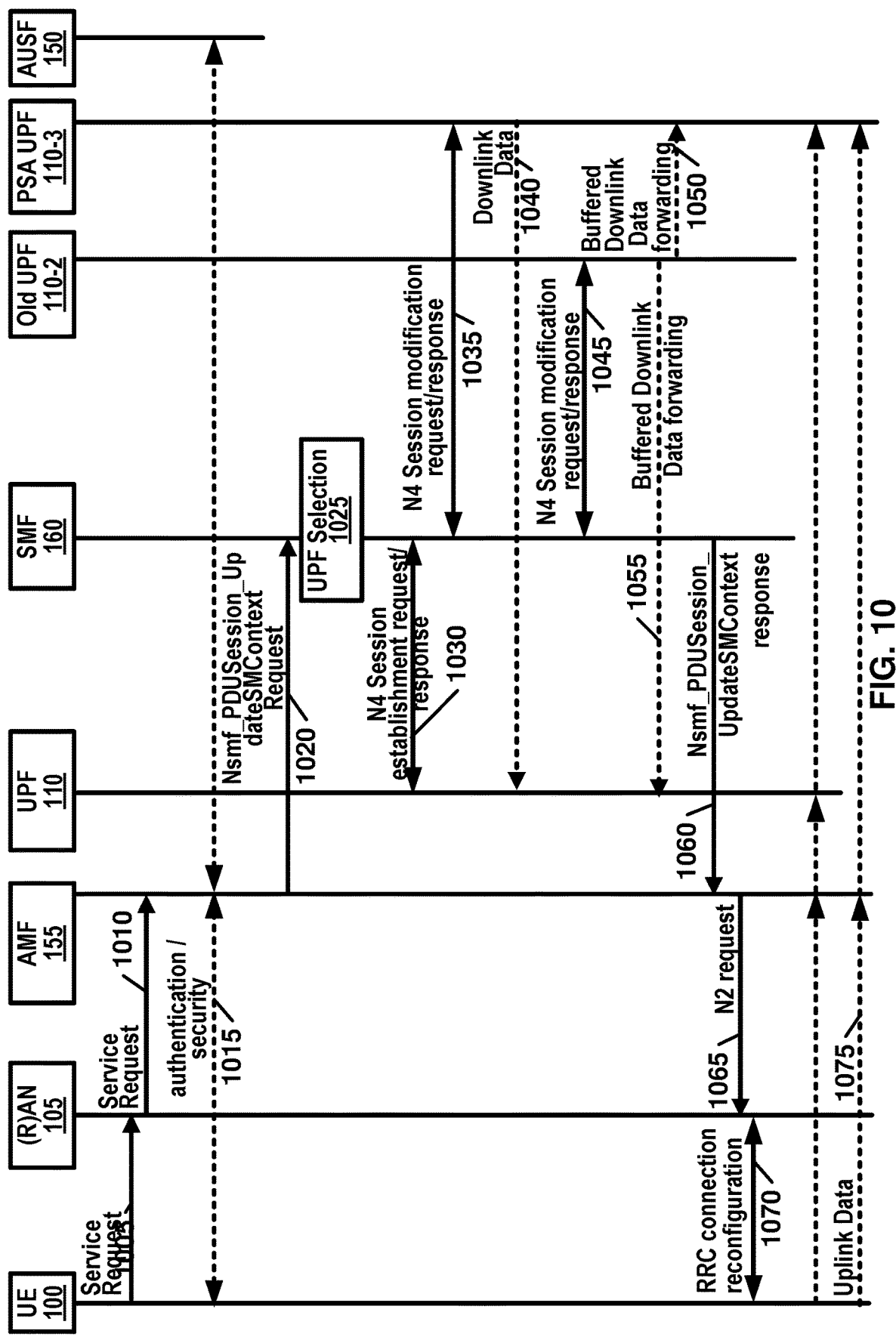
FIG. 10 is an example call flow for service request procedure as per an aspect of an embodiment of the present disclosure.
Figure 11:
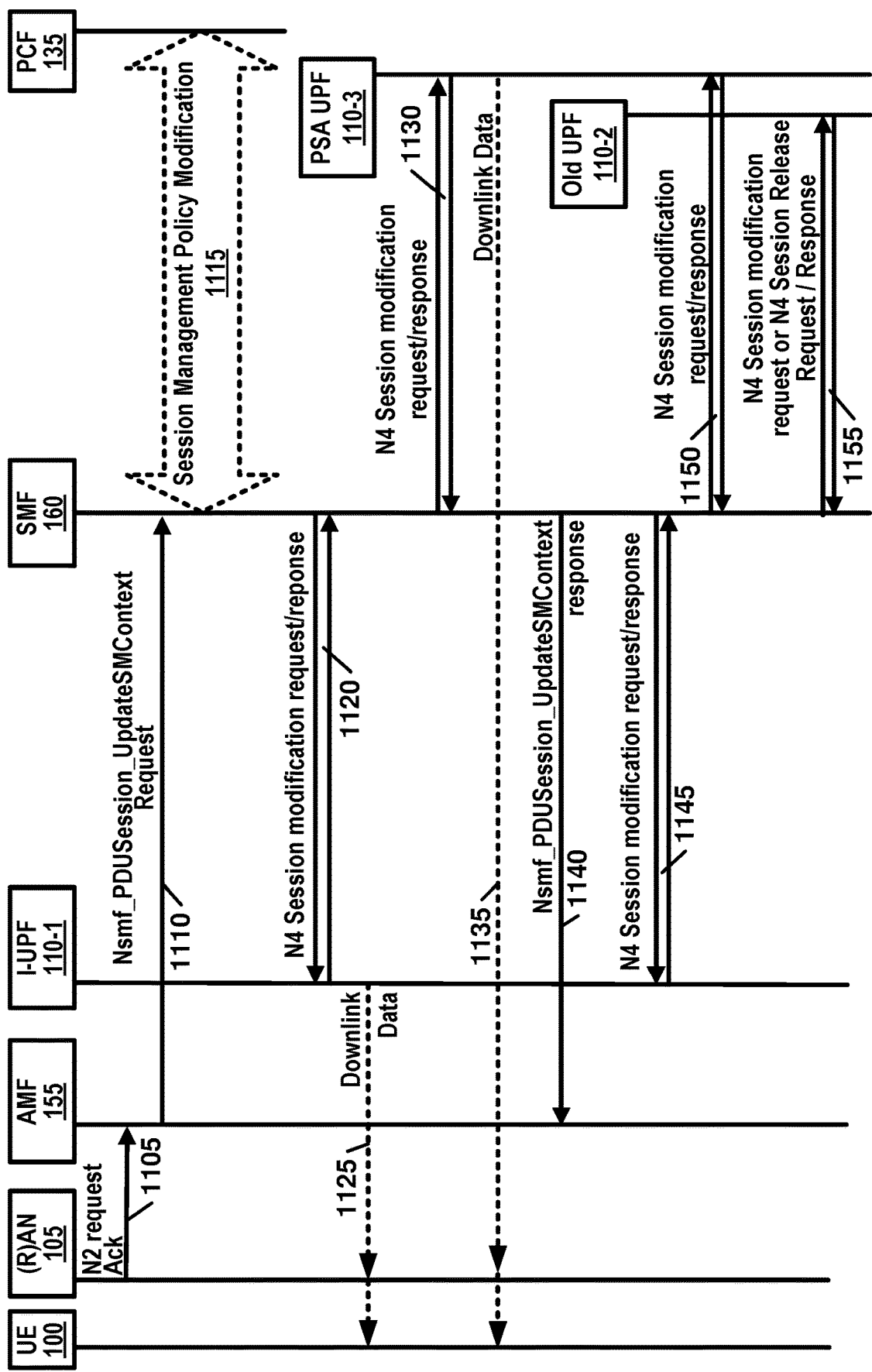
FIG. 11 is an example call flow for service request procedure as per an aspect of an embodiment of the present disclosure.

As depicted in example FIG. 10 and FIG. 11, a service request procedure e.g., a UE 100 triggered service request procedure may be used by a UE 100 in CM-IDLE state to request the establishment of a secure connection to an AMF 155. FIG. 11 is continuation of FIG. 10 depicting the service request procedure. The service request procedure may be used to activate a user plane connection for an established PDU session. The service request procedure may be triggered by the UE 100 or the 5GC, and may be used when the UE 100 is in CM-IDLE and/or in CM-CONNECTED and may allow selectively to activate user plane connections for some of the established PDU sessions.

In an example, a UE 100 in CM IDLE state may initiate the service request procedure to send uplink signaling messages, user data, and/or the like, as a response to a network paging request, and/or the like. In an example, after receiving the service request message, the AMF 155 may perform authentication. In an example, after the establishment of signaling connection to the AMF 155, the UE 100 or network may send signaling messages, e.g. PDU session establishment from the UE 100 to a SMF 160, via the AMF 155.

In an example, for any service request, the AMF 155 may respond with a service accept message to synchronize PDU session status between the UE 100 and network. The AMF 155 may respond with a service reject message to the UE 100, if the service request may not be accepted by the network. The service reject message may include an indication or cause code requesting the UE 100 to perform a registration update procedure. In an example, for service request due to user data, network may take further actions if user plane connection activation may not be successful. In an example FIG. 10 and FIG. 11, more than one UPF, e.g., old UPF 110-2 and PDU session Anchor PSA UPF 110-3 may be involved.

In an example, the UE 100 may send to a (R)AN 105 an AN message comprising AN parameters, mobility management, MM NAS service request 1005 (e.g., list of PDU sessions to be activated, list of allowed PDU sessions, security parameters, PDU session status, and/or the like), and/or the like. In an example, the UE 100 may provide the list of PDU sessions to be activated when the UE 100 may re-activate the PDU session(s). The list of allowed PDU sessions may be provided by the UE 100 when the service request may be a response of a paging or a NAS notification, and may identify the PDU sessions that may be transferred or associated to the access on which the service request may be sent. In an example, for the case of NG-RAN, the parameters may include selected PLMN ID, and an establishment cause. The establishment cause may provide the reason for requesting the establishment of an RRC connection. The UE 100 may send NAS service request message towards the AMF 155 encapsulated in an RRC message to the RAN 105.

In an example, if the service request may be triggered for user data, the UE 100 may identify, using the list of PDU sessions to be activated, the PDU session(s) for which the UP connections are to be activated in the NAS service request message. If the service request may be triggered for signaling, the UE 100 may not identify any PDU session(s). If this procedure may be triggered for paging response, and/or the UE 100 may have at the same time user data to be transferred, the UE 100 may identify the PDU session(s) whose UP connections may be activated in MM NAS service request message, by the list of PDU sessions to be activated.

In an example, if the service request over 3GPP access may be triggered in response to a paging indicating non-3GPP access, the NAS service request message may identify in the list of allowed PDU sessions the list of PDU sessions associated with the non-3GPP access that may be re-activated over 3GPP. In an example, the PDU session status may indicate the PDU sessions available in the UE 100. In an example, the UE 100 may not trigger the service request procedure for a PDU session corresponding to a LADN when the UE 100 may be outside the area of availability of the LADN. The UE 100 may not identify such PDU session(s) in the list of PDU sessions to be activated, if the service request may be triggered for other reasons.

In an example, the (R)AN 105 may send to AMF 155 an N2 Message 1010 (e.g., a service request) comprising N2 parameters, MM NAS service request, and/or the like. The AMF 155 may reject the N2 message if it may not be able to handle the service request. In an example, if NG-RAN may be used, the N2 parameters may include the 5G-GUTI, selected PLMN ID, location information, RAT type, establishment cause, and/or the like. In an example, the 5G-GUTI may be obtained in RRC procedure and the (R)AN 105 may select the AMF 155 according to the 5G-GUTI. In an example, the location information and RAT type may relate to the cell in which the UE 100 may be camping. In an example, based on the PDU session status, the AMF 155 may initiate PDU session release procedure in the network for the PDU sessions whose PDU session ID(s) may be indicated by the UE 100 as not available.

In an example, if the service request was not sent integrity protected or integrity protection verification failed, the AMF 155 may initiate a NAS authentication/security procedure 1015.

In an example, if the UE 100 triggers the service request to establish a signaling connection, upon successful establishment of the signaling connection, the UE 100 and the network may exchange NAS signaling.

In an example the AMF 155 may send to the SMF 160 a PDU session update context request 1020 e.g., Nsmf_P-DUSession_UpdateSMContext request comprising PDU session ID(s), Cause(s), UE 100 location information, access type, and/or the like.

In an example, the Nsmf_PDUSession_UpdateSMContext request may be invoked by the AMF 155 if the UE 100 may identify PDU session(s) to be activated in the NAS service request message. In an example, the Nsmf_PDUSession_UpdateSMContext request may be triggered by the SMF 160 wherein the PDU session(s) identified by the UE 100 may correlate to other PDU session ID(s) than the one triggering the procedure. In an example, the Nsmf_PDUSession_UpdateSMContext request may be triggered by the SMF 160 wherein the current UE 100 location may be outside the area of validity for the N2 information provided by the SMF 160 during a network triggered service request procedure. The AMF 155 may not send the N2 information provided by the SMF 160 during the network triggered service request procedure.

In an example, the AMF 155 may determine the PDU session(s) to be activated and may send an Nsmf_PDUSession_UpdateSMContext request to SMF 160(s) associated with the PDU session(s) with cause set to indicate establishment of user plane resources for the PDU session(s).

In an example, if the procedure may be triggered in response to paging indicating non-3GPP access, and the list of allowed PDU sessions provided by the UE 100 may not include the PDU session for which the UE 100 was paged, the AMF 155 may notify the SMF 160 that the user plane for the PDU session may not be re-activated. The service request procedure may succeed without re-activating the user plane of any PDU sessions, and the AMF 155 may notify the UE 100.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) keep the PDU session, may reject the activation of user plane connection for the PDU session and may inform the AMF 155. In an example, if the procedure may be triggered by a network triggered service request, the SMF 160 may notify the UPF 110 that originated the data notification to discard downlink data for the PDU sessions and/or to not provide further data notification messages. The SMF 160 may respond to the AMF 155 with an appropriate reject cause and the user plane activation of PDU session may be stopped.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) release the PDU session. The SMF 160 may locally release the PDU session and may inform the AMF 155 that the PDU session may be released. The SMF 160 may respond to the AMF 155 with an appropriate reject cause and the user plane Activation of PDU session may be stopped.

In an example, if the UP activation of the PDU session may be accepted by the SMF 160, based on the location info received from the AMF 155, the SMF 160 may check the UPF 110 Selection 1025 Criteria (e.g., slice isolation requirements, slice coexistence requirements, UPF's 110 dynamic load, UPF's 110 relative static capacity among UPFs supporting the same DNN, UPF 110 location available at the SMF 160, UE 100 location information, Capability of the UPF 110 and the functionality required for the particular UE 100 session. In an example, an appropriate UPF 110 may be selected by matching the functionality and features required for a UE 100, DNN, PDU session type (i.e. IPv4, IPv6, ethernet type or unstructured type) and if applicable, the static IP address/prefix, SSC mode selected for the PDU session, UE 100 subscription profile in UDM 140, DNAI as included in the PCC rules, local operator policies, S-NSSAI, access technology being used by the UE 100, UPF 110 logical topology, and/or the like), and may determine to perform one or more of the following: continue using the current UPF(s); may select a new intermediate UPF 110 (or add/remove an intermediate UPF 110), if the UE 100 has moved out of the service area of the UPF 110 that was previously connecting to the (R)AN 105, while maintaining the UPF(s) acting as PDU session anchor; may trigger re-establishment of the PDU session to perform relocation/reallocation of the UPF 110 acting as PDU session anchor, e.g. the UE 100 has moved out of the service area of thechor UPF 110 which is connecting to RAN 105.

In an example, the SMF 160 may send to the UPF 110 (e.g., new intermediate UPF 110) an N4 session establishment request 1030. In an example, if the SMF 160 may select a new UPF 110 to act as intermediate UPF 110-2 for the PDU session, or if the SMF 160 may select to insert an intermediate UPF 110 for a PDU session which may not have an intermediate UPF 110-2, an N4 session establishment request 1030 message may be sent to the new UPF 110, providing packet detection, data forwarding, enforcement and reporting rules to be installed on the new intermediate UPF. The PDU session anchor addressing information (on N9) for this PDU session may be provided to the intermediate UPF 110-2.

In an example, if a new UPF 110 is selected by the SMF 160 to replace the old (intermediate) UPF 110-2, the SMF 160 may include a data forwarding indication. The data forwarding indication may indicate to the UPF 110 that a second tunnel endpoint may be reserved for buffered DL data from the old I-UPF.

In an example, the new UPF 110 (intermediate) may send to SMF 160 an N4 session establishment response message 1030. In case the UPF 110 may allocate CN tunnel info, the UPF 110 may provide DL CN tunnel info for the UPF 110 acting as PDU session anchor and UL CN tunnel info (e.g., CN N3 tunnel info) to the SMF 160. If the data forwarding indication may be received, the new (intermediate) UPF 110 acting as N3 terminating point may send DL CN tunnel info for the old (intermediate) UPF 110-2 to the SMF 160. The SMF 160 may start a timer, to release the resource in the old intermediate UPF 110-2.

In an example, if the SMF 160 may selects a new intermediate UPF 110 for the PDU session or may remove the old I-UPF 110-2, the SMF 160 may send N4 session modification request message 1035 to PDU session anchor, PSA UPF 110-3, providing the data forwarding indication and DL tunnel information from new intermediate UPF 110.

In an example, if the new intermediate UPF 110 may be added for the PDU session, the (PSA) UPF 110-3 may begin to send the DL data to the new I-UPF 110 as indicated in the DL tunnel information.

In an example, if the service request may be triggered by the network, and the SMF 160 may remove the old I-UPF 110-2 and may not replace the old I-UPF 110-2 with the new I-UPF 110, the SMF 160 may include the data forwarding indication in the request. The data forwarding indication may indicate to the (PSA) UPF 110-3 that a second tunnel endpoint may be reserved for buffered DL data from the old I-UPF 110-2. In this case, the PSA UPF 110-3 may begin to buffer the DL data it may receive at the same time from the N6 interface.

In an example, the PSA UPF 110-3 (PSA) may send to the SMF 160 an N4 session modification response 1035. In an example, if the data forwarding indication may be received, the PSA UPF 110-3 may become as N3 terminating point and may send CN DL tunnel info for the old (intermediate) UPF 110-2 to the SMF 160. The SMF 160 may start a timer, to release the resource in old intermediate UPF 110-2 if there is one.

In an example, the SMF 160 may send to the old UPF 110-2 an N4 session modification request 1045 (e.g., may comprise new UPF 110 address, new UPF 110 DL tunnel ID, and/or the like). In an example, if the service request may be triggered by the network, and/or the SMF 160 may remove the old (intermediate) UPF 110-2, the SMF 160 may send the N4 session modification request message to the old (intermediate) UPF 110-2, and may provide the DL tunnel information for the buffered DL data. If the SMF 160 may allocate new I-UPF 110, the DL tunnel information is from the new (intermediate) UPF 110 may act as N3 terminating point. If the SMF 160 may not allocate a new I-UPF 110, the DL tunnel information may be from the new UPF 110 (PSA) 110-3 acting as N3 terminating point. The SMF 160 may start a timer to monitor the forwarding tunnel. In an example, the old (intermediate) UPF 110-2 may send N4 session modification response message to the SMF 160.

In an example, if the I-UPF 110-2 may be relocated and forwarding tunnel was established to the new I-UPF 110, the old (intermediate) UPF 110-2 may forward its buffered data to the new (intermediate) UPF 110 acting as N3 terminating point. In an example, if the old I-UPF 110-2 may be removed and the new I-UPF 110 may not be assigned for the PDU session and forwarding tunnel may be established to the UPF 110 (PSA) 110-3, the old (intermediate) UPF 110-2 may forward its buffered data to the UPF 110 (PSA) 110-3 acting as N3 terminating point.

In an example, the SMF 160 may send to the AMF 155 an N11 message 1060 e.g., a Nsmf_PDUSession_UpdateSMContext response (comprising: N1 SM container (PDU session ID, PDU session re-establishment indication), N2 SM information (PDU session ID, QoS profile, CN N3 tunnel info, S-NSSAI), Cause), upon reception of the Nsmf_PDUSession_UpdateSMContext request with a cause including e.g., establishment of user plane resources. The SMF 160 may determine whether UPF 110 reallocation may be performed, based on the UE 100 location information, UPF 110 service area and operator policies. In an example, for a PDU session that the SMF 160 may determine to be served by the current UPF 110, e.g., PDU session anchor or intermediate UPF, the SMF 160 may generate N2 SM information and may send an Nsmf_PDUSession_UpdateSMContext response 1060 to the AMF 155 to establish the user plane(s). The N2 SM information may contain information that the AMF 155 may provide to the RAN 105.

In an example, for a PDU session that the SMF 160 may determine as requiring a UPF 110 relocation for PDU session anchor UPF, the SMF 160 may reject the activation of UP of the PDU session by sending Nsmf_PDUSession_UpdateSMContext response that may contain N1 SM container to the UE 100 via the AMF 155. The N1 SM container may include the corresponding PDU session ID and PDU session re-establishment indication.

Upon reception of the Namf_EventExposure_Notify from the AMF 155 to the SMF 160, with an indication that the UE 100 is reachable, if the SMF 160 may have pending DL data, the SMF 160 may invoke the Namf_Communication_N1N2MessageTransfer service operation to the AMF 155 to establish the user plane(s) for the PDU sessions. In an example, the SMF 160 may resume sending DL data notifications to the AMF 155 in case of DL data.

In an example, the SMF 160 may send a message to the AMF 155 to reject the activation of UP of the PDU session by including a cause in the Nsmf_PDUSession_UpdateSMContext response if the PDU session may correspond to a LADN and the UE 100 may be outside the area of availability of the LADN, or if the AMF 155 may notify the SMF 160 that the UE 100 may be reachable for regulatory prioritized service, and the PDU session to be activated may not for a regulatory prioritized service; or if the SMF 160 may decide to perform PSA UPF 110-3 relocation for the requested PDU session.

In an example, the AMF 155 may send to the (R)AN 105 an N2 request message 1065 (e.g., N2 SM information received from SMF 160, security context, AMF 155 signaling connection ID, handover restriction list, MM NAS service accept, list of recommended cells/TAs/NG-RAN node identifiers). In an example, the RAN 105 may store the security context, AMF 155 signaling connection Id, QoS information for the QoS flows of the PDU sessions that may be activated and N3 tunnel IDs in the UE 100 RAN 105 context. In an example, the MM NAS service accept may include PDU session status in the AMF 155. If the activation of UP of a PDU session may be rejected by the SMF 160, the MM NAS service accept may include the PDU session ID and the reason why the user plane resources may not be activated (e.g. LADN not available). Local PDU session release during the session request procedure may be indicated to the UE 100 via the session Status.

In an example, if there are multiple PDU sessions that may involve multiple SMF 160s, the AMF 155 may not wait for responses from all SMF 160s before it may send N2 SM information to the UE 100. The AMF 155 may wait for all responses from the SMF 160s before it may send MM NAS service accept message to the UE 100.

In an example, the AMF 155 may include at least one N2 SM information from the SMF 160 if the procedure may be triggered for PDU session user plane activation. AMF 155 may send additional N2 SM information from SMF 160s in separate N2 message(s) (e.g. N2 tunnel setup request), if there is any. Alternatively, if multiple SMF 160s may be involved, the AMF 155 may send one N2 request message to (R)AN 105 after all the Nsmf_PDUSession_UpdateSMContext response service operations from all the SMF 160s associated with the UE 100 may be received. In such case, the N2 request message may include the N2 SM information received in each of the Nsmf_PDUSession_UpdateSMContext response and PDU session ID to enable AMF 155 to associate responses to relevant SMF 160.

In an example, if the RAN 105 (e.g., NG RAN) node may provide the list of recommended cells/TAs/NG-RAN node identifiers during the release procedure, the AMF 155 may include the information from the list in the N2 request. The RAN 105 may use this information to allocate the RAN 105 notification area when the RAN 105 may decide to enable RRC inactive state for the UE 100.

If the AMF 155 may receive an indication, from the SMF 160 during a PDU session establishment procedure that the UE 100 may be using a PDU session related to latency sensitive services, for any of the PDU sessions established for the UE 100 and the AMF 155 has received an indication from the UE 100 that may support the CM-CONNECTED with RRC inactive state, then the AMF 155 may include the UE's RRC inactive assistance information. In an example, the AMF 155 based on network configuration, may include the UE's RRC inactive assistance information.

In an example, the (R)AN 105 may send to the UE 100 a message to perform RRC connection reconfiguration 1070 with the UE 100 depending on the QoS information for all the QoS flows of the PDU sessions whose UP connections may be activated and data radio bearers. In an example, the user plane security may be established.

In an example, if the N2 request may include a MM NAS service accept message, the RAN 105 may forward the MM NAS service accept to the UE 100. The UE 100 may locally delete context of PDU sessions that may not be available in 5GC.

In an example, if the N1 SM information may be transmitted to the UE 100 and may indicate that some PDU session(s) may be re-established, the UE 100 may initiate PDU session re-establishment for the PDU session(s) that me be re-established after the service request procedure may be complete.

In an example, after the user plane radio resources may be setup, the uplink data from the UE 100 may be forwarded to the RAN 105. The RAN 105 (e.g., NG-RAN) may send the uplink data to the UPF 110 address and tunnel ID provided.

In an example, the (R)AN 105 may send to the AMF 155 an N2 request Ack 1105 (e.g., N2 SM information (comprising: AN tunnel info, list of accepted QoS flows for the PDU sessions whose UP connections are activated, list of rejected QoS flows for the PDU sessions whose UP connections are activated)). In an example, the N2 request message may include N2 SM information(s), e.g. AN tunnel info. RAN 105 may respond N2 SM information with separate N2 message (e.g. N2 tunnel setup response). In an example, if multiple N2 SM information are included in the N2 request message, the N2 request Ack may include multiple N2 SM information and information to enable the AMF 155 to associate the responses to relevant SMF 160.

In an example, the AMF 155 may send to the SMF 160 a Nsmf_PDUSession_UpdateSMContext request 1110 (N2 SM information (AN tunnel info), RAT type) per PDU session. If the AMF 155 may receive N2 SM information (one or multiple) from the RAN 105, then the AMF 155 may forward the N2 SM information to the relevant SMF 160. If the UE 100 time zone may change compared to the last reported UE 100 Time Zone then the AMF 155 may include the UE 100 time zone IE in the Nsmf_PDUSession_UpdateSMContext request message.

In an example, if dynamic PCC is deployed, the SMF 160 may initiate notification about new location information to the PCF 135 (if subscribed) by invoking an event exposure notification operation (e.g., a Nsmf_EventExposure_Notify service operation). The PCF 135 may provide updated policies by invoking a policy control update notification message 1115 (e.g., a Npcf_SMPolicyControl_UpdateNotify operation).

In an example, if the SMF 160 may select a new UPF 110 to act as intermediate UPF 110 for the PDU session, the SMF 160 may initiates an N4 session modification procedure 1120 to the new I-UPF 110 and may provide AN tunnel info. The downlink data from the new I-UPF 110 may be forwarded to RAN 105 and UE 100. In an example, the UPF 110 may send to the SMF 160, an N4 session modification response 1120. In an example, the SMF 160 may send to the AMF 155, an Nsmf_PDUSession_UpdateSMContext response 1140.

In an example, if forwarding tunnel may be established to the new I-UPF 110 and if the timer SMF 160 set for forwarding tunnel may be expired, the SMF 160 may sends N4 session modification request 1145 to new (intermediate) UPF 110 acting as N3 terminating point to release the forwarding tunnel. In an example, the new (intermediate) UPF 110 may send to the SMF 160 an N4 session modification response 1145. In an example, the SMF 160 may send to the PSA UPF 110-3 an N4 session modification request 1150, or N4 session release request. In an example, if the SMF 160 may continue using the old UPF 110-2, the SMF 160 may send an N4 session modification request 1155, providing AN tunnel info. In an example, if the SMF 160 may select a new UPF 110 to act as intermediate UPF 110, and the old UPF 110-2 may not be PSA UPF 110-3, the SMF 160 may initiate resource release, after timer expires, by sending an N4 session release request (release cause) to the old intermediate UPF 110-2.

In an example, the old intermediate UPF 110-2 may send to the SMF 160 an N4 session modification response or N4 session release response 1155. The old UPF 110-2 may acknowledge with the N4 session modification response or N4 session release response message to confirm the modification or release of resources. The AMF 155 may invoke the Namf_EventExposure_Notify service operation to notify the mobility related events, after this procedure may complete, towards the NFs that may have subscribed for the events. In an example, the AMF 155 may invoke the Namf_EventExposure_Notify towards the SMF 160 if the SMF 160 had subscribed for UE 100 moving into or out of area of interest and if the UE's current location may indicate that it may be moving into or moving outside of the area of interest subscribed, or if the SMF 160 had subscribed for LADN DNN and if the UE 100 may be moving into or outside of an area where the LADN is available, or if the UE 100 may be in MICO mode and the AMF 155 had notified an SMF 160 of the UE 100 being unreachable and that SMF 160 may not send DL data notifications to the AMF 155, and the AMF 155 may informs the SMF 160 that the UE 100 is reachable, or if the SMF 160 had subscribed for UE 100 reachability status, then the AMF 155 may notify the UE 100 reachability.

Figure 12:
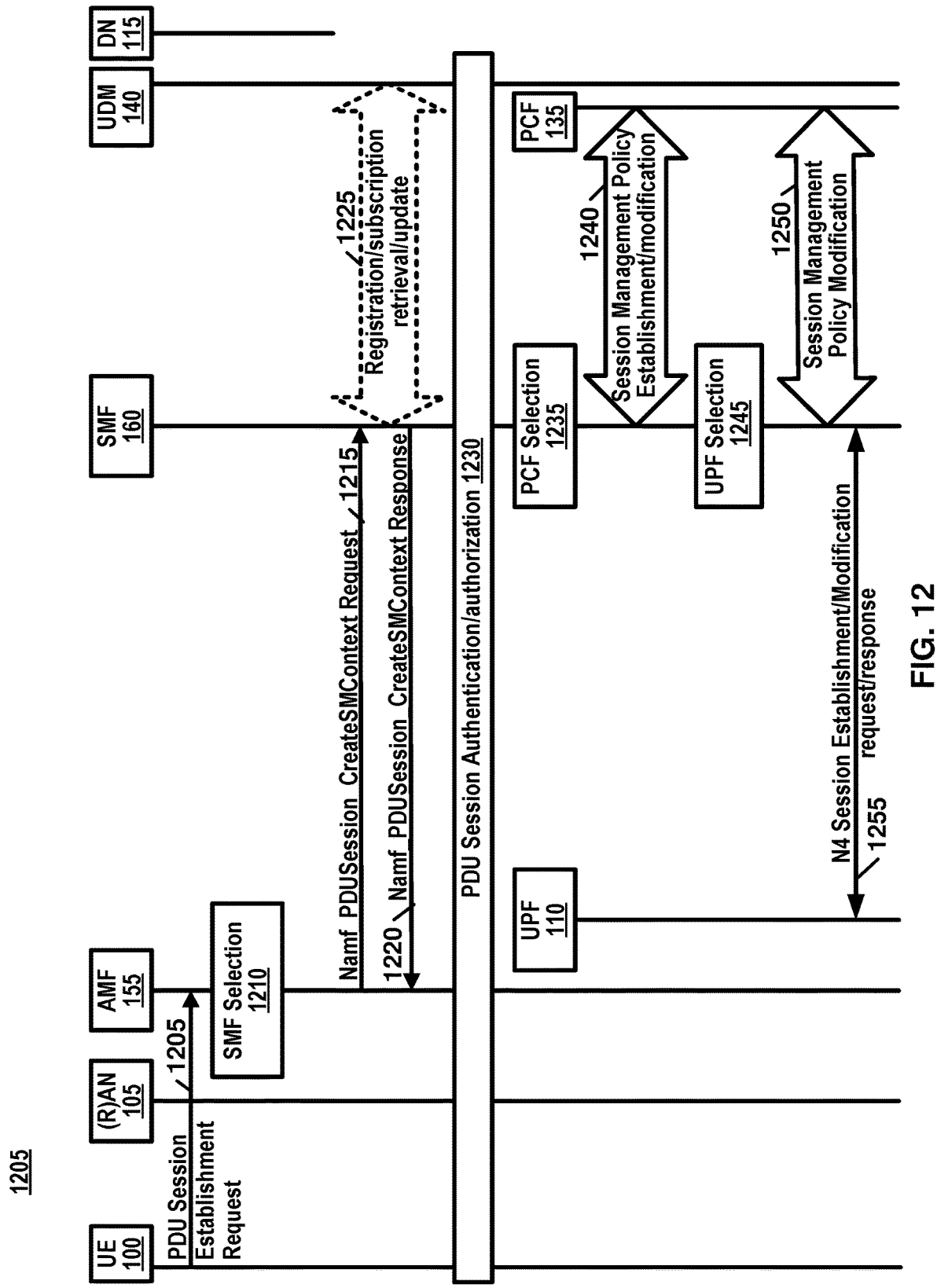
FIG. 12 is an example call flow for PDU session establishment procedure as per an aspect of an embodiment of the present disclosure.
Figure 13:
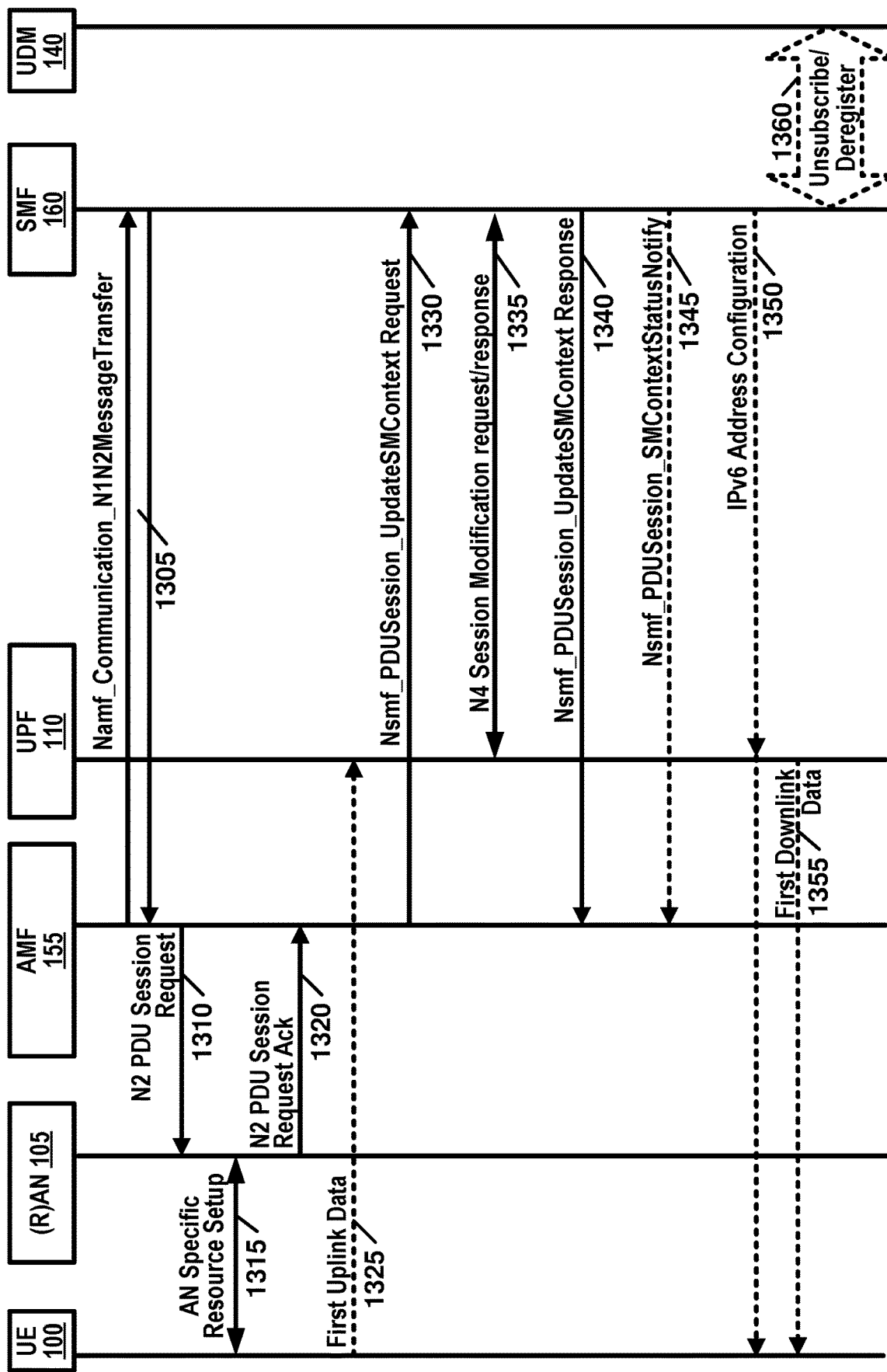
FIG. 13 is an example call flow for PDU session establishment procedure as per an aspect of an embodiment of the present disclosure.

An example PDU session establishment procedure depicted in FIG. 12 and FIG. 13. In an example embodiment, when the PDU session establishment procedure may be employed, the UE 100 may send to the AMF 155 a NAS Message 1205 (or a SM NAS message) comprising NSSAI, S-NSSAI (e.g., requested S-NSSAI, allowed S-NSSAI, subscribed S-NSSAI, and/or the like), DNN, PDU session ID, request type, old PDU session ID, N1 SM container (PDU session establishment request), and/or the like. In an example, the UE 100, in order to establish a new PDU session, may generate a new PDU session ID. In an example, when emergency service may be required and an emergency PDU session may not already be established, the UE 100 may initiate the UE 100 requested PDU session establishment procedure with a request type indicating emergency request. In an example, the UE 100 may initiate the UE 100 requested PDU session establishment procedure by the transmission of the NAS message containing a PDU session establishment request within the N1 SM container. The PDU session establishment request may include a PDU type, SSC mode, protocol configuration options, and/or the like. In an example, the request type may indicate initial request if the PDU session establishment is a request to establish the new PDU session and may indicate existing PDU session if the request refers to an existing PDU session between 3GPP access and non-3GPP access or to an existing PDN connection in EPC. In an example, the request type may indicate emergency request if the PDU session establishment may be a request to establish a PDU session for emergency services. The request type may indicate existing emergency PDU session if the request refers to an existing PDU session for emergency services between 3GPP access and non-3GPP access. In an example, the NAS message sent by the UE 100 may be encapsulated by the in a N2 message towards the AMF 155 that may include user location information and access technology type information. In an example, the PDU session establishment request message may contain SM PDU DN request container containing information for the PDU session authorization by the external DN. In an example, if the procedure may be triggered for SSC mode 3 operation, the UE 100 may include the old PDU session ID which may indicate the PDU session ID of the on-going PDU session to be released, in the NAS message. The old PDU session ID may be an optional parameter which may be included in this case. In an example, the AMF 155 may receive from the NAS message (e.g., NAS SM message) together with user location information (e.g. cell ID in case of the RAN 105). In an example, the UE 100 may not trigger a PDU session establishment for a PDU session corresponding to a LADN when the UE 100 is outside the area of availability of the LADN.

In an example, the AMF 155 may determine that the NAS message or the SM NAS message may correspond to the request for the new PDU session based on that request type indicates initial request and that the PDU session ID may not be used for any existing PDU session(s) of the UE 100. If the NAS message does not contain an S-NSSAI, the AMF 155 may determine a default S-NSSAI for the requested PDU session either according to the UE 100 subscription, if it may contain only one default S-NSSAI, or based on operator policy. In an example, the AMF 155 may perform SMF 160 selection 1210 and select an SMF 160. If the request type may indicate initial request or the request may be due to handover from EPS, the AMF 155 may store an association of the S-NSSAI, the PDU session ID and a SMF 160 ID. In an example, if the request type is initial request and if the old PDU session ID indicating the existing PDU session may be contained in the message, the AMF 155 may select the SMF 160 and may store an association of the new PDU session ID and the selected SMF 160 ID.

In an example, the AMF 155 may send to the SMF 160, an N11 message 1215, e.g., Nsmf_PDUSession_CreateSMContext request (comprising: SUPI or PEI, DNN, S-NSSAI, PDU session ID, AMF 155 ID, request type, N1 SM container (PDU session establishment request), user location information, access type, PEI, GPSI), or Nsmf_PDUSession_UpdateSMContext request (SUPI, DNN, S-NSSAI, PDU session ID, AMF 155 ID, request type, N1 SM container (PDU session establishment request), user location information, access type, RAT type, PEI). In an example, if the AMF 155 may not have an association with the SMF 160 for the PDU session ID provided by the UE 100 (e.g when request type indicates initial request), the AMF 155 may invoke the Nsmf_PDUSession_CreateSMContext request, but if the AMF 155 already has an association with an SMF 160 for the PDU session ID provided by the UE 100 (e.g when request type indicates existing PDU session), the AMF 155 may invoke the Nsmf_PDUSession_UpdateSMContext request. In an example, the AMF 155 ID may be the UE's GUAMI which uniquely identifies the AMF 155 serving the UE 100. The AMF 155 may forward the PDU session ID together with the N1 SM container containing the PDU session establishment request received from the UE 100. The AMF 155 may provide the PEI instead of the SUPI when the UE 100 has registered for emergency services without providing the SUPI. In case the UE 100 has registered for emergency services but has not been authenticated, the AMF 155 may indicate that the SUPI has not been authenticated.

In an example, if the request type may indicate neither emergency request nor existing emergency PDU session and, if the SMF 160 has not yet registered and subscription data may not be available, the SMF 160 may register with the UDM 140, and may retrieve subscription data 1225 and subscribes to be notified when subscription data may be modified. In an example, if the request type may indicate existing PDU session or existing emergency PDU session, the SMF 160 may determine that the request may be due to handover between 3GPP access and non-3GPP access or due to handover from EPS. The SMF 160 may identify the existing PDU session based on the PDU session ID. The SMF 160 may not create a new SM context but instead may update the existing SM context and may provide the representation of the updated SM context to the AMF 155 in the response. if the request type may be initial request and if the old PDU session ID may be included in Nsmf_PDUSession_CreateSMContext request, the SMF 160 may identify the existing PDU session to be released based on the old PDU session ID.

In an example, the SMF 160 may send to the AMF 155, the N11 message response 1220, e.g., either a PDU session create/update response, Nsmf_PDUSession_CreateSMContext response 1220 (cause, SM context ID or N1 SM container (PDU session reject(cause))) or an Nsmf_PDUSession_UpdateSMContext response.

In an example, if the SMF 160 may perform secondary authorization/authentication 1230 during the establishment of the PDU session by a DN-AAA server, the SMF 160 may select a UPF 110 and may trigger a PDU session establishment authentication/authorization.

In an example, if the request type may indicate initial request, the SMF 160 may select an SSC mode for the PDU session. The SMF 160 may select one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For Unstructured PDU type the SMF 160 may allocate an IPv6 prefix for the PDU session and N6 point-to-point tunneling (based on UDP/IPv6).

In an example, if dynamic PCC is deployed, the may SMF 160 performs PCF 135 selection 1235. If the request type indicates existing PDU session or existing emergency PDU session, the SMF 160 may use the PCF 135 already selected for the PDU session. If dynamic PCC is not deployed, the SMF 160 may apply local policy.

In an example, the SMF 160 may perform a session management policy establishment procedure 1240 to establish a PDU session with the PCF 135 and may get the default PCC Rules for the PDU session. The GPSI may be included if available at the SMF 160. If the request type in 1215 indicates existing PDU session, the SMF 160 may notify an event previously subscribed by the PCF 135 by a session management policy modification procedure and the PCF 135 may update policy information in the SMF 160. The PCF 135 may provide authorized session-AMBR and the authorized 5QI and ARP to SMF 160. The PCF 135 may subscribe to the IP allocation/release event in the SMF 160 (and may subscribe other events).

In an example, the PCF 135, based on the emergency DNN, may set the ARP of the PCC rules to a value that may be reserved for emergency services.

In an example, if the request type in 1215 indicates initial request, the SMF 160 may select an SSC mode for the PDU session. The SMF 160 may select 1245 one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For unstructured PDU type the SMF 160 may allocate an IPv6 prefix for the PDU session and N6 point-to-point tunneling (e.g., based on UDP/IPv6). In an example, for Ethernet PDU type PDU session, neither a MAC nor an IP address may be allocated by the SMF 160 to the UE 100 for this PDU session.

In an example, if the request type in 1215 is existing PDU session, the SMF 160 may maintain the same IP address/prefix that may be allocated to the UE 100 in the source network.

In an example, if the request type in 1215 indicates existing PDU session referring to an existing PDU session moved between 3GPP access and non-3GPP access, the SMF 160 may maintain the SSC mode of the PDU session, e.g., the current PDU session Anchor and IP address. In an example, the SMF 160 may trigger e.g. new intermediate UPF 110 insertion or allocation of a new UPF 110. In an example, if the request type indicates emergency request, the SMF 160 may select 1245 the UPF 110 and may select SSC mode 1.

In an example, the SMF 160 may perform a session management policy modification 1250 procedure to report some event to the PCF 135 that has previously subscribed. If request type is initial request and dynamic PCC is deployed and PDU type is IPv4 or IPv6, the SMF 160 may notify the PCF 135 (that has previously subscribed) with the allocated UE 100 IP address/prefix.

In an example, the PCF 135 may provide updated policies to the SMF 160. The PCF 135 may provide authorized session-AMBR and the authorized 5QI and ARP to the SMF 160.

In an example, if request type indicates initial request, the SMF 160 may initiate an N4 session establishment procedure 1255 with the selected UPF 110. The SMF 160 may initiate an N4 session modification procedure with the selected UPF 110. In an example, the SMF 160 may send an N4 session establishment/modification request 1255 to the UPF 110 and may provide packet detection, enforcement, reporting rules, and/or the like to be installed on the UPF 110 for this PDU session. If CN tunnel info is allocated by the SMF 160, the CN tunnel info may be provided to the UPF 110. If the selective user plane deactivation is required for this PDU session, the SMF 160 may determine the Inactivity Timer and may provide it to the UPF 110. In an example, the UPF 110 may acknowledges by sending an N4 session establishment/modification response 1255. If CN tunnel info is allocated by the UPF, the CN tunnel info may be provided to SMF 160. In an example, if multiple UPFs are selected for the PDU session, the SMF 160 may initiate N4 session establishment/modification procedure 1255 with each UPF 110 of the PDU session.

In an example, the SMF 160 may send to the AMF 155 an Namf_Communication_N1N2MessageTransfer 1305 message (comprising PDU session ID, access type, N2 SM information (PDU session ID, QFI(s), QoS profile(s), CN tunnel info, S-NSSAI, session-AMBR, PDU session type, and/or the like), N1 SM container (PDU session establishment accept (QoS Rule(s), selected SSC mode, S-NSSAI, allocated IPv4 address, interface identifier, session-AMBR, selected PDU session type, and/or the like))). In case of multiple UPFs are used for the PDU session, the CN tunnel info may comprise tunnel information related with the UPF 110 that terminates N3. In an example, the N2 SM information may carry information that the AMF 155 may forward to the (R)AN 105 (e.g., the CN tunnel info corresponding to the core network address of the N3 tunnel corresponding to the PDU session, one or multiple QoS profiles and the corresponding QFIs may be provided to the (R)AN 105, the PDU session ID may be used by AN signaling with the UE 100 to indicate to the UE 100 the association between AN resources and a PDU session for the UE100, and/or the like). In an example, a PDU session may be associated to an S-NSSAI and a DNN. In an example, the N1 SM container may contain the PDU session establishment accept that the AMF 155 may provide to the UE 100. In an example, multiple QoS rules and QoS profiles may be included in the PDU session establishment accept within the N1 SM and in the N2 SM information. In an example, the Namf_Communication_N1N2MessageTransfer 1305 may further comprise the PDU session ID and information allowing the AMF 155 to know which access towards the UE 100 to use.

In an example, the AMF 155 may send to the (R)AN105 an N2 PDU session request 1310 (comprising N2 SM information, NAS message (PDU session ID, N1 SM container (PDU session establishment accept, and/or the like))). In an example, the AMF 155 may send the NAS message 1310 that may comprise PDU session ID and PDU session establishment accept targeted to the UE 100 and the N2 SM information received from the SMF 160 within the N2 PDU session request 1310 to the (R)AN 105.

In an example, the (R)AN 105 may issue AN specific signaling exchange 1315 with the UE 100 that may be related with the information received from SMF 160. In an example, in case of a 3GPP RAN 105, an RRC connection reconfiguration procedure may take place with the UE 100 to establish the necessary RAN 105 resources related to the QoS Rules for the PDU session request 1310. In an example, (R)AN 105 may allocate (R)AN 105 N3 tunnel information for the PDU session. In case of dual connectivity, the master RAN 105 node may assign some (zero or more) QFIs to be setup to a master RAN 105 node and others to the secondary RAN 105 node. The tunnel info may comprise a tunnel endpoint for each involved RAN 105 node, and the QFIs assigned to each tunnel endpoint. A QFI may be assigned to either the master RAN 105 node or the secondary RAN 105 node. In an example, (R)AN 105 may forward the NAS message 1310 (PDU session ID, N1 SM container (PDU session establishment accept)) to the UE 100. The (R)AN 105 may provide the NAS message to the UE 100 if the necessary RAN 105 resources are established and the allocation of (R)AN 105 tunnel information are successful.

In an example, the N2 PDU session response 1320 may comprise a PDU session ID, cause, N2 SM information (PDU session ID, AN tunnel info, list of accepted/rejected QFI(s)), and/or the like. In an example, the tunnel info may correspond to the access network address of the N3 tunnel corresponding to the PDU session.

In an example, the AMF 155 may forward the N2 SM information received from (R)AN 105 to the SMF 160 via a Nsmf_PDUSession_UpdateSMContext request 1330 (comprising: N2 SM information, request type, and/or the like). In an example, if the list of rejected QFI(s) is included in N2 SM information, the SMF 160 may release the rejected QFI(s) associated QoS profiles.

In an example, the SMF 160 may initiate an N4 session modification procedure 1335 with the UPF110. The SMF 160 may provide AN tunnel info to the UPF 110 as well as the corresponding forwarding rules. In an example, the UPF 110 may provide an N4 session modification response 1335 to the SMF 160160.

In an example, the SMF 160 may send to the AMF 155 an Nsmf_PDUSession_UpdateSMContext response 1340 (Cause). In an example, the SMF 160 may subscribe to the UE 100 mobility event notification from the AMF 155 (e.g. location reporting, UE 100 moving into or out of area of interest), after this step by invoking Namf_EventExposure Subscribe service operation. For LADN, the SMF 160 may subscribe to the UE 100 moving into or out of LADN service area event notification by providing the LADN DNN as an indicator for the area of interest. The AMF 155 may forward relevant events subscribed by the SMF 160.

In an example, the SMF 160 may send to the AMF 155, a Nsmf_PDUSession_SMContextStatusNotify (release) 1345. In an example, if during the procedure, any time the PDU session establishment is not successful, the SMF 160 may inform the AMF 155 by invoking Nsmf_PDUSession_SMContextStatusNotify(release) 1345. The SMF 160 may releases any N4 session(s) created, any PDU session address if allocated (e.g IP address) and may release the association with the PCF 135.

In an example, in case of PDU type IPv6, the SMF 160 may generate an IPv6 Router Advertisement 1350 and may send it to the UE 100 via N4 and the UPF 110.

In an example, if the PDU session may not be established, the SMF 160 may unsubscribe 1360 to the modifications of session management subscription data for the corresponding (SUPI, DNN, S-NSSAI), using Nudm_SDM_Unsubscribe (SUPI, DNN, S-NSSAI), if the SMF 160 is no more handling a PDU session of the UE 100 for this (DNN, S-NSSAI). In an example, if the PDU session may not be established, the SMF 160 may deregister 1360 for the given PDU session using Nudm_UECM_Deregistration (SUPI, DNN, PDU session ID).

Figure 14:
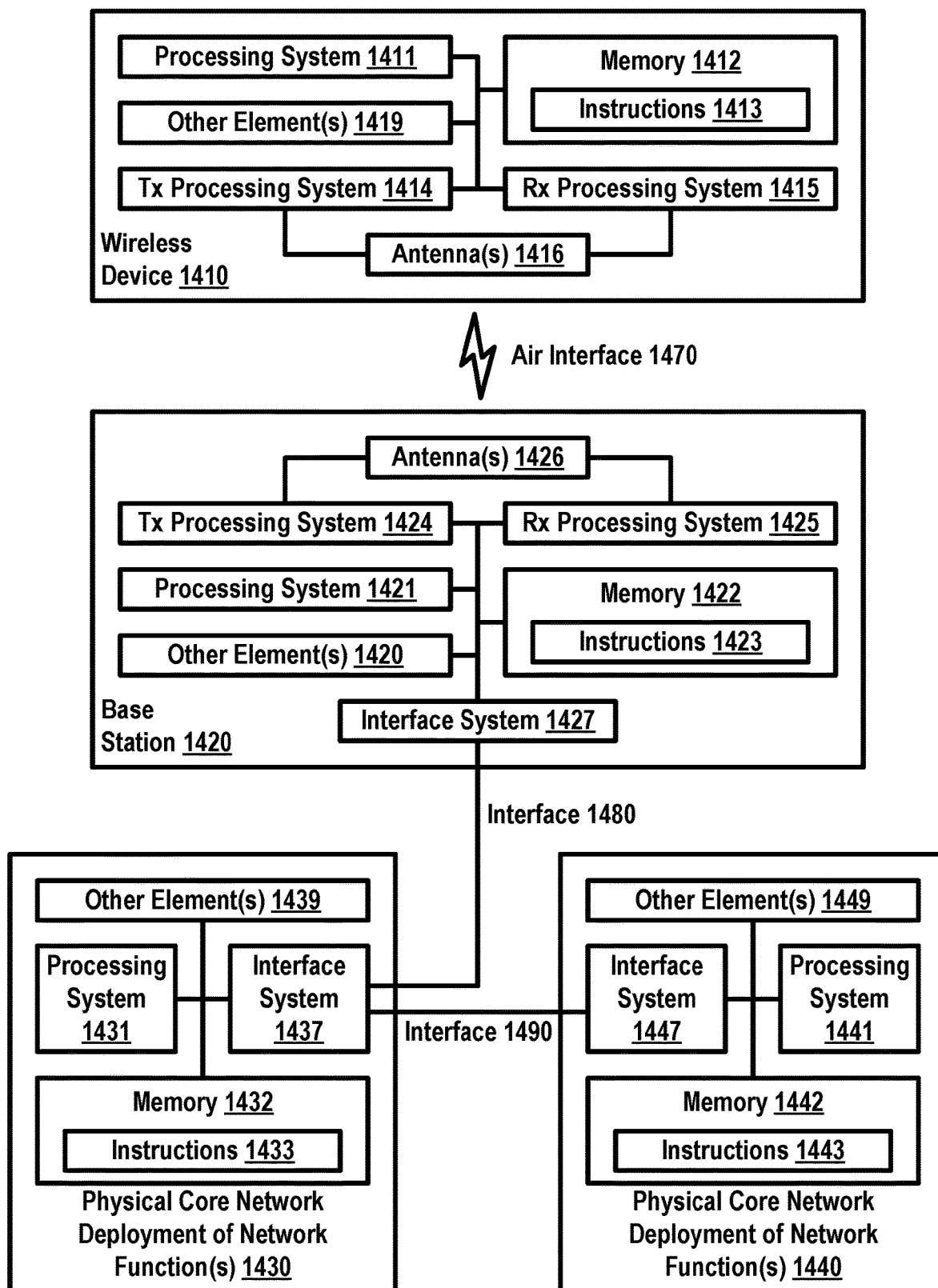
FIG. 14 illustrates an example mobile communication networks as per an aspect of an embodiment of the present disclosure.

FIG. 14 illustrates another example of a mobile communication network in which embodiments of the present disclosure may be implemented. The mobile communication network depicted in FIG. 14 includes a wireless device 1410, a base station 1420, a physical core network deployment of one or more network functions 1430 (henceforth "CN deployment 1430"), and a physical core network deployment of one or more network functions 1440 (henceforth "CN deployment 1440"). The deployment 1430 and the deployment 1440 may be elements of a core network.

The wireless device 1410 may communicate with the base station 1420 over an air interface 1470. The communication direction from the wireless device 1410 to the base station 1420 over the air interface is known as uplink, and the communication direction from the base station 1420 to the wireless device 1410 over the air interface 1470 is known as downlink. Downlink transmissions may be separated from uplink transmissions using FDD, TDD, and/or some combination of the two duplexing techniques. FIG. 14 shows a single wireless device 1410 and a single base station 1420, but it will be understood that the wireless device 1410 may communicate with any number of base stations or other access network components over the air interface 1470, and that the base station 1420 may communicate with any number of wireless devices over the air interface 1470.

The wireless device 1410 may comprise a processing system 1411 and a memory 1412. The memory 1412 may comprise one or more computer-readable media, for example, one or more non-transitory computer readable media. The memory 1412 may include instructions 1413. The processing system 1411 may process and/or execute the instructions 1413. Processing and/or execution of the instructions 1413 may cause the processing system 1411 to perform one or more functions or activities. The memory 1412 may include data (not shown). One of the functions or activities performed by the processing system 1411 may be to store data in the memory 1412 and/or retrieve previously-stored data from the memory 1412. In an example, downlink data received from the base station 1420 may be stored in the memory 1412, and uplink data for transmission to the base station 1420 may be retrieved from the memory 1412. The wireless device 1410 may communicate with the base station 1420 using a transmission processing system 1414 and a reception processing system 1415. The wireless device 1410 may comprise one or more antennas 1416 to access the air interface 1470. Although not shown in FIG. 14, the transmission processing system 1414 and/or the reception processing system 1415 may be coupled to a dedicated memory that is analogous to but separate from the memory 1412, and comprises instructions that may be processed and/or executed to carry out one or more of their respective functionalities.

The wireless device 1410 may comprise one or more other elements 1419. The one or more other elements 1419 may comprise software and/or hardware that provide features and/or functionalities, for example, a speaker, a microphone, a keypad, a display, a touchpad, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, a global positioning sensor (GPS) and/or the like). The wireless device 1410 may receive user input data from and/or provide user output data to the one or more one or more other elements 1419. The one or more other elements 1419 may comprise a power source. The wireless device 1410 may receive power from the power source and may be configured to distribute the power to the other components in the wireless device 1410. The power source may comprise one or more sources of power, for example, a battery, a solar cell, a fuel cell, or any combination thereof.

The wireless device 1410 may transmit data to the base station 1420 via the air interface 1470. To perform the transmission, the processing system 1411 may implement layer 3 and layer 2 open systems interconnection (OSI) functionality to process the data for uplink transmission. Layer 3 may include a radio resource control layer (RRC). Layer 14 may include a service data application protocol layer (SDAP), a packet data convergence protocol layer (PDCP), a radio link control layer (RLC), and a media access control layer (MAC). The data may be provided to the transmission processing system 1414, which may implement layer 1 OSI functionality. Layer 1 may include a physical layer (PHY). The wireless device 1410 may transmit the data over the air interface 1470 using one or more antennas 1416. For scenarios where the one or more antennas 1416 include multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The wireless device 1410 may receive downlink data from the base station 1420 over the air interface 1470. The downlink data may be received via the one or more antennas 1416. The reception processing system 1415 may implement layer 1 OSI functionality on the received downlink data and may provide the data to the processing system 1411. The processing system 1411 may implement layer 2 and layer 3 OSI functionality to process the received downlink data. The base station 1420 may comprise elements analogous to the elements of the wireless device 1410. The base station 1420 may comprise a processing system 1421 and a memory 1422. The memory 1422 may comprise one or more computer-readable media, for example, one or more non-transitory computer readable media. The memory 1422 may include instructions 1423. The processing system 1421 may process and/or execute the instructions 1423. Processing and/or execution of the instructions 1423 may cause the processing system 1421 to perform one or more functions or activities. The memory 1422 may include data (not shown). One of the functions or activities performed by the processing system 1421 may be to store data in the memory 1422 and/or retrieve previously-stored data from the memory 1422. The base station 1420 may communicate with the wireless device 1410 using a transmission processing system 1424 and a reception processing system 1425. The base station 1420 may comprise one or more antennas 1426 to access the air interface 1470. The processing system 1421 may implement layer 14 and layer 3 OSI functionality. The transmission processing system 1424 and the reception processing system 1425 may implement layer 1 OSI functionality to perform transmission of downlink data and reception of uplink data, respectively.

The base station 1420 may comprise an interface system 1427. The interface system 1427 may communicate with one or more elements of the core network via an interface 1480. The interface 1480 may be wired and/or wireless and the interface system 1427 may include one or more components suitable for communicating via the interface 1480. In FIG. 14, the interface 1480 connects the base station 1420 to a single CN deployment 1430, but it will be understood that the wireless device 1410 may communicate with any number of CN deployments over the interface 1480, and that the CN deployment 1430 may communicate with any number of base stations over the interface 1480. The base station 1420 may comprise one or more other elements 1429 analogous to one or more of the one or more other elements 1419.

The CN deployment 1430 may comprise one or more network functions (NFs). For example, the CN deployment 1430 may comprise an AMF and/or a UPF analogous to the AMF and UPF depicted in FIG. 1. The CN deployment 1430 may comprise elements analogous to the elements of the wireless device 1410 and the base station 1420, as described above. The CN deployment 1430 may comprise a processing system 1431 and a memory 1432. The memory 1432 may comprise one or more computer-readable media, for example, one or more non-transitory computer readable media. The memory 1432 may include instructions 1433. The processing system 1431 may process and/or execute the instructions 1433. Processing and/or execution of the instructions 1433 may cause the processing system 1431 to perform one or more functions or activities. The memory 1432 may include data (not shown). One of the functions or activities performed by the processing system 1431 may be to store data in the memory 1432 and/or retrieve previously-stored data from the memory 1432. The CN deployment 1430 may access the interface 1480 using an interface system 1437. The CN deployment 1430 may also use the interface system 1437 to access an interface 1490. The CN deployment 1430 may use the interface 1490 to communicate with one or more data networks (analogous to, for example, the DN(s) depicted in FIG. 1 and/or one or more other CN deployments, including the CN deployment 1440 depicted in FIG. 14. The CN deployment 1430 may comprise one or more other elements 1439.

The CN deployment 1440 may comprise elements analogous to the elements of the CN deployment 1430, as described above. The CN deployment 1440 may comprise a processing system 1441 and a memory 1442. The memory 1442 may comprise one or more computer-readable media, for example, one or more non-transitory computer readable media. The memory 1442 may include instructions 1443. The processing system 1441 may process and/or execute the instructions 1443. Processing and/or execution of the instructions 1443 may cause the processing system 1441 to perform one or more functions or activities. The memory 1442 may include data (not shown). One of the functions or activities performed by the processing system 1441 may be to store data in the memory 1442 and/or retrieve previously-stored data from the memory 1442. The CN deployment 1440 may access the interface 1490 using an interface system 1447. The CN deployment 1440 may comprise one or more other elements.

The processing system 1411, the processing system 1421, the processing system 1431, and/or the processing system 1441 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1411, the processing system 1421, the processing system 1431, and/or the processing system 1441 may perform signal coding/processing, data processing, power control, input/output processing, and/or any other functionality that may enable the wireless device 1410, base station 1420, CN deployment 1430, and/or CN deployment 1440 to operate in a mobile communications system.

Each CN deployment may comprise one or more network functions. Depending on the context in which the term is used, a network function (NF) may refer to a particular set of functionalities and/or one or more physical elements configured to perform those functionalities (e.g., a processing system and memory comprising instructions that, when executed by the processing system, cause the processing system to perform the functionalities). There are many different types of NF and each type of NF may be associated with a different set of functionalities. Different NFs may be flexibly deployed at different locations (for example, in different physical core network deployments) or in a same location (for example, co-located in the same physical core network deployment). Moreover, physical CN deployment are not limited to implementation of NFs. For example, a particular physical CN deployment may further include a base station or portions therefor and/or a data network or portions thereof. Accordingly, one or more NFs implemented on a particular physical core network deployment may be co-located with one or more non-core elements, including elements of an access network or data network.

Figure 15:
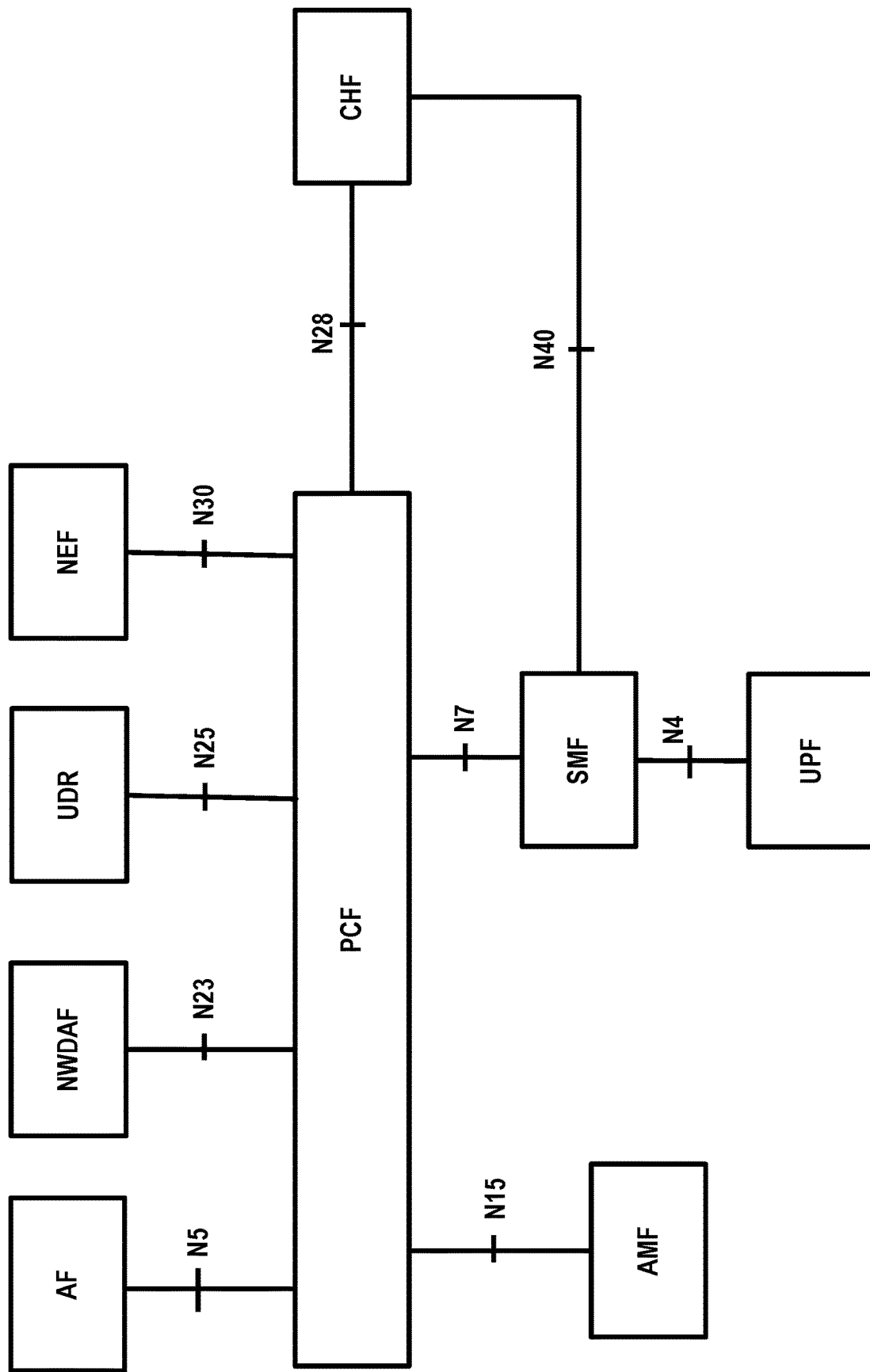
FIG. 15 is a diagram of an example 5G policy and charging control system architecture as per an aspect of an embodiment of the present disclosure.

In an example, FIG. 15 is a diagram of 5G policy and charging control system architecture. The reference architecture of policy and charging control framework for the 5G system may comprise one or more of the following network functions: policy control function (PCF), session management function (SMF), user plane function (UPF), access and mobility management function (AMF), network exposure functionality (NEF), network data analytics function (NWDAF), charging function (CHF), application function (AF) and unified data repository (UDR).

In an example, the CHF may support at least one charging method: offline charging, online charging, or converged charging. In an example, the offline charging may be a process where charging information for network resource usage may be collected concurrently with that resource usage. At the end of the process, CDR files may be generated by the network, which may be transferred to a network operator's billing domain (BD) for the purpose of subscriber billing and/or inter-operator accounting (or additional functions, e.g. statistics, at the operator's discretion). The BD typically comprises post-processing systems such as the operator's billing system or billing mediation device. In an example conclusion, offline charging may be a mechanism where charging information does not affect, in real-time, the service rendered. In an example, online charging may be a process where charging information for network resource usage may be collected concurrently with that resource usage in the same fashion as in offline charging. However, authorization for the network resource usage may be obtained by the network prior to the actual resource usage to occur. In an example, the charging information utilized in online charging may be not necessarily identical to the charging information employed in offline charging. In an example conclusion, online charging may be a mechanism where charging information may affect, in real-time, the service rendered and therefore a direct interaction of the charging mechanism with the control of network resource usage may be required. In an example, converged charging may be a process where online and offline charging may be combined.

Figure 16:
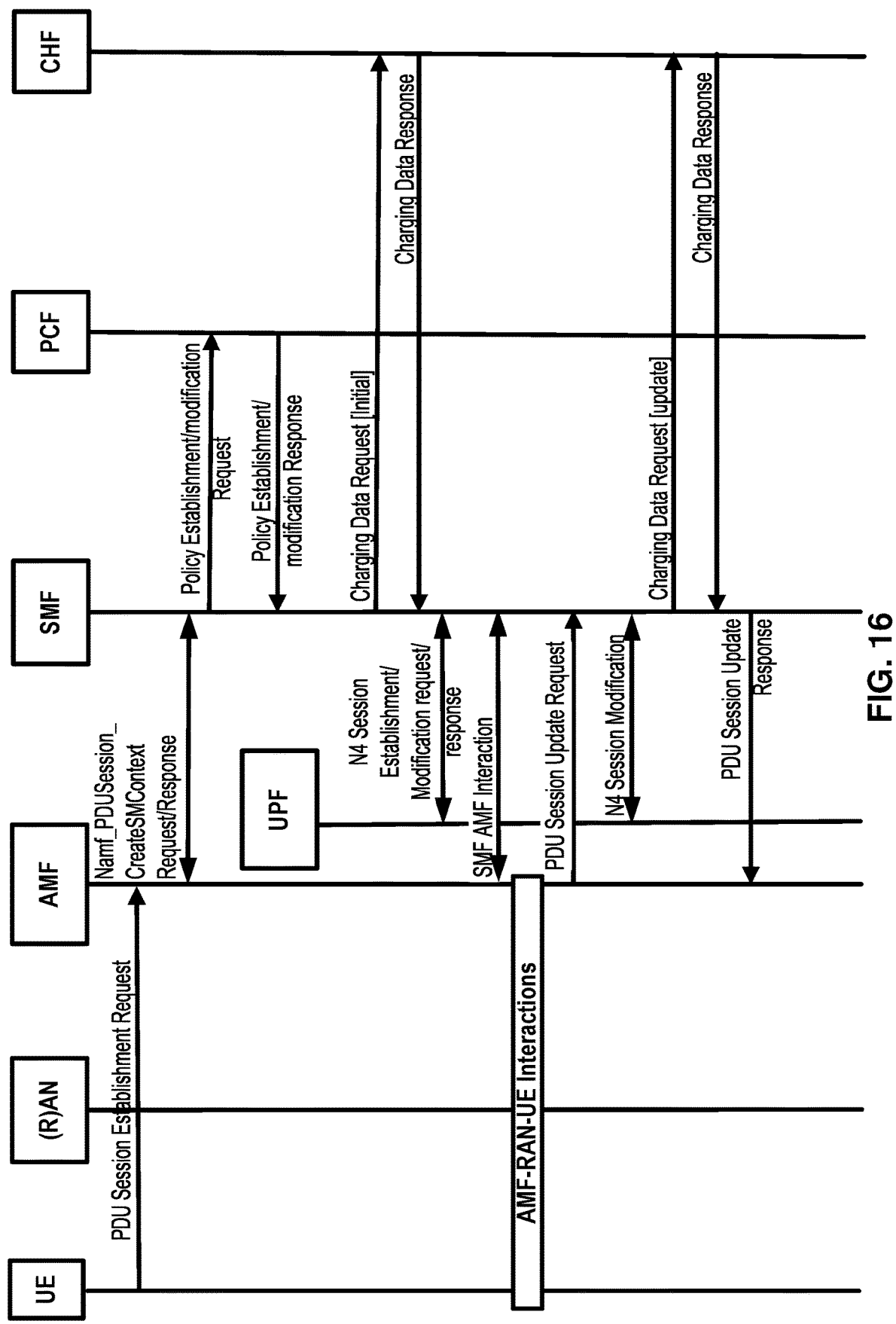
FIG. 16 is an example call flow for PDU session establishment charging as per an aspect of an embodiment of the present disclosure.

FIG. 16 is an example call flow for PDU session establishment charging as per an aspect of an embodiment of the present disclosure. In an example, a UE may initiate a PDU Session establishment procedure. A PDU Session Establishment Request may comprise one or more of: PDU Session ID, PDU Type, SSC mode, User location information and Access Technology Type Information. In response to the message received from the UE, an AMF may select an SMF and send to the selected SMF a message (e.g. Namf_PDUSession_CreateSMContext Request). The SMF may send to the AMF a response message (e.g. Namf_PDUSession_CreateSMContext Response).

In an example, the SMF may select a PCF and send to the PCF a message (e.g. SM Policy Association Establishment Request) to request PCC rules, and the PCF may provide PCC rules in a response message (e.g. SM Policy Association Establishment response). In an example, the SMF may create a Charging Id for the PDU session and may send a Charging Data Request [initial] message to a CHF for authorization for the subscriber to start the PDU session which is triggered by start of PDU session charging event. In an example, the CHF may open CDR for this PDU session and may acknowledge by sending a Charging Data Response [Initial] to the SMF. In an example, the SMF select a UPF and may initiate an N4 Session Establishment/Modification procedure with the selected UPF. The SMF may interact with the AMF, in an example, the SMF may send to the AMF a Namf_Communication_N1N2MessageTransfer message comprising one or more of: PDU Session ID, QoS Profile(s), CN Tunnel Info, and S-NSSAI from the Allowed NSSAI. In an example, the AMF may interact with (R)AN and UE by sending to the (R)AN a N2 PDU Session Request message comprising the information received from the SMF, indicating the PDU session establishment is accepted.

In an example, the (R)AN may send to the AMF a N2 PDU Session Response message comprising one or more of: PDU Session ID, N2 SM information (PDU Session ID, AN Tunnel Info, List of accepted/rejected QFI(s)), wherein the Tunnel Info may be corresponding to the Access Network address of the N3 tunnel corresponding to the PDU Session. In an example, the AMF may send to the SMF a Nsmf_PDUSession_UpdateSMContext Request message comprising the N2 SM information received from (R)AN to the SMF. In an example, the SMF may initiate an N4 Session Modification procedure with the UPF. The SMF may provide AN Tunnel Info to the UPF as well as the corresponding forwarding rules. The UPF may send to the SMF a response message. In an example, the SMF may request quota from CHF, e.g. "start of service data flow" event may need quota from CHF. The SMF may send a message to the CHF (e.g. Charging Data Request [update]). As an example, for online charging or converged charging, the SMF may request quota from CHF when allocated quota is consumed or a trigger is met to request a quota.

In an example, the UPF may report resource usage of a PDU session to the SMF. As an example, the UPF may report resource usage of a wireless device to the SMF. by enforcing the charging control rules, the SMF may send to the CHF a message (e.g. Charging Data Request [update]) comprising resource usage information received from the UPF. In an example, the CHF may update CDR for this PDU session. The CHF may acknowledge the SMF by sending a Charging Data Response message. In an example, the SMF may send to the AMF a Nsmf_PDUSession_UpdateSMContext Response message.

Figure 17:
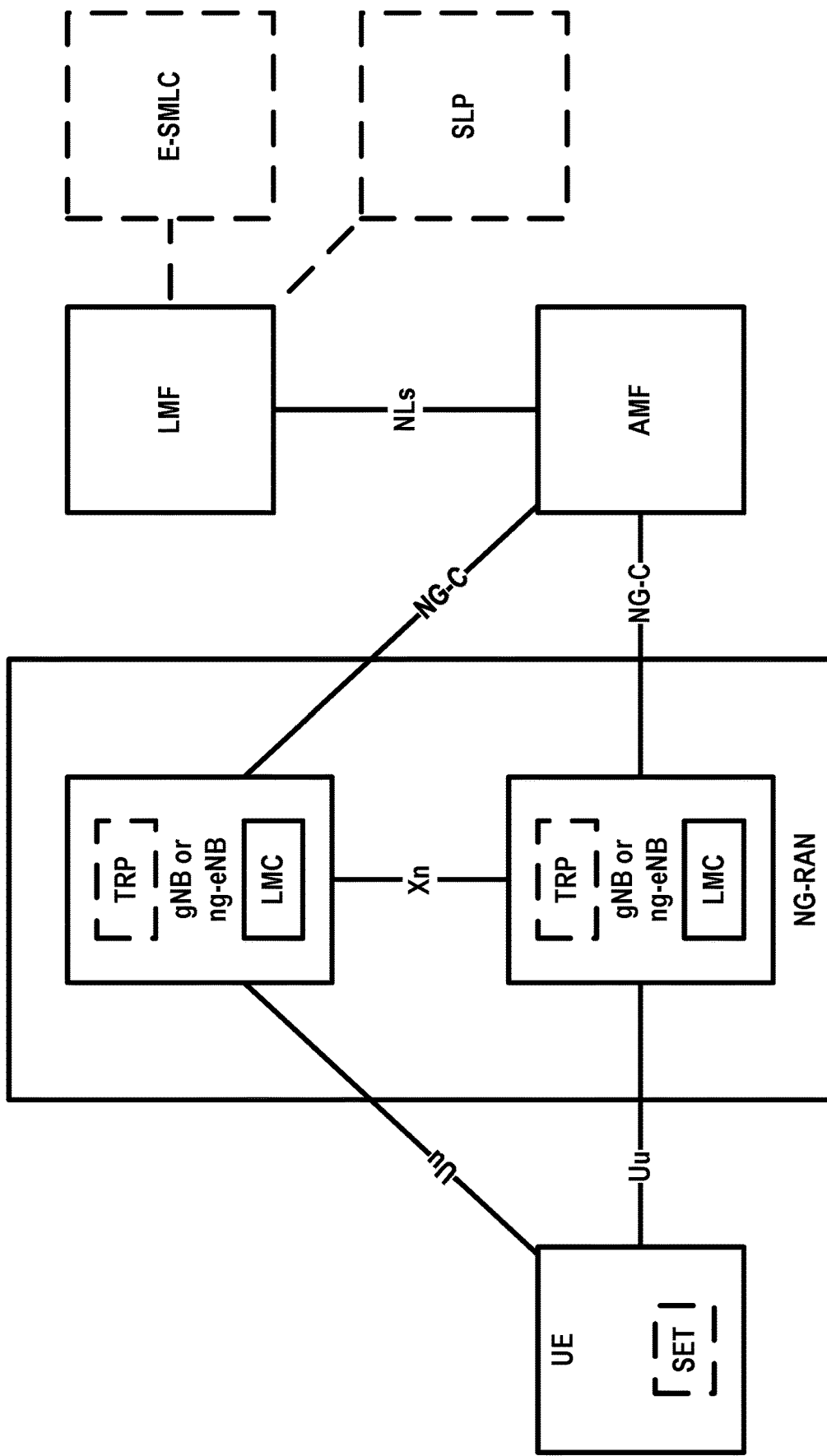
FIG. 17 is a first example arrangement of a local location management component (LMC) associated with a base station as per an aspect of an embodiment of the present disclosure.

FIG. 17 is a diagram of a first example arrangement of a local location management component (LMC) associated with a base station as per an aspect of an embodiment of the present disclosure. In an example architecture, the LMC may be an internal function of the NG-RAN node. In case of split gNB, the LMC may be located in the gNB-CU-CP. The interface between the LMC and the serving NG-RAN node may be internal, and therefore may minimize the latency between the LMC and serving NG-RAN node. Functions of the NLs interface (e.g. an NL1 interface between an AMF and LMF) could be specified also for the NG-C interface. The characteristics of this example architecture may be that no new interface is needed. The characteristics of this example architecture may be that positioning-related signalling is internal to the gNB when UE positioning involves only transmission and reception points (TRPs) within the NG-RAN node. The characteristics of this example architecture may be that to support location continuity in case of handover, LMC relocation to the target NG-RAN node may be enabled via enhancements to the XnAP Handover Preparation procedure.

Figure 18:
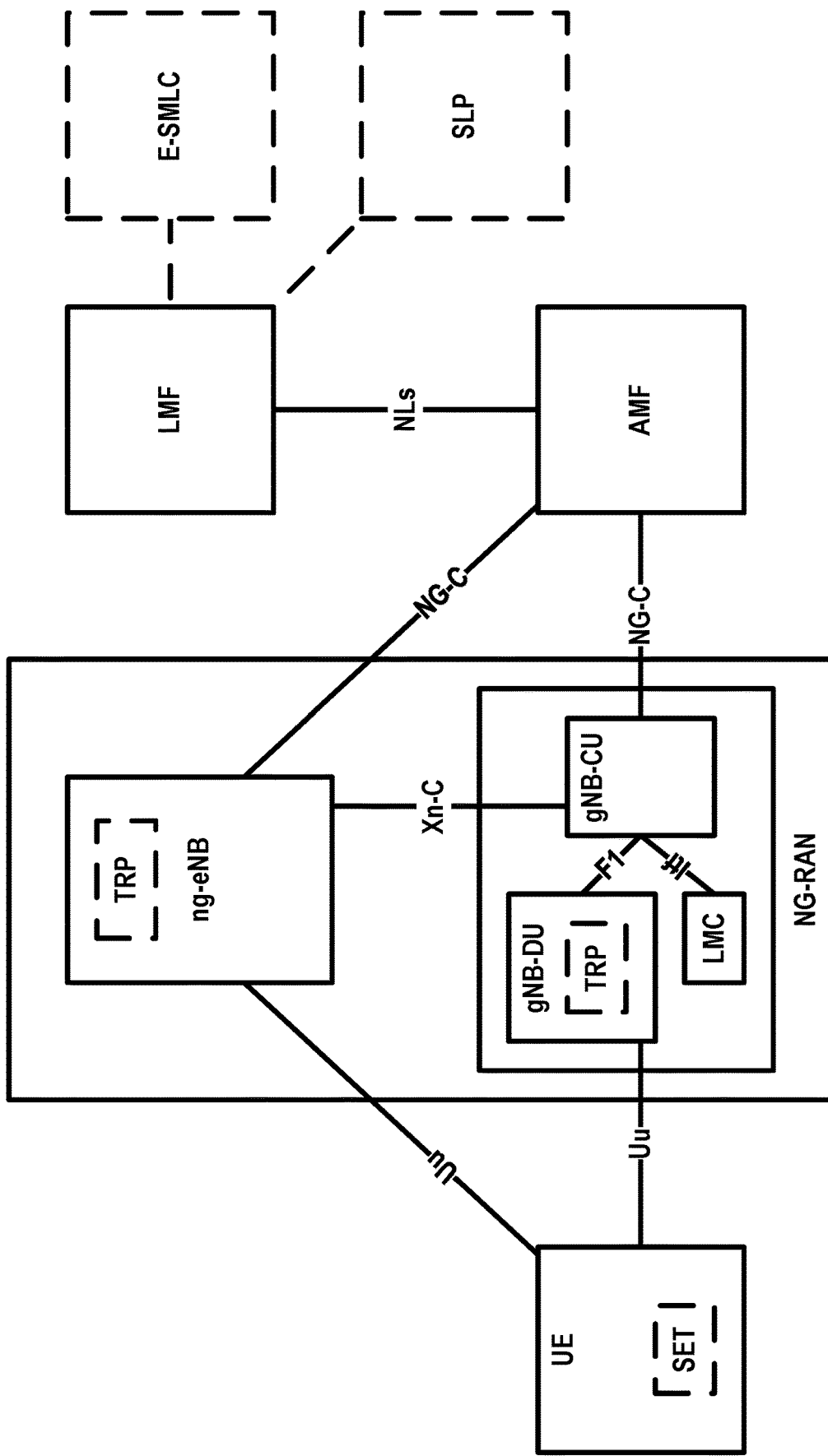
FIG. 18 is a diagram of a second example arrangement of an LMC associated with a base station as per an aspect of an embodiment of the present disclosure.

FIG. 18 is a diagram of a second example arrangement of an LMC associated with a base station as per an aspect of an embodiment of the present disclosure. In an example architecture, the LMC may be a logical node within the split gNB connected to the gNB-CU-CP via a new interface. This example architecture may require a dedicated interface between the LMC and the serving NG-RAN node. The impacts to the NG-C interface may be the same as the example architecture in FIG. 17. The characteristics of this example architecture may be that new interface between the LMC and the gNB-CU-CP is needed. The characteristics of this example architecture may be that LMC and gNB-CU-CP may be provided by different vendors. The characteristics of this example architecture may be that offloading of positioning support from a gNB-CU is allowed.

Figure 19:
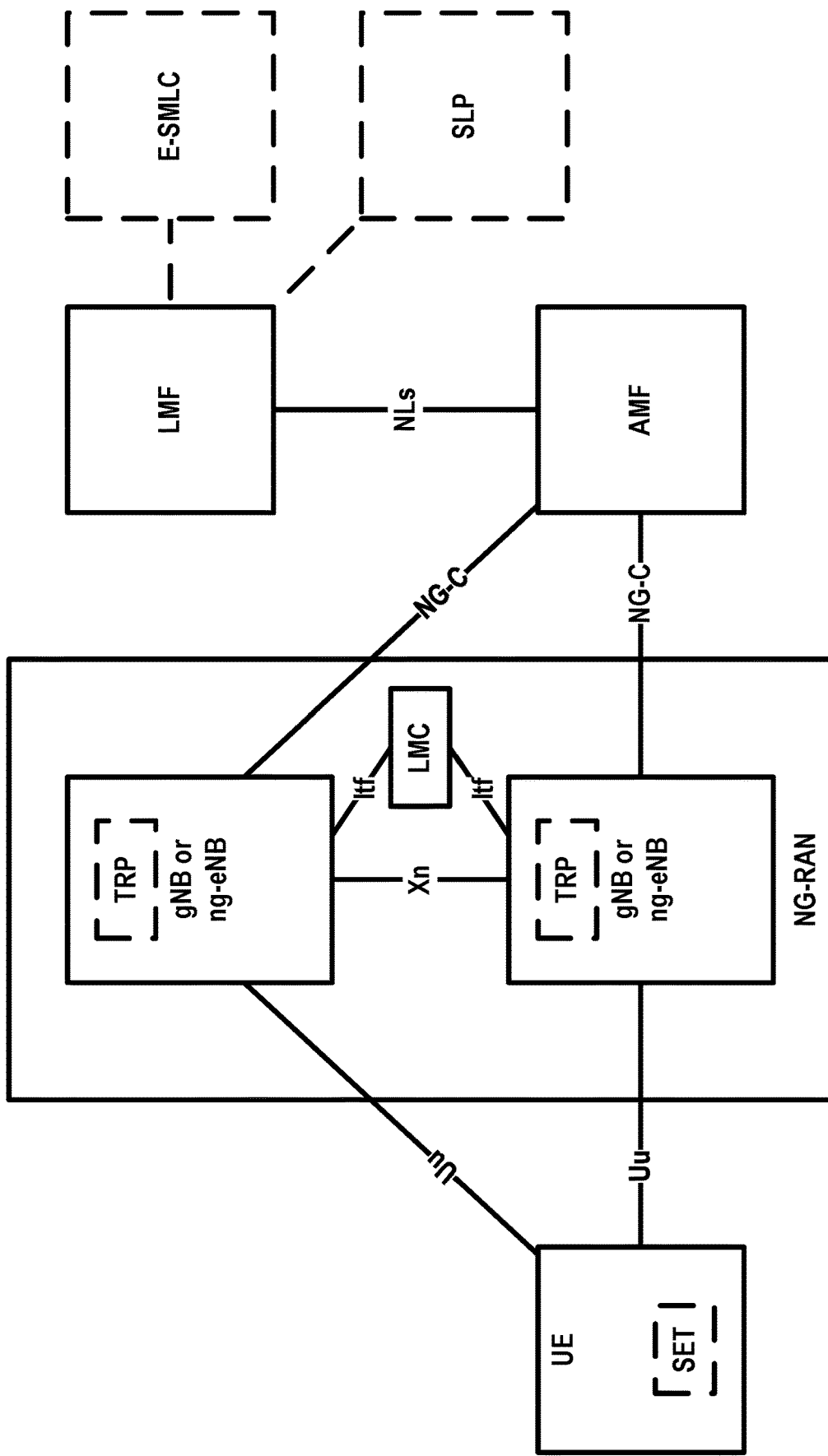
FIG. 19 is a third example arrangement of an LMC associated with a base station as per an aspect of an embodiment of the present disclosure.

FIG. 19 is a diagram of a third example arrangement of an LMC associated with a base station as per an aspect of an embodiment of the present disclosure. In an example architecture, the LMC may be a new logical node outside or inside a NG-RAN, connected to NG-RAN nodes (gNBs and/or ng-eNBs) via a new interface. This example architecture may require a dedicated interface between the LMC and the serving NG-RAN node. The impacts to the NG-C interface may be the same as the example architecture in FIG. 17 and may be supported by the new interface. The characteristics of this example architecture may be that new interface between the LMC and the NG-RAN node is needed. The characteristics of this example architecture may be that LMC and NG-RAN nodes may be provided by different vendors. The characteristics of this example architecture may be that a single LMC may support multiple NG-RAN nodes (i.e. avoid introducing LMC in each individual NG-RAN node). The characteristics of this example architecture may be that offloading of positioning support from a gNB-CU is allowed. The characteristics of this example architecture may be that to support location continuity in case of handover when both source and target NG-RAN nodes are served by the same LMC, LMC relocation may not be needed.

Figure 20:
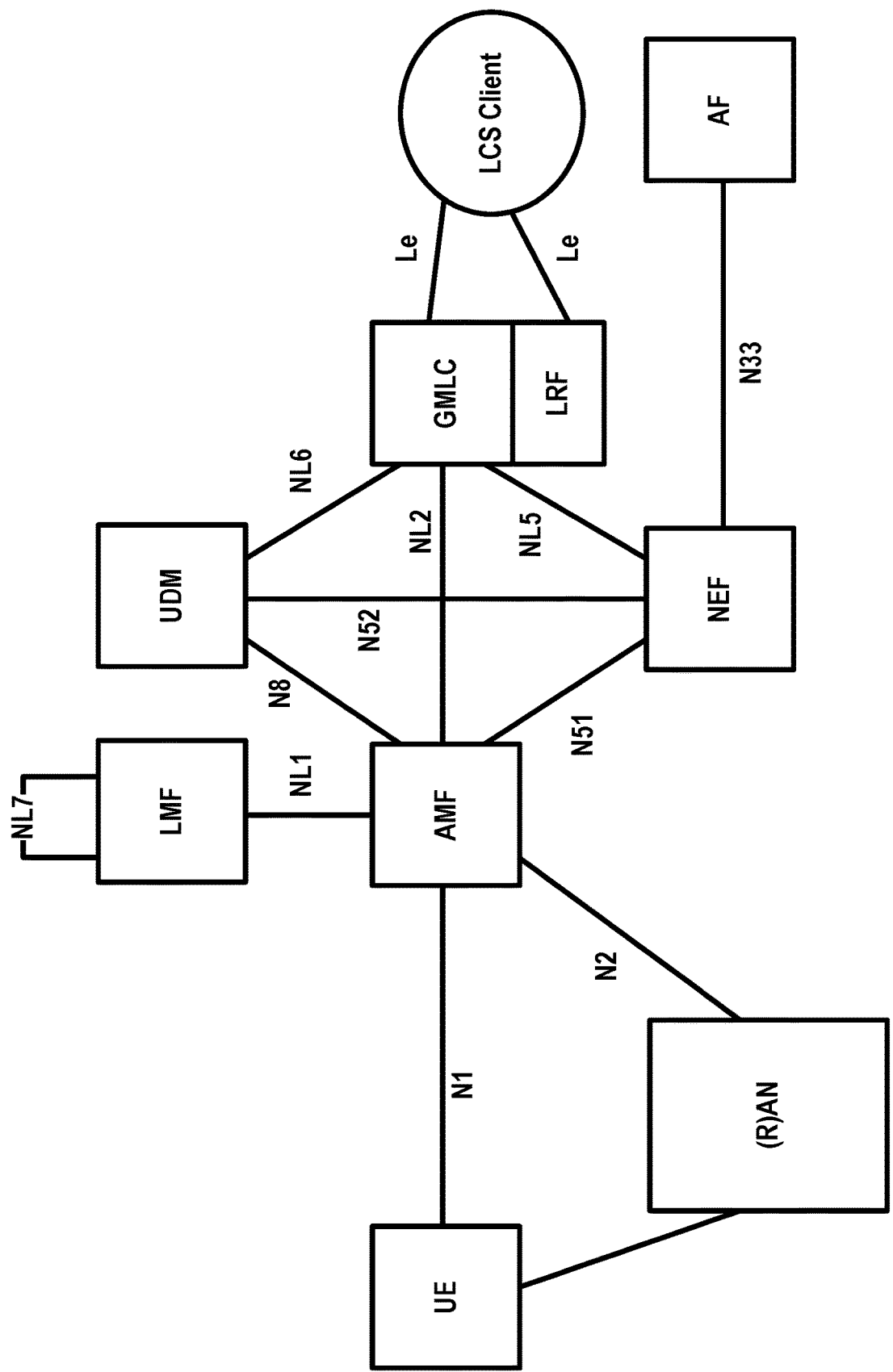
FIG. 20 is a diagram of an example architecture for location service as per an aspect of an embodiment of the present disclosure.

FIG. 20 is a diagram of an example architecture for location service as per an aspect of an embodiment of the present disclosure. In an example, an access network may be involved in the handling of various positioning procedures including positioning of a target UE, provision of location related information not associated with a particular target UE and transfer of positioning messages between an AMF or LMF and a target UE. In an example, AFs and NFs may access LCS services from a GMLC in the same trust domain (e.g. in the same PLMN) using the Ngmlc interface or Event Exposure with location information from an AMF in the same trust domain using the Namf interface. LCS clients may access LCS services from a GMLC (e.g. HGMLC) using the Le reference point. External AFs may access LCS services from a NEF using Nnef interface. A Gateway Mobile Location Centre (GMLC) may contain functionality required to support LCS. In one PLMN, there may be more than one GMLC. A GMLC is the first node an external LCS client accesses in a PLMN (i.e. the Le reference point is supported by the GMLC). AFs and NFs may access GMLC directly or via NEF. The GMLC may request routing information and/or target UE privacy information from a UDM via the Nudm interface. After performing authorization of an external LCS Client or AF and verifying target UE privacy, a GMLC may forward a location request to either a serving AMF using Namf interface or to a GMLC in another PLMN using the Ngmlc interface in the case of a roaming UE. A location retrieval function (LRF) may be collocated with a GMLC or separate. The LRF is responsible for retrieving or validating location information, providing routing and/or correlation information for a UE which has initiated an IMS emergency session. The information may be provided by an LRF to an E-CSCF.

In an example, a UE may support positioning with four different modes. A UE may support positioning with UE assisted mode, where the UE may perform location measurements and send the measurements to another entity (e.g. an LMF) to compute a location. A UE may support positioning with UE based mode, where the UE may perform location measurements and computes a location estimate making use of assistance data provided by serving PLMN. A UE may support positioning with standalone mode, where the UE may perform location measurements and compute a location estimate without making use of assistance data provided by serving PLMN. A UE may support positioning with network based mode, where a serving PLMN may perform location measurements of signals transmitted by a target UE and compute a location estimate.

In an example, the transmission of UE signals for network based mode may or may not be transparent to the UE. A limited set of UE positioning capability information may be transferred to the 5GCN during registration of the UE. Some of this positioning capability information may be transferred subsequently to an LMF. UE positioning capability information may also be transferred directly to a location server (e.g. LMF). A UE may support additional functions to support location services. For example, a UE may support location requests received from a network for 5GC-MT-LR, 5GC-NI-LR or a deferred 5GC-MT-LR for periodic or triggered location. For example, a UE may support location requests to a network for a 5GC-MO-LR. For example, a UE may support privacy notification and verification for a 5GC-MT-LR or deferred 5GC-MT-LR for periodic or triggered location. For example, a UE may support sending updated privacy requirements to a serving AMF (for transfer to a UDR via UDM). For example, a UE may support periodic or triggered location reporting to an LMF. For example, a UE may support change of a serving LMF for periodic or triggered location reporting. For example, a UE may support cancelation of periodic or triggered location reporting. For example, a UE may support multiple simultaneous location sessions. For example, a UE may support reception of unciphered and/or ciphered assistance data broadcast by NG-RAN. For example, a UE may support reception of ciphering keys for the assistance data from the AMF.

In an example, an AMF may contain functionality responsible for managing positioning for a target UE for all types of location request. The AMF may be accessible to the GMLC and NEF via the Namf interface, to the RAN via the N2 reference point and to the UE via the N1 reference point. The AMF may perform one or more functions to support location services. For example, the AMF may initiate an NI-LR location request for a UE with an IMS emergency call. For example, the AMF may receive and manage location requests from a GMLC for a 5GC-MT-LR and deferred 5GC-MT-LR for periodic, triggered and UE available location events. For example, the AMF may receive and manage location requests from a UE for a 5GC-MO-LR. For example, the AMF may receive and manage event exposure request for location information from an NEF. For example, the AMF may select an LMF, optionally taking into account UE access type(s), serving AN node, network slicing, QoS, LCS Client type, RAN configuration information, LMF capabilities, LMF load. LMF location, indication of either a single event report or multiple event reports, duration of event reporting. For example, the AMF may receive updated privacy requirements from a UE and transfer to a UDR via UDM. For example, the AMF may support cancelation of periodic or triggered location reporting for a target UE. For example, the AMF may support change of a serving LMF for periodic or triggered location reporting for a target UE. For example, when assistance data is broadcast by 5GS in ciphered form, the AMF may receive ciphering keys from the LMF and forwards to suitably subscribed UEs using mobility management procedures.

In an example, an LMF may manage the overall co-ordination and scheduling of resources required for the location of a UE that is registered with or accessing 5GCN. It may calculate or verify a final location and any velocity estimate and may estimate the achieved accuracy. The LMF may receive location requests for a target UE from the serving AMF using the Nlmf interface. The LMF may interact with the UE in order to exchange location information applicable to UE assisted and UE based position methods. The LMF may interact with the NG-RAN, N3IWF or TNAN in order to obtain location information. The LMF may determine the result of the positioning in geographical co-ordinates. If requested and if available, the positioning result may comprise the velocity of the UE. The LMF may perform additional functions to support location services. For example, the LMF may support a request for a single location received from a serving AMF for a target UE. For example, the LMF may support a request for periodic or triggered location received from a serving AMF for a target UE. For example, the LMF may determine position methods based on UE and PLMN capabilities, QoS and LCS Client type. For example, the LMF may report UE location estimates directly to a GMLC for periodic or triggered location of a target UE. For example, the LMF may support cancelation of periodic or triggered location for a target UE. For example, the LMF may support the provision of broadcast assistance data to UEs via NG-RAN in ciphered or unciphered form and forward any ciphering keys to subscribed UEs via the AMF.

In an example, LMF selection functionality may be used by the AMF to determine an LMF for location estimation of the target UE. If an LMF ID is available in the UE location context or provided by the UE, the AMF may first evaluate if the LMF identified by the LMF ID can be used. The LMF selection functionality may be supported by the LMF if it determines that it is unsuitable or unable to support location for the current UE access network or serving cell for the deferred 5GC-MT-LR procedure for periodic, or triggered location events. LMF reselection may be a functionality supported by AMF when necessary, e.g. due to UE mobility. The AMF may select a new LMF if the AMF determines that LMF identified by the LMF ID may not be used. The AMF may select a new LMF if the LMF ID is not available in the UE location context. The AMF may select a new LMF if the LMF ID is not provided by the UE. The LMF selection may be performed at the AMF or LMF based on the locally available information i.e. LMF profiles are configured locally at AMF or LMF, or by querying NRF. LMF selection may performed when a location request is received at the AMF and the AMF determines to use the LMF for UE position estimation. LMF selection may performed when the subscribed UE event reporting is received. In an example, requested quality of service information may be considered for LMF selection, e.g. LCS accuracy, response time (e.g. latency), and/or Access Type (e.g. 3GPP/N3GPP). For example, location methods may differ depending on the Access Type, e.g. in case of WLAN Access Location determination may just correspond to retrieval of IP addressing information from the N3IWF/TNGF; as another example, for Wireline access, Location determination may just correspond to retrieval of geo coordinates corresponding to a Line Id. In an example, RAT type (i.e. 5G NR or eLTE) and/or the serving AN node (i.e. gNB or NG-eNB) of the target UE may be considered for LMF selection. In an example, RAN configuration information may be considered for LMF selection. In an example, LMF capabilities may be considered for LMF selection. In an example, LMF load may be considered for LMF selection. In an example, LMF location may be considered for LMF selection. In an example, indication of either a single event report or multiple event reports may be considered for LMF selection. In an example, duration of event reporting may be considered for LMF selection. In an example, network slicing information, e.g. S-NSSAI and/or NSI ID may be considered for LMF selection.

In an example, LCS Quality of Service may be used to characterize the location request. It may either be determined by the operator or determined based on the negotiation with the LCS client or the AF. It may be optional for LCS client or the AF to provide the LCS Quality of Service in the location request. LCS Quality of Service information may be characterized by 3 key attributes: LCS QoS class, accuracy, and/or response time. The LCS QoS class may define the degree of adherence by the Location Service to another quality of service parameter (e.g. accuracy), if requested. The 5G system may attempt to satisfy the other quality of service parameter regardless of the use of QoS class. There may be 2 LCS QoS classes, Best Effort class and/or Assured class. For example, a Best Effort class may define the least stringent requirement on the QoS achieved for a location request. If a location estimate obtained does not fulfil the other QoS requirements, it may still be returned but with an appropriate indication that the requested QoS was not met. If no location estimate is obtained, an appropriate error cause may be sent. For example, Assured class may define the most stringent requirement on the accuracy achieved for a location request. If a location estimate obtained does not fulfil the other QoS requirements, then it may be discarded, and an appropriate error cause may be sent.

FIG. 21 is an example diagram depicting Performance requirements for different positioning service levels as per an aspect of an embodiment of the present disclosure.

Adaptability and flexibility may be among the key features of the 5G system to serve a wide diversity of verticals and services, in different environments (e.g. rural, urban, indoor). This may apply to high accuracy positioning and translates into the ability to satisfy different levels of services and requirements, for instance on performance (e.g. accuracy, positioning service availability, positioning service latency) and on functionality (e.g. security). The 5G System may provide different 5G positioning services with configurable performances working points (e.g. accuracy, positioning service availability, positioning service latency, energy consumption, update rate, TTFF) according to the needs of users, operators and third parties. The 5G system may support the combination of 3GPP and non-3GPP positioning technologies to achieve performances of the 5G positioning services better than those achieved using only 3GPP positioning technologies. For instance, the combination of 3GPP positioning technologies with non-3GPP positioning technologies such as GNSS (e.g. Beidou, Galileo, GLONASS, and GPS), Terrestrial Beacon Systems (TBS), sensors (e.g. barometer, IMU), WLAN/Bluetooth-based positioning, may support the improvement of accuracy, positioning service availability, reliability and/or confidence level, the reduction of positioning service latency, the increase of the update rate of the position-related data, increase the coverage (service area). The combination may vary over time to optimize the performances and may be the combination of multiple positioning technologies at the same epoch and/or the combination of multiple positioning technologies at different epochs. The corresponding positioning information may be acquired in a timely fashion, be reliable, and be available (e.g. it is possible to determine the position). UEs may be able to share positioning information between each other e.g. to a controller if the location information cannot be processed or used locally.

The 5G system may be able to provide positioning services with the performances requirements in FIG. 21. The requirements may not preclude any type of UE, including specific UE such as for example V2X, MTC. The 5G system may be able to provide the 5G positioning services with a Time To First Fix (TTFF) less than 30 s (e.g. 30 seconds) and, for some 5G positioning services, may support mechanisms to provide a TTFF less than 10 s. In some services, a TTFF of less than 10 s may only be achievable at the expense of a relaxation of some other performances (e.g. horizontal accuracy may be 1 m or 3 m after 10 s TTFF, and reach a steady state accuracy of 0.3 m after 30 s). The 5G system may support a mechanism to determine the UE's velocity with a positioning service availability of 99%, an accuracy better than 0.5 m/s for the speed and an accuracy better than 5 degree for the 3-Dimension direction of travel. The 5G system may support a mechanism to determine the UE's heading with an accuracy better than 30 degrees (0.54 rad) and a positioning service availability of 99.9% for static users and with an accuracy better than 10 degrees (0.17 rad) and a positioning service availability of 99% for users up to 10 km/h.

The 5G system may support positioning technologies that allow the UE to operate at Service Level 1 for at least 12 years using less than 1800 mWh of battery capacity, assuming multiple position updates per hour. This requirement aims energy-efficient positioning technologies draining a minimal energy on the UE battery. It derives from use cases, such as asset tracking, with a small form-factor battery representative of an IoT device. This requirement may translate into an energy consumption for the UE's positioning functions in the order of 20 mJ per fix. This requirement may not preclude the use of higher energy consumption to fulfil higher position update rates than the one above, or other KPIs than those of Service Level 1 (e.g. more accurate service levels).

In existing technologies, a communication system (e.g. 5G) may not expose its positioning capability (e.g. capability of positioning service level and/or capability of positioning service area) to an application (e.g. an LCS client, a third party application). The application may not be able to request a positioning service level and/or positioning service area based on the positioning capability of the communication system. Consequently, the application may not obtain the desired positioning service level and/or positioning service area. This may prevent the application from obtaining the positioning information of the wireless device efficiently, and may degrade the performance of time sensitive applications (e.g. V2X communication, UAV application).

In existing technologies, an LCS client may not be able to negotiate positioning capability with a communication system. The communication system may reject a positioning request from the LCS client without providing an accepted positioning service level and/or positioning service area. Consequently, the LCS client may request positioning information again and receive another reject from the communication system.

The existing technologies may not enable a communication system to determine at least one positioning method to support a positioning service level and/or positioning service area requested by an LCS client, consequently, the LCS client may not get the positioning service from a communication system.

Example embodiments of the present disclosure may provide enhanced mechanisms to support positioning service level control and/or positioning service area control. Example embodiments of the present disclosure may provide enhanced mechanisms to enable a communication system to expose its positioning capability to an application, the application may be able to request a positioning service level and/or positioning service area based on the positioning capability of the communication system. Example embodiments of the present disclosure may provide enhanced mechanisms to enable an LCS client to negotiate positioning capability with a communication system, and the communication system may provide an accepted positioning service level and/or positioning service area to the LCS client. Example embodiments of the present disclosure may provide enhanced mechanisms to enable a communication system to determine at least one positioning method to support a positioning service level and/or positioning service area requested by an LCS client, and the LCS client may get the positioning service from a communication system accordingly.

Figure 22:
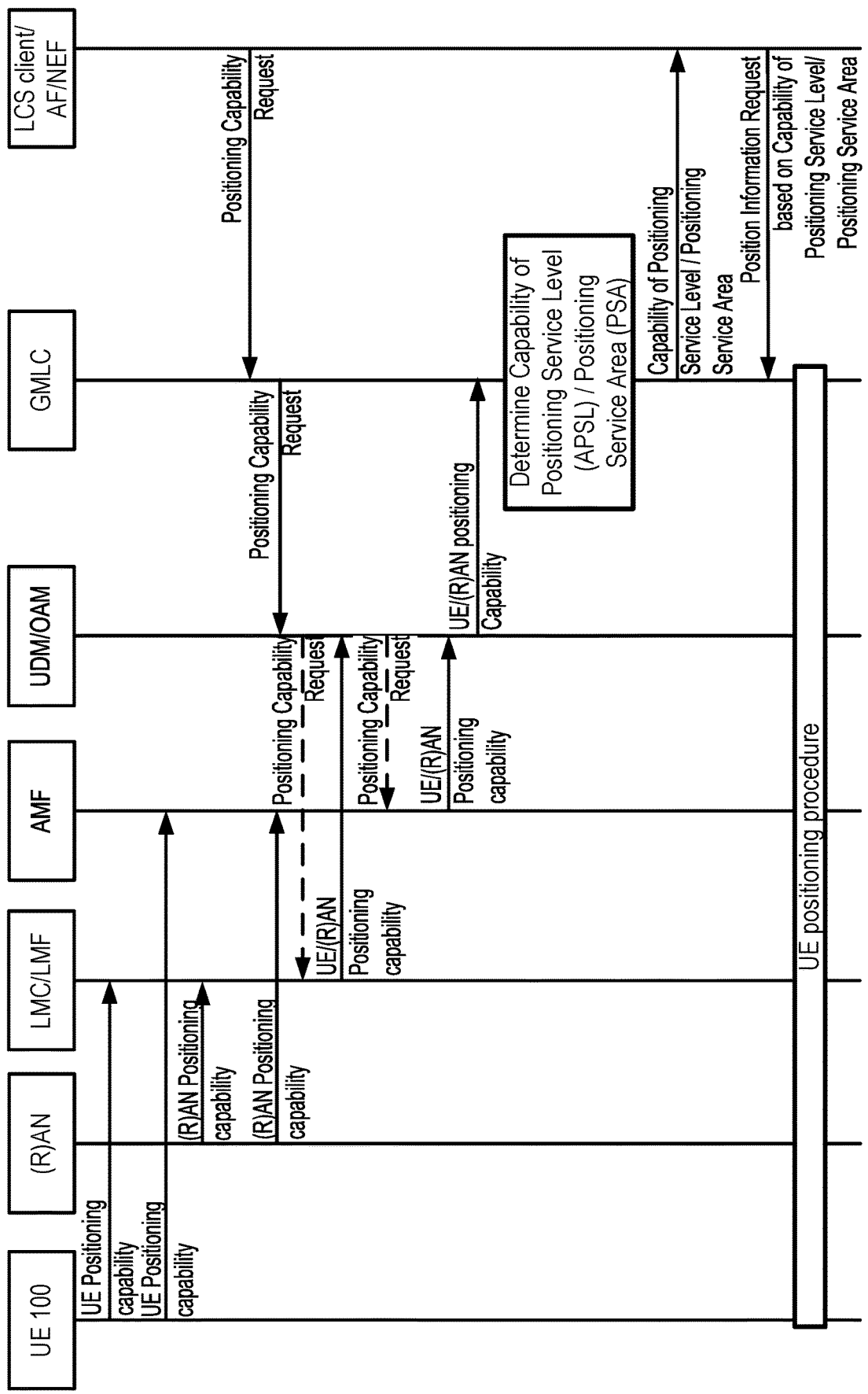
FIG. 22 is an example diagram depicting definition of a parameter/information element for the positioning capability information as per an aspect of an embodiment of the present disclosure.

FIG. 22 shows an example call flow which may comprise one or more actions. In an example, a UE may send a message (e.g. a LPP message, for example, a ProvideCapabilities message)) to an LMC/LMF, the ProvideCapabilities message may comprise at least one of: UE positioning capability information, UE service area information, and/or UE velocity information. FIG. 23 is an example diagram depicting a ProvideCapabilities message body. In an example, the UE positioning capability information may indicate positioning capability supported by the UE. In an example, the UE positioning capability information may indicate one or more positioning methods supported by the UE. For example, the UE positioning capability information may comprise at least one of the following positioning capabilities and/or positioning methods supported by the UE: a parameter (e.g. ecid-ProvideCapabilities, nr-ECID-ProvideCapabilities-r16 in FIG. 23) indicating support of Enhanced Cell Identity (ECID) capability; a parameter (e.g. otdoa-ProvideCapabilities, NR-DL-TDOA-ProvideCapabilities-r16, NR-DL-AoD-ProvideCapabilities-r16 in FIG. 23) indicating support of Observed Time Difference of Arrival (OTDOA) capability; a parameter (e.g. a-gnss-ProvideCapabilities in FIG. 23) indicating support of network-assisted GNSS methods; a parameter (e.g. wlan-ProvideCapabilities-r13 in FIG. 23) indicating support of WLAN positioning; a parameter (e.g. bt-ProvideCapabilities-r13 in FIG. 23) indicating support of Bluetooth positioning; a parameter (e.g. tbs-ProvideCapabilities-r13 in FIG. 23) indicating support of Terrestrial Beacon System (TBS) positioning; a parameter (e.g. Sensor-ProvideCapabilities) indicating support of barometric pressure sensor (BPS) positioning; a parameter (e.g. nr-Multi-RTT-ProvideCapabilities-r16 in FIG. 23) indicating support of multiple RTT positioning (e.g. the multiple RTT positioning may comprise at least one of: NR multiple RTT measurement, NR uplink SRS measurement, and/or NR downlink PRS measurement); a parameter (e.g. no-Support-Capability in FIG. 23) indicating no support of a positioning capability. In an example, the ProvideCapabilities message may comprise a parameter (e.g. ue-ServiceArea in FIG. 23) indicating UE service area information. The UE service area information may indicate UE service area, for example, indoor area and/or outdoor area. The outdoor area may comprise rural area, urban area, and/or dense urban area. In an example, the ProvideCapabilities message may comprise a parameter (e.g. ue-Velocity in FIG. 23) indicating UE velocity information. For example, the UE velocity information may indicate the velocity of the UE. For example, the UE velocity information may indicate horizontal velocity and/or the vertical velocity. For example, the UE velocity information may comprise the speed and/or the direction of the UE.

In response to the message received from the UE, the LMC/LMF may send a message (e.g. UE capability notification) to a network function (e.g. a UDM, OAM), the UE capability notification message may comprise one or more parameters of the ProvideCapabilities message (e.g. UE positioning capability information, UE service area information, and/or UE velocity information).

In an example, the UE may send a message (e.g. a NAS message, for example, a REGISTRATION REQUEST message)) to an AMF, the REGISTRATION REQUEST message may comprise at least one of: UE positioning capability information, UE service area information, and/or UE velocity information. FIG. 24 is an example diagram depicting a REGISTRATION REQUEST message body. In response to the message received from the UE, the AMF may send a message (e.g. UE capability notification) to a network function (e.g. a UDM, OAM), the UE capability notification message may comprise one or more parameters of the REGISTRATION REQUEST message (e.g. UE positioning capability information, UE service area information, and/or UE velocity information).

In an example, a (R)AN may send to the LMC/LMF a message (e.g. a NRPPa message, for example, a Positioning Capability Report message), the Positioning Capability Report message may comprise at least one of: (R)AN positioning capability information, UE positioning capability information, UE service area information, and/or UE velocity information. FIG. 25 is an example diagram depicting a Positioning Capability Report message body. In an example, the (R)AN positioning capability information may indicate positioning capability supported by the (R)AN. In an example, the (R)AN positioning capability information may indicate one or more positioning methods supported by the (R)AN. For example, the (R)AN positioning capability information may comprise at least one of the following positioning capabilities and/or positioning methods supported by the (R)AN: a parameter indicating support of Enhanced Cell Identity (ECID) capability; a parameter indicating support of Observed Time Difference of Arrival (OTDOA) capability; a parameter indicating support of UL RTOA (uplink relative time of arrival); a parameter indicating support of UL RSRP (uplink reference signal received power) measurements; a parameter indicating support of uplink Angle of Arrival (UL AoA) measurements (e.g. Azimuth and/or Zenith Angles); a parameter indicating support of multiple RTT positioning (e.g. the multiple RTT positioning may comprise at least one of: NR multiple RTT measurement, NR uplink SRS measurement); a parameter indicating support of gNB RX-TX time difference measurements; a parameter indicating no support of a positioning capability.

In response to the message received from the (R)AN, the LMC/LMF may send a message (e.g. (R)AN capability notification) to a network function (e.g. a UDM, OAM), the (R)AN capability notification message may comprise one or more parameters of the Positioning Capability Report message (e.g. (R)AN positioning capability information, UE positioning capability information, UE service area information, and/or UE velocity information). In an example, the LMC/LMF may receive (R)AN positioning capability information of one or more base stations from the one or more base stations in a registration area of the wireless device. The LMC/LMF may send the (R)AN positioning capability information of one or more base stations to the network function.

In an example, a (R)AN may send to the AMF a message (e.g. an N2 message), the N2 message may comprise at least one of: N2 parameters, a Registration Request message, (R)AN positioning capability information, UE positioning capability information, UE service area information, and/or UE velocity information. For example, the N2 parameters may comprise a selected PLMN ID (or PLMN ID and NID), Location Information and Cell Identity related to the cell in which the UE is camping, UE Context Request which may indicate that a UE context including security information needs to be setup at the NG-RAN. For example, the N2 parameters may comprise an Establishment cause, a CAG Identifier if the UE is accessing the NG-RAN using a CAG cell and IAB-Indication if the indication is received in AN parameters from the UE. For example, the Registration Request message may comprise at least one of: a Registration type, a UE identity (e.g. SUCI, 5G-GUTI or PEI), last visited TAI (if available), Security parameters, Requested NSSAI, Mapping Of Requested NSSAI, Default Configured NSSAI Indication, UE Radio Capability Update, UE MM Core Network Capability, PDU Session status, List Of PDU Sessions To Be Activated, Follow-on request, MICO mode preference, Requested Active Time, Requested DRX parameters, extended idle mode DRX parameters, LADN DNN(s) or Indicator Of Requesting LADN Information, NAS message container, Support for restriction of use of Enhanced Coverage, Preferred Network Behaviour, UE Policy Container (e.g. list of PSIs, indication of UE support for ANDSP and the operating system identifier) and/or UE Radio Capability ID.

In response to the message received from the (R)AN, the AMF may send a message (e.g. (R)AN capability notification) to a network function (e.g. a UDM, OAM), the (R)AN capability notification message may comprise one or more parameters of the N2 message (e.g. (R)AN positioning capability information, UE positioning capability information, UE service area information, and/or UE velocity information). In an example, the AMF may receive (R)AN positioning capability information of one or more base stations from the one or more base stations in a registration area of the wireless device. The AMF may send the (R)AN positioning capability information of the one or more base stations to the network function.

In an example, a gateway mobile location center (GMLC) may receive a message (e.g. Positioning Capability Request) from a location services (LCS) client, the Positioning Capability Request message may indicating requesting/querying at least one of: capability of positioning service level, supported positioning service area (e.g. supported 5G positioning service area), and/or supported enhanced positioning service area (e.g. 5G enhanced positioning service area). The capability of positioning service level, the supported positioning service area, and/or the supported enhanced positioning service area may be applied for the UE and/or for a PLMN, wherein the UE registers to the PLMN. In an example, the Positioning Capability Request message may comprise one or more information elements/parameters. For example, the Positioning Capability Request message may comprise at least one of: the UE identity (e.g. SUCI, SUPI, 5G-GUTI or PEI), a PLMN identifier, an LCS client type, a parameter indicating requesting/querying the capability of positioning service level, a parameter indicating requesting/querying the supported positioning service area, and/or a parameter indicating requesting/querying the supported enhanced positioning service area.

In response to the message received from the LCS client, the GMLC may send a message (e.g. Nudm_UECM_Get Request, Positioning Capability Query) to a network function. The network function may be an AMF, a UDM, and/or an OAM. For example, the GMLC may send a Nudm_UECM_Get Request message to a (home) UDM of the UE. The Nudm_UECM_Get Request message may comprise the one or more information elements/parameters of the Positioning Capability Request message described above, for example, the UE identity, the PLMN identifier, and/or a parameter indicating requesting/querying the capability of positioning service level. In an example, the Nudm_UECM_Get Request message may comprise a parameter indicating requesting/querying (R)AN positioning capability. In an example, the Nudm_UECM_Get Request message may comprise a parameter indicating requesting/querying UE positioning capability.

In response to the message received from the GMLC, the UDM may take one or more actions. In an example action, the UDM may have already received from the LMC/LMF and/or AMF at least one of the following information: (R)AN positioning capability information of at least one base station in a registration area of the wireless device, UE positioning capability information, UE service area information, and/or UE velocity information, the UDM may send a response message (e.g. Nudm_UECM_Get Response) to the GMLC, the Nudm_UECM_Get Response message may comprise at least one of: (R)AN positioning capability information of the at least one base station, UE positioning capability information, UE service area information, and/or UE velocity information. In an example, based on local configuration, the Nudm_UECM_Get Response message may comprise at least one of: a parameter indicating supported positioning service level for the UE and/or the PLMN; a parameter indicating supported positioning service area, and/or a parameter indicating the supported enhanced positioning service area.

In an example action, the UDM may send a message (e.g. Positioning Capability Query) to the LMC/LMF. For example, the Positioning Capability Query message may indicate requesting/querying UE positioning capability and/or (R)AN positioning capability. For example, the Positioning Capability Query message may comprise one or more information elements/parameters of the Nudm_UECM_Get Request message described above, for example, the UE identity, the PLMN identifier, and/or a parameter indicating requesting/querying the capability of positioning service level. In response to the message received from the UDM, the LMC/LMF may send a response message (e.g. Positioning Capability Query Response) to the UDM, the Positioning Capability Query Response message may comprise at least one of: (R)AN positioning capability information of the at least one base station, UE positioning capability information, UE service area information, and/or UE velocity information.

In an example action, the UDM may send a message (e.g. Positioning Capability Request) to the AMF. For example, the Positioning Capability Request message may indicate requesting/querying UE positioning capability and/or (R)AN positioning capability. For example, the Positioning Capability Request message may comprise one or more information elements/parameters of the Nudm_UECM_Get message described above, for example, the UE identity, the PLMN identifier, and/or a parameter indicating requesting/querying the capability of positioning service level. In response to the message received from the UDM, the AMF may send a response message (e.g. Positioning Capability Response) to the UDM, the Positioning Capability Response message may comprise at least one of: (R)AN positioning capability information of the at least one base station, UE positioning capability information, UE service area information, and/or UE velocity information.

In response to the message received from the LMC/LMF and/or AMF, and/or in response to the message received from the GMLC, the UDM may send a response message (e.g. Nudm_UECM_Get Response) to the GMLC. The Nudm_UECM_Get Response message may comprise at least one of: (R)AN positioning capability information of the at least one base station, UE positioning capability information, UE service area information, and/or UE velocity information. In an example, based on local configuration, the Nudm_UECM_Get Response message may comprise at least one of: a parameter indicating supported positioning service level for the UE and/or the PLMN; a parameter indicating supported positioning service area (e.g. indoor, outdoor), and/or a parameter indicating the supported enhanced positioning service area.

In response to the message received from the network function (e.g. the UDM), the GMLC may take one or more actions. In an example action, based on the message received from the network function and/or based on local configuration, the GMLC may determine at least one of: supported capability of positioning service level for the UE and/or the PLMN, supported positioning service area for the UE and/or the PLMN, and/or supported enhanced positioning service area for the UE and/or the PLMN. For example, based on the (R)AN positioning capability information of the at least one base station, the UE positioning capability information, the UE service area information, and/or the UE velocity information, the GMLC may determine at least one of: supported capability of positioning service level, supported positioning service area, and/or supported enhanced positioning service area.

In an example, the supported capability of positioning service level may indicate a supported positioning service level. In an example, the supported capability of positioning service level may comprise at least one of: a parameter indicating positioning service level number (e.g. 1, 2, . . . 7); a parameter indicating an absolute or a relative positioning; a parameter indicating a horizontal accuracy; a parameter indicating a vertical accuracy; a parameter indicating a positioning service availability; a parameter indicating a positioning service latency; a parameter indicating a 5G positioning service area; and/or a parameter indicating a 5G enhanced positioning service area. In an example, the supported positioning service area may indicate coverage, environment of use and/or UE velocity. For example, the supported positioning service area may indicate supported indoor and/or outdoor coverage. For example, the supported positioning service area may indicate supported UE speed in the indoor and/or outdoor coverage. For example, the supported enhanced positioning service area may indicate supported indoor and/or outdoor coverage. For example, the supported enhanced positioning service area may indicate supported UE speed in the indoor and/or outdoor coverage. In an example, the supported capability of positioning service level may be used independently. In an example, the supported capability of positioning service level may be used with the supported positioning service area and/or the supported enhanced positioning service area together. FIG. 21 shows example definition of supported capability of positioning service level, supported positioning service area, and/or supported enhanced positioning service area. In FIG. 21, Positioning service level is an example of supported capability of positioning service level, 5G positioning service area is an example of supported positioning service area, 5G enhanced positioning service area is an example of supported enhanced positioning service area.

In an example, the (R)AN positioning capability information of the at least one base station may indicate that the (R)AN supports ECID (capability and/or positioning method), the UE positioning capability information may indicate that the UE supports ECID (capability and/or positioning method) and/or OTDOA (capability and/or positioning method), the UE service area information may indicate UE is in an indoor area, the UE velocity information may indicate the speed of UE is 30 km/h, based on above information, the GMLC may determine at least one of: a supported capability of positioning service level 1 for the UE and/or the PLMN; a supported positioning service area where UE may have a speed up to 30 km/h for indoor environment, and up to 250 km/h for outdoor (rural and urban) environment; and/or a supported enhanced positioning service area where UE may have a speed up to 30 km/h for indoor environment. As shown in FIG. 21, the supported capability of positioning service level 1 may have a horizontal accuracy of 10 meters and a vertical accuracy of 3 meters.

In an example, the (R)AN positioning capability information of the at least one base station may indicate that the (R)AN supports ECID and/or OTDOA, the UE positioning capability information may indicate that the UE supports ECID, OTDOA, WLAN positioning, and/or Bluetooth positioning, the UE service area information may indicate UE is in an outdoor area, the UE velocity information may indicate the speed of UE is 300 km/h, based on above information, the GMLC may determine at least one of: a supported capability of positioning service level 2 for the UE and/or the PLMN; a supported positioning service area where UE may have a speed up to 500 km/h for outdoor environment. As shown in FIG. 21, the supported capability of positioning service level 2 may have a horizontal accuracy of 3 meters and a vertical accuracy of 3 meters.

In an example, the (R)AN positioning capability information of the at least one base station may indicate that the (R)AN supports ECID and/or OTDOA, the UE positioning capability information may indicate that the UE supports ECID, OTDOA, WLAN positioning, and/or high accuracy (HA) GNSS (e.g. Real-time kinematic (RTK) positioning), the UE service area information may indicate UE is in an indoor area, the UE velocity information may indicate the speed of UE is 30 km/h, based on above information, the GMLC may determine at least one of: a supported capability of positioning service level 7 for the UE and/or the PLMN; a supported positioning service area where UE may have a speed up to 30 km/h for indoor and outdoor environment; and/or a supported enhanced positioning service area where UE may have a speed up to 30 km/h for indoor and outdoor environment. As shown in FIG. 21, the supported capability of positioning service level 7 may have a horizontal accuracy of 0.2 meters and a vertical accuracy of 0.2 meters.

In an example action, in response to the message received from the LCS client, the GMLC may send to the LCS client a response message (e.g. Positioning Capability Response). The Positioning Capability Response message may comprise the supported capability of positioning service level, supported positioning service area, and/or supported enhanced positioning service area.

Figure 26:
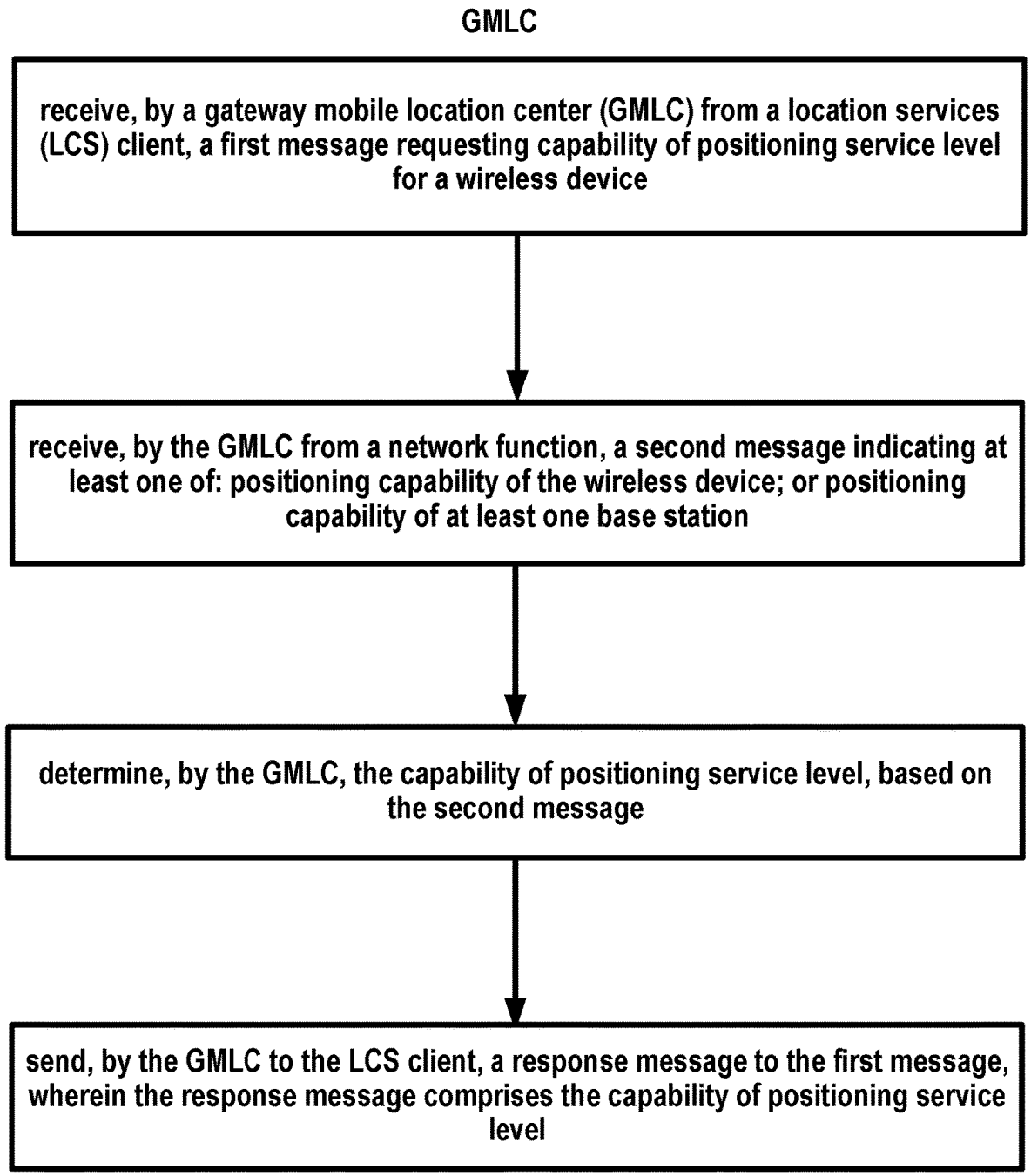
FIG. 26 is an example diagram depicting the procedures of a GMLC as per an aspect of an embodiment of the present disclosure.

In response to the message received from the GMLC, the LCS client may take one or more actions. In an example action, based on the supported capability of positioning service level, supported positioning service area, and/or supported enhanced positioning service area, the LCS client may determine one or more requested parameters for a positioning request message. For example, the determined one or more requested parameters may equal to the supported capability of positioning service level, the supported positioning service area, and/or the supported enhanced positioning service area. For example, the determined one or more requested parameters may different from (e.g. less than) the supported capability of positioning service level, the supported positioning service area, and/or the supported enhanced positioning service area. For example, the determined one or more requested parameters may comprise at least one of: a requested positioning service level, a requested positioning service area, a requested enhanced positioning service area, a requested horizontal positioning accuracy, a requested vertical positioning accuracy, and/or a requested QoS. In an example action, the LCS client may send to the GMLC a message (e.g. positioning request message). The positioning request message may indicate requesting positioning information of the UE. The positioning request message may comprise the determined one or more requested parameters. FIG. 26 is an example diagram depicting the procedures of a GMLC as per an aspect of an embodiment of the present disclosure.

Figure 27:
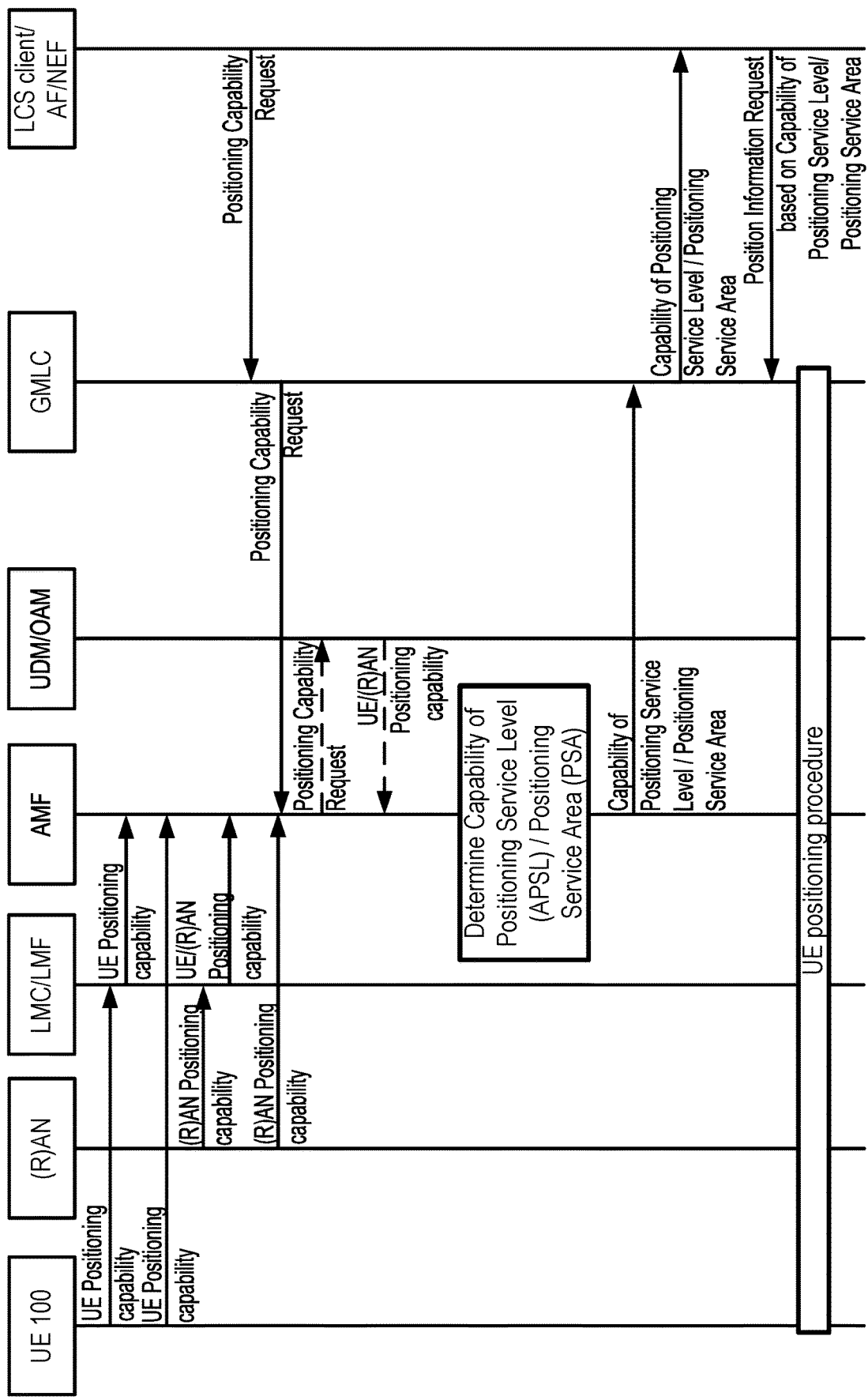
FIG. 27 is an example call flow as per an aspect of an embodiment of the present disclosure.

FIG. 27 shows an example call flow which may comprise one or more actions. In an example, a UE may send a message (e.g. a LPP message, for example, a ProvideCapabilities message)) to an LMC/LMF, the ProvideCapabilities message may comprise at least one of: UE positioning capability information, UE service area information, and/or UE velocity information. These processes may be similar to the processes described above with respect to FIG. 22. For brevity, further description will not be repeated here.

In response to the message received from the UE, the LMC/LMF may send a message (e.g. UE capability notification) to a network function (e.g., an AMF, a UDM, OAM), the UE capability notification message may comprise one or more parameters of the ProvideCapabilities message (e.g. UE positioning capability information, UE service area information, and/or UE velocity information).

In an example, the UE may send a message (e.g. a NAS message, for example, a REGISTRATION REQUEST message)) to an AMF, the REGISTRATION REQUEST message may comprise at least one of: UE positioning capability information, UE service area information, and/or UE velocity information.

In an example, a (R)AN may send to the LMC/LMF a message (e.g. a NRPPa message, for example, a Positioning Capability Report message), the Positioning Capability Report message may comprise at least one of: (R)AN positioning capability information, UE positioning capability information, UE service area information, and/or UE velocity information. These processes may be similar to the processes described above with respect to FIG. 22. For brevity, further description will not be repeated here.

In response to the message received from the (R)AN, the LMC/LMF may send a message (e.g. (R)AN capability notification) to a network function (e.g. the AMF, UDM, OAM), the (R)AN capability notification message may comprise one or more parameters of the Positioning Capability Report message (e.g. (R)AN positioning capability information, UE positioning capability information, UE service area information, and/or UE velocity information). In an example, the LMC/LMF may receive (R)AN positioning capability information of one or more base stations from the one or more base stations in a registration area of the wireless device. The LMC/LMF may send the (R)AN positioning capability information of one or more base stations to the network function.

In an example, a (R)AN may send to the AMF a message (e.g. an N2 message), the N2 message may comprise at least one of: N2 parameters, a Registration Request message, (R)AN positioning capability information, UE positioning capability information, UE service area information, and/or UE velocity information. For example, the N2 parameters may comprise a selected PLMN ID (or PLMN ID and NID), Location Information and Cell Identity related to the cell in which the UE is camping, UE Context Request which may indicate that a UE context including security information needs to be setup at the NG-RAN. For example, the N2 parameters may comprise an Establishment cause, a CAG Identifier if the UE is accessing the NG-RAN using a CAG cell and IAB-Indication if the indication is received in AN parameters from the UE. For example, the Registration Request message may comprise at least one of: a Registration type, a UE identity (e.g. SUCI, 5G-GUTI or PEI), last visited TAI (if available), Security parameters, Requested NSSAI, Mapping Of Requested NSSAI, Default Configured NSSAI Indication, UE Radio Capability Update, UE MM Core Network Capability, PDU Session status, List Of PDU Sessions To Be Activated, Follow-on request, MICO mode preference, Requested Active Time, Requested DRX parameters, extended idle mode DRX parameters, LADN DNN(s) or Indicator Of Requesting LADN Information, NAS message container, Support for restriction of use of Enhanced Coverage, Preferred Network Behaviour, UE Policy Container (e.g. list of PSIs, indication of UE support for ANDSP and the operating system identifier) and/or UE Radio Capability ID.

In an example, a gateway mobile location center (GMLC) may receive a message (e.g. Positioning Capability Request) from a location services (LCS) client, the Positioning Capability Request message may indicating requesting/querying at least one of: capability of positioning service level, supported positioning service area (e.g. supported 5G positioning service area), and/or supported enhanced positioning service area (e.g. 5G enhanced positioning service area). The capability of positioning service level, the supported positioning service area, and/or the supported enhanced positioning service area may be applied for the UE and/or for a PLMN, wherein the UE registers to the PLMN. In an example, the Positioning Capability Request message may comprise one or more information elements/parameters. For example, the Positioning Capability Request message may comprise at least one of: the UE identity (e.g. SUCI, SUPI, 5G-GUTI or PEI), a PLMN identifier, an LCS client type, a parameter indicating requesting/querying the capability of positioning service level, a parameter indicating requesting/querying the supported positioning service area, and/or a parameter indicating requesting/querying the supported enhanced positioning service area.

In response to the message received from the LCS client, the GMLC may send a message (e.g. Positioning Capability Query) to a network function. The network function may be an AMF, a UDM, and/or an OAM. For example, the GMLC may send a Positioning Capability Query message to the AMF, where the AMF is serving for the UE. The Positioning Capability Query message may comprise the one or more information elements/parameters of the Positioning Capability Request message described above, for example, the UE identity, the PLMN identifier, the parameter indicating requesting/querying the capability of positioning service level, the parameter indicating requesting/querying the supported positioning service area, and/or the parameter indicating requesting/querying the supported enhanced positioning service area.

In response to the message received from the GMLC, the AMF may take one or more actions. In an example action, the AMF may have already received from the UE, the at least one base station and/or the LMC/LMF, at least one of the following information: (R)AN positioning capability information of the at least one base station, UE positioning capability information, UE service area information, and/or UE velocity information.

In an example action, the AMF may send a message (e.g. Positioning Capability Query) to the UDM/OAM. For example, the Positioning Capability Query message may indicate requesting/querying UE positioning capability and/or (R)AN positioning capability. For example, the Positioning Capability Query message may comprise at least one of: the UE identity, the PLMN identifier, a parameter indicating requesting/querying UE positioning capability, a parameter indicating requesting/querying (R)AN positioning capability, a parameter indicating requesting/querying the capability of positioning service level, a parameter indicating requesting/querying UE service area information, a parameter indicating requesting/querying UE velocity information.

In response to the message received from the AMF, the UDM/OAM may send a response message (e.g. Positioning Capability Query Response) to the AMF. For example, the Positioning Capability Query Response message may comprise at least one of: the UE identity, the PLMN identifier, (R)AN positioning capability information of the at least one base station, UE positioning capability information, UE service area information, UE velocity information, a parameter indicating supported positioning service level for the UE and/or the PLMN; a parameter indicating supported positioning service area (e.g. indoor, outdoor), and/or a parameter indicating the supported enhanced positioning service area.

In response to the message received from the UDM/OAM, the AMF may take one or more actions. In an example action, based on the message received from the UDM/OAM, UE, (R)AN, LMC/LMF and/or based on local configuration, the AMF may determine at least one of: supported capability of positioning service level for the UE and/or the PLMN, supported positioning service area for the UE and/or the PLMN, and/or supported enhanced positioning service area for the UE and/or the PLMN. For example, based on the (R)AN positioning capability information of the at least one base station, the UE positioning capability information, the UE service area information, and/or the UE velocity information, the AMF may determine at least one of: supported capability of positioning service level, supported positioning service area, and/or supported enhanced positioning service area. The definition(s) and/or the content(s) of the supported capability of positioning service level, supported positioning service area, and/or supported enhanced positioning service area may be similar to the definition(s) and/or the content(s) described above with respect to FIG. 22. For brevity, further description will not be repeated here.

In an example, the supported capability of positioning service level may indicate a supported positioning service level. In an example, the supported capability of positioning service level may comprise at least one of: a parameter indicating an absolute or a relative positioning; a parameter indicating a horizontal accuracy; a parameter indicating a vertical accuracy; a parameter indicating a positioning service availability; a parameter indicating a positioning service latency; a parameter indicating a 5G positioning service area; and/or a parameter indicating a 5G enhanced positioning service area. In an example, the supported positioning service area may indicate coverage, environment of use and/or UE velocity. For example, the supported positioning service area may indicate supported indoor and/or outdoor coverage. For example, the supported positioning service area may indicate supported UE speed in the indoor and/or outdoor coverage. For example, the supported enhanced positioning service area may indicate supported indoor and/or outdoor coverage. For example, the supported enhanced positioning service area may indicate supported UE speed in the indoor and/or outdoor coverage. In an example, the supported capability of positioning service level may be used independently. In an example, the supported capability of positioning service level may be used with the supported positioning service area and/or the supported enhanced positioning service area together. FIG. 21 shows example definition of supported capability of positioning service level, supported positioning service area, and/or supported enhanced positioning service area.

In an example, the (R)AN positioning capability information of the at least one base station may indicate that the (R)AN supports OTDOA (capability and/or positioning method), the UE positioning capability information may indicate that the UE supports ECID (capability and/or positioning method) and/or OTDOA (capability and/or positioning method), the UE service area information may indicate UE is in an indoor area, the UE velocity information may indicate the speed of UE is 30 km/h, based on above information, the AMF may determine at least one of: a supported capability of positioning service level 1 for the UE and/or the PLMN; a supported positioning service area where UE may have a speed up to 30 km/h for indoor environment, and up to 250 km/h for outdoor (rural and urban) environment; and/or a supported enhanced positioning service area where UE may have a speed up to 30 km/h for indoor environment.

In an example, the (R)AN positioning capability information of the at least one base station may indicate that the (R)AN supports ECID and/or OTDOA, the UE positioning capability information may indicate that the UE supports ECID, WLAN positioning, and/or TBS positioning, the UE service area information may indicate UE is in an outdoor area, the UE velocity information may indicate the speed of UE is 300 km/h, based on above information, the GMLC may determine at least one of: a supported capability of positioning service level 2 for the UE and/or the PLMN; a supported positioning service area where UE may have a speed up to 500 km/h for outdoor environment.

In an example, the (R)AN positioning capability information of the at least one base station may indicate that the (R)AN supports ECID and/or OTDOA, the UE positioning capability information may indicate that the UE supports ECID, OTDOA, WLAN positioning, and/or high accuracy (HA) GNSS (e.g. Real-time kinematic (RTK) positioning), the UE service area information may indicate UE is in an indoor area, the UE velocity information may indicate the speed of UE is 30 km/h, based on above information, the AMF may determine at least one of: a supported capability of positioning service level 7 for the UE and/or the PLMN; a supported positioning service area where UE may have a speed up to 30 km/h for indoor and outdoor environment; and/or a supported enhanced positioning service area where UE may have a speed up to 30 km/h for indoor and outdoor environment.

In an example action, in response to the message received from the GMLC, the AMF may send to the GMLC a response message (e.g. Positioning Capability Response). The Positioning Capability Response message may comprise the supported capability of positioning service level, supported positioning service area, and/or supported enhanced positioning service area. In response to the message received from the AMF, and/or in response to the message received from the LCS client, the GMLC may send to the LCS client a response message (e.g. Positioning Capability Response). The Positioning Capability Response message may comprise the supported capability of positioning service level, supported positioning service area, and/or supported enhanced positioning service area.

Figure 28:
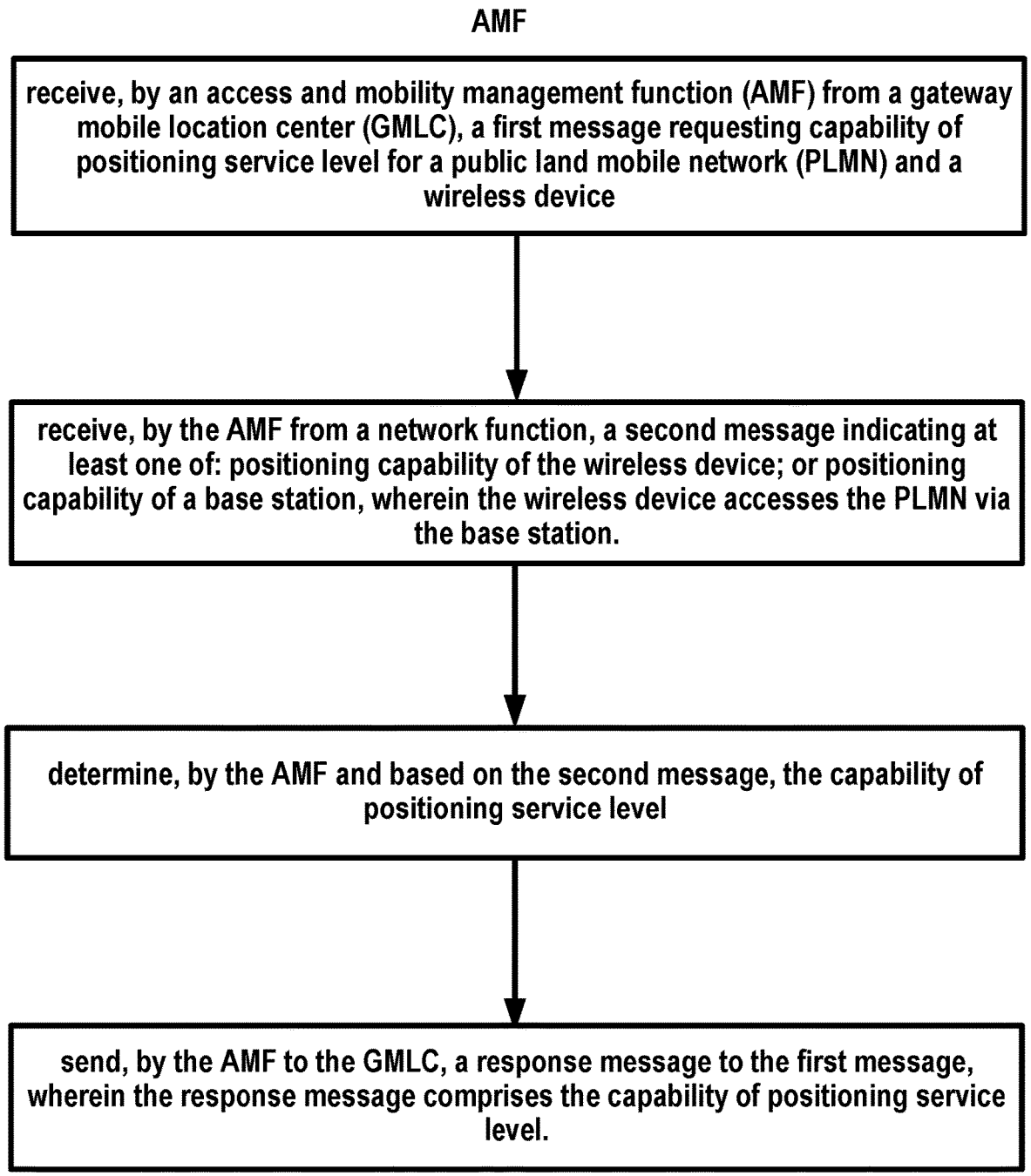
FIG. 28 is an example diagram depicting the procedures of an AMF as per an aspect of an embodiment of the present disclosure.

In response to the message received from the GMLC, the LCS client may take one or more actions. In an example action, based on the supported capability of positioning service level, supported positioning service area, and/or supported enhanced positioning service area, the LCS client may determine one or more requested parameters for a positioning request message. For example, the determined one or more requested parameters may equal to the supported capability of positioning service level, the supported positioning service area, and/or the supported enhanced positioning service area. For example, the determined one or more requested parameters may different from (e.g. less than) the supported capability of positioning service level, the supported positioning service area, and/or the supported enhanced positioning service area. For example, the determined one or more requested parameters may comprise at least one of: a requested positioning service level, a requested positioning service area, a requested enhanced positioning service area, a requested horizontal positioning accuracy, a requested vertical positioning accuracy, and/or a requested QoS. In an example action, the LCS client may send to the GMLC a message (e.g. positioning request message). The positioning request message may indicate requesting positioning information of the UE. The positioning request message may comprise the determined one or more requested parameters. FIG. 28 is an example diagram depicting the procedures of an AMF as per an aspect of an embodiment of the present disclosure.

Figure 29:
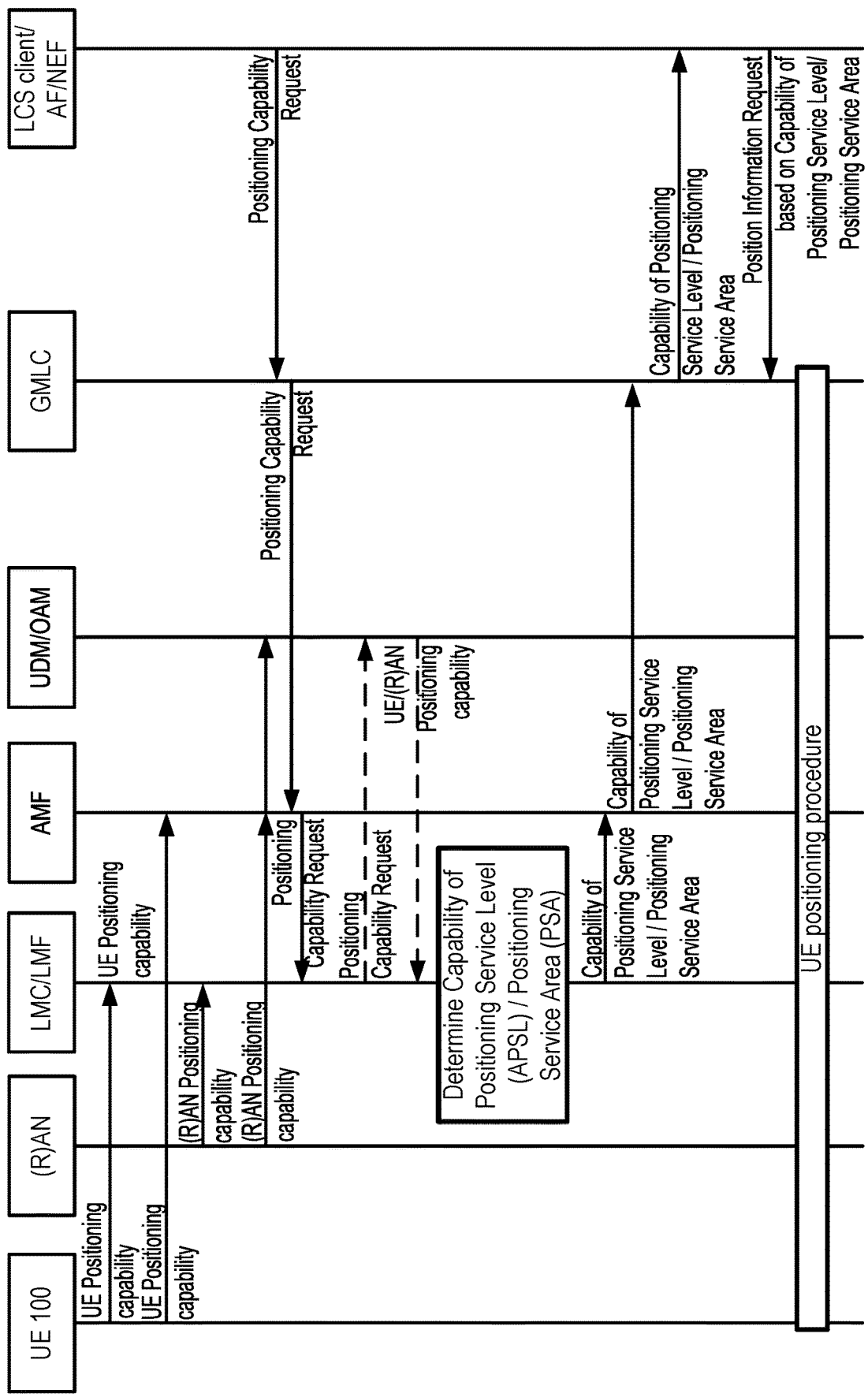
FIG. 29 is an example call flow as per an aspect of an embodiment of the present disclosure.

FIG. 29 shows an example call flow which may comprise one or more actions. In an example, a UE may send a message (e.g. a LPP message, for example, a ProvideCapabilities message)) to an LMC/LMF, the ProvideCapabilities message may comprise at least one of: UE positioning capability information, UE service area information, and/or UE velocity information. These processes may be similar to the processes described above with respect to FIG. 22. For brevity, further description will not be repeated here.

In an example, the UE may send a message (e.g. a NAS message, for example, a REGISTRATION REQUEST message)) to an AMF, the REGISTRATION REQUEST message may comprise at least one of: UE positioning capability information, UE service area information, and/or UE velocity information.

In an example, a (R)AN may send to the LMC/LMF a message (e.g. a NRPPa message, for example, a Positioning Capability Report message), the Positioning Capability Report message may comprise at least one of: (R)AN positioning capability information, UE positioning capability information, UE service area information, and/or UE velocity information. These processes may be similar to the processes described above with respect to FIG. 22. For brevity, further description will not be repeated here.

In an example, a (R)AN may send to the AMF a message (e.g. an N2 message), the N2 message may comprise at least one of: N2 parameters, a Registration Request message, (R)AN positioning capability information, UE positioning capability information, UE service area information, and/or UE velocity information. For example, the N2 parameters may comprise a selected PLMN ID (or PLMN ID and NID), Location Information and Cell Identity related to the cell in which the UE is camping, UE Context Request which may indicate that a UE context including security information needs to be setup at the NG-RAN. For example, the N2 parameters may comprise an Establishment cause, a CAG Identifier if the UE is accessing the NG-RAN using a CAG cell and IAB-Indication if the indication is received in AN parameters from the UE. For example, the Registration Request message may comprise at least one of: a Registration type, a UE identity (e.g. SUCI, 5G-GUTI or PEI), last visited TAI (if available), Security parameters, Requested NSSAI, Mapping Of Requested NSSAI, Default Configured NSSAI Indication, UE Radio Capability Update, UE MM Core Network Capability, PDU Session status, List Of PDU Sessions To Be Activated, Follow-on request, MICO mode preference, Requested Active Time, Requested DRX parameters, extended idle mode DRX parameters, LADN DNN(s) or Indicator Of Requesting LADN Information, NAS message container, Support for restriction of use of Enhanced Coverage, Preferred Network Behaviour, UE Policy Container (e.g. list of PSIs, indication of UE support for ANDSP and the operating system identifier) and/or UE Radio Capability ID.

In response to the message received from the (R)AN, the AMF may send a message (e.g. (R)AN capability notification) to a network function (e.g. a UDM, OAM), the (R)AN capability notification message may comprise one or more parameters of the N2 message (e.g. (R)AN positioning capability information, UE positioning capability information, UE service area information, and/or UE velocity information). In an example, the AMF may receive (R)AN positioning capability information of one or more base stations from the one or more base stations in a registration area of the wireless device. The AMF may send the (R)AN positioning capability information of the one or more base stations to the network function.

In an example, a gateway mobile location center (GMLC) may receive a message (e.g. Positioning Capability Request) from a location services (LCS) client, the Positioning Capability Request message may indicating requesting/querying at least one of: capability of positioning service level, supported positioning service area (e.g. supported 5G positioning service area), and/or supported enhanced positioning service area (e.g. 5G enhanced positioning service area). The capability of positioning service level, the supported positioning service area, and/or the supported enhanced positioning service area may be applied for the UE and/or for a PLMN, wherein the UE registers to the PLMN. In an example, the Positioning Capability Request message may comprise one or more information elements/parameters. For example, the Positioning Capability Request message may comprise at least one of: the UE identity (e.g. SUCI, SUPI, 5G-GUTI or PEI), a PLMN identifier, an LCS client type, a parameter indicating requesting/querying the capability of positioning service level, a parameter indicating requesting/querying the supported positioning service area, and/or a parameter indicating requesting/querying the supported enhanced positioning service area.

In response to the message received from the LCS client, the GMLC may send a message (e.g. Positioning Capability Query) to a network function. The network function may be an AMF, a UDM, and/or an OAM. For example, the GMLC may send a Positioning Capability Query message to the AMF, where the AMF is serving for the UE. The Positioning Capability Query message may comprise the one or more information elements/parameters of the Positioning Capability Request message described above, for example, the UE identity, the PLMN identifier, the parameter indicating requesting/querying the capability of positioning service level, the parameter indicating requesting/querying the supported positioning service area, and/or the parameter indicating requesting/querying the supported enhanced positioning service area.

In response to the message received from the GMLC, the AMF may send a message (e.g. Positioning Capability Request) to the LMC/LMF, where the LMC/LMF is serving for the UE. The Positioning Capability Request message may comprise one or more information elements/parameters of the Positioning Capability Query message described above, for example, the UE identity, the PLMN identifier, the parameter indicating requesting/querying the capability of positioning service level, the parameter indicating requesting/querying the supported positioning service area, and/or the parameter indicating requesting/querying the supported enhanced positioning service area.

In response to the message received from the AMF, the LMC/LMF may take one or more actions. In an example action, the LMC/LMF may have already received from the UE, and/or the at least one base station, at least one of the following information: (R)AN positioning capability information of the at least one base station, UE positioning capability information, UE service area information, and/or UE velocity information.

In an example action, the LMC/LMF may send a message (e.g. Positioning Capability Query) to a network function (e.g. AMF, UDM/OAM). For example, the LMC/LMF may send a Positioning Capability Query message to a UDM/OAM, the Positioning Capability Query message may indicate requesting/querying UE positioning capability and/or (R)AN positioning capability. For example, the Positioning Capability Query message may comprise at least one of: the UE identity, the PLMN identifier, a parameter indicating requesting/querying UE positioning capability, a parameter indicating requesting/querying (R)AN positioning capability, a parameter indicating requesting/querying the capability of positioning service level, a parameter indicating requesting/querying UE service area information, a parameter indicating requesting/querying UE velocity information.

In response to the message received from the LMC/LMF, the UDM/OAM may send a response message (e.g. Positioning Capability Query Response) to the LMC/LMF. For example, the Positioning Capability Query Response message may comprise at least one of: the UE identity, the PLMN identifier, (R)AN positioning capability information of the at least one base station, UE positioning capability information, UE service area information, UE velocity information, a parameter indicating supported positioning service level for the UE and/or the PLMN; a parameter indicating supported positioning service area (e.g. indoor, outdoor), and/or a parameter indicating the supported enhanced positioning service area.

In response to the message received from the network function (e.g. the UDM/OAM), the LMC/LMF may take one or more actions. In an example action, based on the message received from the network function and/or based on local configuration, the LMC/LMF may determine at least one of: supported capability of positioning service level for the UE and/or the PLMN, supported positioning service area for the UE and/or the PLMN, and/or supported enhanced positioning service area for the UE and/or the PLMN. For example, based on the (R)AN positioning capability information of the at least one base station, the UE positioning capability information, the UE service area information, and/or the UE velocity information, the LMC/LMF may determine at least one of: supported capability of positioning service level, supported positioning service area, and/or supported enhanced positioning service area.

The definition(s) and/or the content(s) of the supported capability of positioning service level, supported positioning service area, and/or supported enhanced positioning service area may be similar to the definition(s) and/or the content(s) described above with respect to FIG. 22. For brevity, further description will not be repeated here.

In an example, the (R)AN positioning capability information of the at least one base station may indicate that the (R)AN supports ECID (capability and/or positioning method), the UE positioning capability information may indicate that the UE supports ECID (capability and/or positioning method) and/or OTDOA (capability and/or positioning method), the UE service area information may indicate UE is in an indoor area, the UE velocity information may indicate the speed of UE is 30 km/h, based on above information, the GMLC may determine at least one of: a supported capability of positioning service level 1 for the UE and/or the PLMN; a supported positioning service area where UE may have a speed up to 30 km/h for indoor environment, and up to 250 km/h for outdoor (rural and urban) environment; and/or a supported enhanced positioning service area where UE may have a speed up to 30 km/h for indoor environment.

In an example, the (R)AN positioning capability information of the at least one base station may indicate that the (R)AN supports ECID and/or OTDOA, the UE positioning capability information may indicate that the UE supports ECID, OTDOA, WLAN positioning, and/or Bluetooth positioning, the UE service area information may indicate UE is in an outdoor area, the UE velocity information may indicate the speed of UE is 300 km/h, based on above information, the GMLC may determine at least one of: a supported capability of positioning service level 2 for the UE and/or the PLMN; a supported positioning service area where UE may have a speed up to 500 km/h for outdoor environment.

In an example, the (R)AN positioning capability information of the at least one base station may indicate that the (R)AN supports ECID and/or OTDOA, the UE positioning capability information may indicate that the UE supports ECID, OTDOA, WLAN positioning, and/or high accuracy (HA) GNSS (e.g. Real-time kinematic (RTK) positioning), the UE service area information may indicate UE is in an indoor area, the UE velocity information may indicate the speed of UE is 30 km/h, based on above information, the GMLC may determine at least one of: a supported capability of positioning service level 7 for the UE and/or the PLMN; a supported positioning service area where UE may have a speed up to 30 km/h for indoor and outdoor environment; and/or a supported enhanced positioning service area where UE may have a speed up to 30 km/h for indoor and outdoor environment.

In an example action, in response to the message received from the AMF, the LMC/LMF may send to the AMF a response message (e.g. Positioning Capability Response). The Positioning Capability Response message may comprise the supported capability of positioning service level, supported positioning service area, and/or supported enhanced positioning service area.

In response to the message received from the AMF, and/or in response to the message received from the GMLC, the AMF may send to the GMLC a response message (e.g. Positioning Capability Response). The Positioning Capability Response message may comprise the supported capability of positioning service level, supported positioning service area, and/or supported enhanced positioning service area. In response to the message received from the AMF, and/or in response to the message received from the LCS client, the GMLC may send to the LCS client a response message (e.g. Positioning Capability Response). The Positioning Capability Response message may comprise the supported capability of positioning service level, supported positioning service area, and/or supported enhanced positioning service area.

In response to the message received from the GMLC, the LCS client may take one or more actions. In an example action, based on the supported capability of positioning service level, supported positioning service area, and/or supported enhanced positioning service area, the LCS client may determine one or more requested parameters for a positioning request message. For example, the determined one or more requested parameters may equal to the supported capability of positioning service level, the supported positioning service area, and/or the supported enhanced positioning service area. For example, the determined one or more requested parameters may different from (e.g. less than) the supported capability of positioning service level, the supported positioning service area, and/or the supported enhanced positioning service area. For example, the determined one or more requested parameters may comprise at least one of: a requested positioning service level, a requested positioning service area, a requested enhanced positioning service area, a requested horizontal positioning accuracy, a requested vertical positioning accuracy, and/or a requested QoS. In an example action, the LCS client may send to the GMLC a message (e.g. positioning request message). The positioning request message may indicate requesting positioning information of the UE. The positioning request message may comprise the determined one or more requested parameters.

Figure 30:
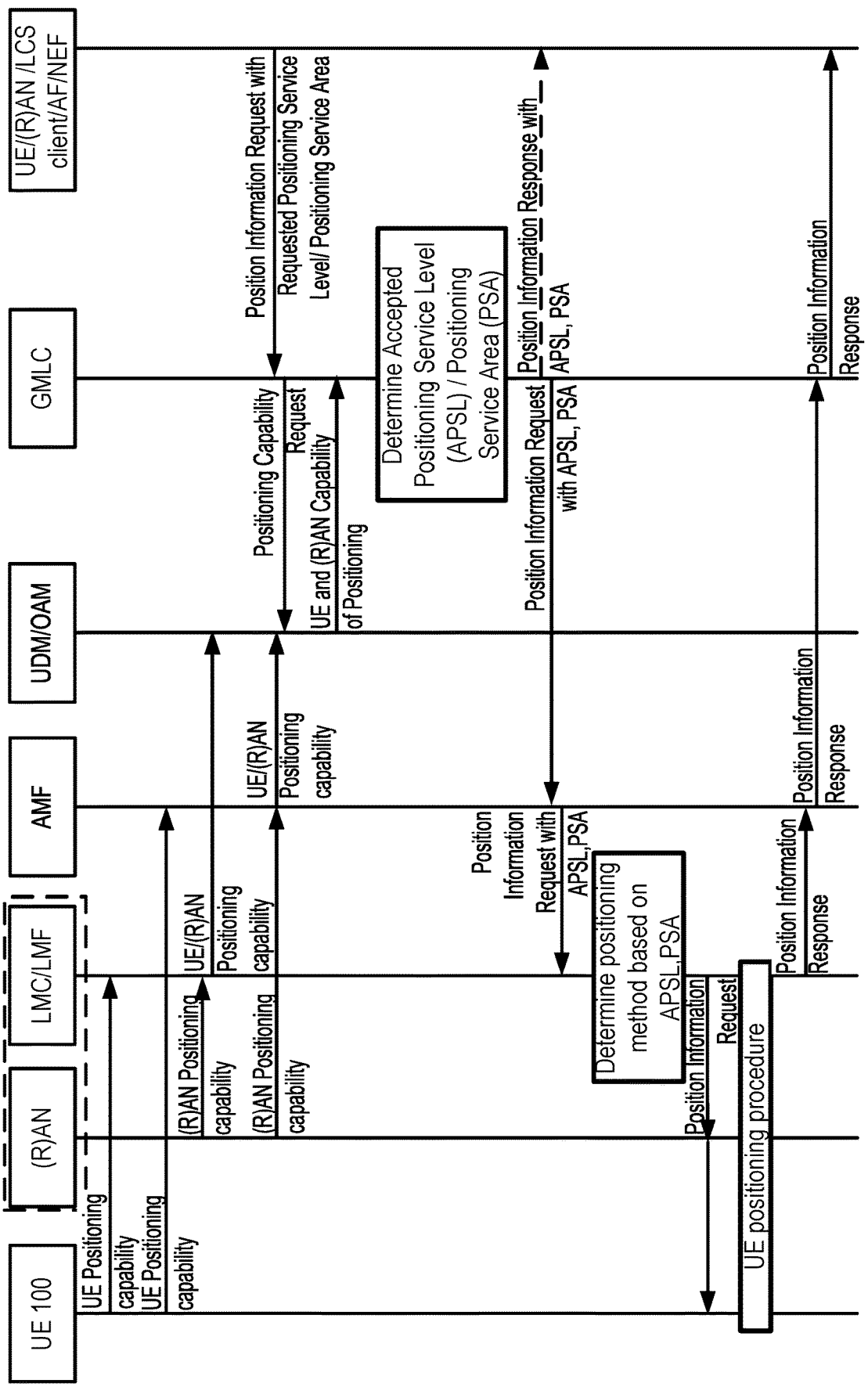
FIG. 30 is an example call flow as per an aspect of an embodiment of the present disclosure.

FIG. 30 shows an example call flow which may comprise one or more actions. In an example, a UE may send a message (e.g. a LPP message, for example, a ProvideCapabilities message)) to an LMC/LMF, the ProvideCapabilities message may comprise at least one of: UE positioning capability information, UE service area information, and/or UE velocity information. These processes may be similar to the processes described above with respect to FIG. 22. For brevity, further description will not be repeated here. As shown in FIG. 30, a dot line box may comprise the LMC/LMF and a (R)AN, where the (R)AN is serving for the UE.

The dot line box may indicate that the LMC/LMF may be co-located with the (R)AN. The dot line box may indicate that the LMC/LMF may not be co-located with the (R)AN (e.g. the LMC/LMF may be deployed separately from the (R)AN).

In response to the message received from the UE, the LMC/LMF may send a message (e.g. UE capability notification) to a network function (e.g. a UDM, OAM), the UE capability notification message may comprise one or more parameters of the ProvideCapabilities message (e.g. UE positioning capability information, UE service area information, and/or UE velocity information).

In an example, the UE may send a message (e.g. a NAS message, for example, a REGISTRATION REQUEST message)) to an AMF, the REGISTRATION REQUEST message may comprise at least one of: UE positioning capability information, UE service area information, and/or UE velocity information. In response to the message received from the UE, the AMF may send a message (e.g. UE capability notification) to a network function (e.g. a UDM, OAM), the UE capability notification message may comprise one or more parameters of the REGISTRATION REQUEST message (e.g. UE positioning capability information, UE service area information, and/or UE velocity information).

In an example, a (R)AN may send to the LMC/LMF a message (e.g. a NRPPa message, for example, a Positioning Capability Report message), the Positioning Capability Report message may comprise at least one of: (R)AN positioning capability information, UE positioning capability information, UE service area information, and/or UE velocity information. These processes may be similar to the processes described above with respect to FIG. 22. For brevity, further description will not be repeated here.

In response to the message received from the (R)AN, the LMC/LMF may send a message (e.g. (R)AN capability notification) to a network function (e.g. a UDM, OAM), the (R)AN capability notification message may comprise one or more parameters of the Positioning Capability Report message (e.g. (R)AN positioning capability information, UE positioning capability information, UE service area information, and/or UE velocity information). In an example, the LMC/LMF may receive (R)AN positioning capability information of one or more base stations from the one or more base stations in a registration area of the wireless device. The LMC/LMF may send the (R)AN positioning capability information of one or more base stations to the network function.

In an example, a (R)AN may send to the AMF a message (e.g. an N2 message), the N2 message may comprise at least one of: N2 parameters, a Registration Request message, (R)AN positioning capability information, UE positioning capability information, UE service area information, and/or UE velocity information. For example, the N2 parameters may comprise a selected PLMN ID (or PLMN ID and NID), Location Information and Cell Identity related to the cell in which the UE is camping, UE Context Request which may indicate that a UE context including security information needs to be setup at the NG-RAN. For example, the N2 parameters may comprise an Establishment cause, a CAG Identifier if the UE is accessing the NG-RAN using a CAG cell and IAB-Indication if the indication is received in AN parameters from the UE. For example, the Registration Request message may comprise at least one of: a Registration type, a UE identity (e.g. SUCI, 5G-GUTI or PEI), last visited TAI (if available), Security parameters, Requested NSSAI, Mapping Of Requested NSSAI, Default Configured NSSAI Indication, UE Radio Capability Update, UE MM Core Network Capability, PDU Session status, List Of PDU Sessions To Be Activated, Follow-on request, MICO mode preference, Requested Active Time, Requested DRX parameters, extended idle mode DRX parameters, LADN DNN(s) or Indicator Of Requesting LADN Information, NAS message container, Support for restriction of use of Enhanced Coverage, Preferred Network Behaviour, UE Policy Container (e.g. list of PSIs, indication of UE support for ANDSP and the operating system identifier) and/or UE Radio Capability ID.

In response to the message received from the (R)AN, the AMF may send a message (e.g. (R)AN capability notification) to a network function (e.g. a UDM, OAM), the (R)AN capability notification message may comprise one or more parameters of the N2 message (e.g. (R)AN positioning capability information, UE positioning capability information, UE service area information, and/or UE velocity information). In an example, the AMF may receive (R)AN positioning capability information of one or more base stations from the one or more base stations in a registration area of the wireless device. The AMF may send the (R)AN positioning capability information of the one or more base stations to the network function.

In an example, a gateway mobile location center (GMLC) may receive a message (e.g. Positioning Information Request) from a network function and/or a UE. The network function may be a location services (LCS) client, an NEF, an AF, and/or a (R)AN. The Positioning Information Request message may indicate requesting/querying positioning information of the UE (e.g., the UE illustrated in the figure). The Positioning Information Request message may comprise one or more information elements/parameters. For example, the Positioning Information Request message may comprise one or more positioning information request parameters indicating one or more of the following: a UE identity of the UE for which position information is requested (e.g. GPSI and/or SUPI), a parameter indicating whether the request is assured, a parameter indicating requested positioning service level, a parameter indicating requested positioning service area, a parameter indicating requested enhanced positioning service area, a required QoS, Supported GAD shapes, and/or an LCS client type. The parameter indicating whether the request is assured may comprise a least one value: assured, or not assured. The value assured may indicate that the requested parameters (e.g. requested positioning service level) in the message should be guaranteed, e.g., the GMLC may reject the request if the GMLC cannot guaranteed the request. The value not assured may indicate that the requested parameters (e.g. requested positioning service level) in the message may not be guaranteed, e.g., the GMLC may provide a different parameters compare to the requested parameters. The requested positioning service level may indicate a positioning service level expected by the network function and/or the UE. The requested positioning service area may indicate a positioning service area expected by the network function and/or the UE. The requested enhanced positioning service area may indicate an enhanced positioning service area expected by the network function and/or the UE.

In an example, the requested capability of positioning service level may indicate a requested positioning service level. In an example, the requested capability of positioning service level may comprise at least one of: a parameter indicating requested positioning service level number (e.g. 1, 2, . . . 7); a parameter indicating an requested absolute or relative positioning; a parameter indicating a requested horizontal accuracy; a parameter indicating a requested vertical accuracy; a parameter indicating a requested positioning service availability; a parameter indicating a requested positioning service latency; a parameter indicating a requested 5G positioning service area; and/or a parameter indicating a requested 5G enhanced positioning service area. In an example, the requested positioning service area may indicate coverage, environment of use and/or UE velocity. For example, the requested positioning service area may indicate requested indoor and/or outdoor coverage. For example, the requested positioning service area may indicate requested UE speed in the indoor and/or outdoor coverage. For example, the requested enhanced positioning service area may indicate supported indoor and/or outdoor coverage. For example, the requested enhanced positioning service area may indicate requested UE speed in the indoor and/or outdoor coverage. FIG. 21 shows example definition of requested capability of positioning service level, requested positioning service area, and/or requested enhanced positioning service area. In FIG. 21, Positioning service level is an example of requested capability of positioning service level, 5G positioning service area is an example of requested positioning service area, 5G enhanced positioning service area is an example of requested enhanced positioning service area. In an example, the required QoS may comprise at least one of: accuracy of the positioning, response time for the positioning request, LCS QoS class. In an example, the LCS client type may comprise at least one of: emergency services, value added services, PLMN operator services, and/or lawful intercept services.

In response to the message received, the GMLC may send a message (e.g. Nudm_UECM_Get Request, Positioning Capability Query) to a network function. The network function may be an AMF, a UDM, and/or an OAM. For example, the GMLC may send a Nudm_UECM_Get Request message to a (home) UDM of the UE. The Nudm_UECM_Get Request message may comprise the one or more information elements/parameters of the Positioning Information Request message described above, for example, the UE identity. In an example, the Nudm_UECM_Get Request message may comprise a parameter indicating requesting/querying (R)AN positioning capability. In an example, the Nudm_UECM_Get Request message may comprise a parameter indicating requesting/querying UE positioning capability.

In response to the message received from the GMLC, the UDM may send a response message (e.g. Nudm_UECM_Get Response) to the GMLC, the Nudm_UECM_Get Response message may comprise at least one of: (R)AN positioning capability information of the at least one base station, UE positioning capability information, UE service area information, and/or UE velocity information. In an example, based on local configuration, the Nudm_UECM_Get Response message may comprise at least one of: a parameter indicating supported positioning service level for the UE and/or PLMN; a parameter indicating supported positioning service area, and/or a parameter indicating the supported enhanced positioning service area.

In response to the message received from the UDM, the GMLC may take one or more actions. In an example action, based on the message received from the LCS client and/or the message received from the UDM, the GMLC may determine at least one of: accepted positioning service level for the UE and/or the PLMN, accepted positioning service area for the UE and/or the PLMN, and/or accepted enhanced positioning service area for the UE and/or the PLMN. For example, based on the requested positioning service level, the requested positioning service area, the requested enhanced positioning service area, the required QoS, (R)AN positioning capability information of the at least one base station, the UE positioning capability information, the UE service area information, and/or the UE velocity information, the GMLC may determine at least one of: accepted/supported positioning service level, accepted/supported positioning service area, and/or accepted/supported enhanced positioning service area.

In an example, the accepted/supported positioning service level may indicate an accepted/supported positioning service level. In an example, the accepted/supported positioning service level may comprise at least one of: a parameter indicating accepted/supported service level number (e.g. 1, 2, . . . 7); a parameter indicating an accepted/supported absolute or relative positioning; a parameter indicating an accepted/supported horizontal accuracy; a parameter indicating an accepted/supported vertical accuracy; a parameter indicating an accepted/supported positioning service availability; a parameter indicating an accepted/supported positioning service latency; a parameter indicating an accepted/supported 5G positioning service area; and/or a parameter indicating an accepted/supported 5G enhanced positioning service area. In an example, the accepted/supported positioning service area may indicate coverage, environment of use and/or UE velocity. For example, the accepted/supported positioning service area may indicate supported indoor and/or outdoor coverage. For example, the accepted/supported positioning service area may indicate supported UE speed in the indoor and/or outdoor coverage. For example, the accepted/supported enhanced positioning service area may indicate supported indoor and/or outdoor coverage. For example, the accepted/supported enhanced positioning service area may indicate supported UE speed in the indoor and/or outdoor coverage. In an example, the accepted/supported positioning service level may be used independently. In an example, the accepted/supported positioning service level may be used with the accepted/supported positioning service area and/or the accepted/supported enhanced positioning service area together.

FIG. 21 shows example of accepted/supported positioning service level, supported positioning service area, and/or supported enhanced positioning service area. In FIG. 21, Positioning service level is an example of accepted/supported capability of positioning service level, 5G positioning service area is an example of accepted/supported positioning service area, 5G enhanced positioning service area is an example of accepted/supported enhanced positioning service area.

In an example, the requested positioning service level may indicate a requested service level (number) 2 and/or a requested horizontal accuracy of 3 meters, the requested positioning service area may indicate an outdoor environment with a UE speed of 500 km/h, the requested enhanced positioning service area may indicate an indoor environment with a UE speed of 30 km/h, the (R)AN positioning capability information of the at least one base station may indicate that the (R)AN supports ECID (capability and/or positioning method), the UE positioning capability information may indicate that the UE supports ECID (capability and/or positioning method) and/or OTDOA (capability and/or positioning method), the UE service area information may indicate UE is in an indoor area, the UE velocity information may indicate the speed of UE is 30 km/h, based on above information, the GMLC may determine at least one of: an accepted/supported positioning service level (number) 1 for the UE and/or the PLMN; an accepted/supported positioning service area where UE may have a speed up to 30 km/h for indoor environment, and up to 250 km/h for outdoor (rural and urban) environment; and/or an accepted/supported enhanced positioning service area where UE may have a speed up to 30 km/h for indoor environment. As shown in FIG. 21, the an accepted/supported positioning service level 1 may have a horizontal accuracy of 10 meters.

In an example, the requested positioning service level may indicate a requested service level (number) 2 and/or a requested horizontal accuracy of 3 meters, the requested positioning service area may indicate an outdoor environment with a UE speed of 500 km/h, the (R)AN positioning capability information of the at least one base station may indicate that the (R)AN supports ECID and/or OTDOA, the UE positioning capability information may indicate that the UE supports ECID, OTDOA, WLAN positioning, and/or Bluetooth positioning, the UE service area information may indicate UE is in an outdoor area, the UE velocity information may indicate the speed of UE is 300 km/h, based on above information, the GMLC may determine at least one of: an accepted/supported positioning service level 2 for the UE and/or the PLMN; an accepted/supported positioning service area where UE may have a speed up to 500 km/h for outdoor environment. As shown in FIG. 21, the accepted/supported positioning service level 2 may have a horizontal accuracy of 3 meters and a vertical accuracy of 3 meters.

In an example, the requested positioning service level may indicate a requested service level (number) 7 and/or a requested vertical accuracy of 0.2 meters, the requested positioning service area may indicate an outdoor environment with a UE speed of 30 km/h, the requested enhanced positioning service area may indicate an indoor environment with a UE speed of 30 km/h, the (R)AN positioning capability information of the at least one base station may indicate that the (R)AN supports ECID and/or OTDOA, the UE positioning capability information may indicate that the UE supports ECID, OTDOA, WLAN positioning, and/or high accuracy (HA) GNSS (e.g. Real-time kinematic (RTK) positioning), the UE service area information may indicate UE is in an indoor area, the UE velocity information may indicate the speed of UE is 30 km/h, based on above information, the GMLC may determine at least one of: an accepted/supported positioning service level 7 for the UE and/or the PLMN; an accepted/supported positioning service area where UE may have a speed up to 30 km/h for indoor and outdoor environment; and/or an accepted/supported enhanced positioning service area where UE may have a speed up to 30 km/h for indoor and outdoor environment. As shown in FIG. 21, the supported capability of positioning service level 7 may have a horizontal accuracy of 0.2 meters and a vertical accuracy of 0.2 meters.

In an example action, in response to the message received from the LCS client, the GMLC may send to the LCS client a response message (e.g. Positioning Information Response). The Positioning Information Response message may comprise a cause value indicating whether the requested positioning service level is accepted or not. The Positioning Information Response message may comprise the accepted/supported positioning service level, the accepted/supported positioning service area, and/or the accepted/supported enhanced positioning service area. In response to the message received from the GMLC, based on the accepted/supported positioning service level, accepted/supported positioning service area, and/or accepted/supported enhanced positioning service area, the LCS client may determine one or more requested parameters for a positioning request message. For example, the determined one or more requested parameters may equal to the supported capability of positioning service level, the supported positioning service area, and/or the supported enhanced positioning service area. For example, the determined one or more requested parameters may different from (e.g. less than) the supported capability of positioning service level, the supported positioning service area, and/or the supported enhanced positioning service area. For example, the determined one or more requested parameters may comprise at least one of: a requested positioning service level, a requested positioning service area, a requested enhanced positioning service area, a requested horizontal positioning accuracy, a requested vertical positioning accuracy, and/or a requested QoS. In an example action, the LCS client may send to the GMLC a message (e.g. positioning request message). The positioning request message may indicate requesting positioning information of the UE. The positioning request message may comprise the determined one or more requested parameters.

In an example action, in response to the message received from the LCS client and/or in response to the determining, the GMLC may send a message (e.g. Positioning Information Request) to the AMF, the Positioning Information Request may comprise at least one of: the UE identity, the required QoS, the Supported GAD shapes, the LCS client type, the accepted/supported positioning service level, the accepted/supported positioning service area, and/or the accepted/supported enhanced positioning service area. In response to the message received from the GMLC, the AMF may send a message (e.g. Positioning Information Request) to the LMC/LMF, the message may comprise one or more information elements/parameters received from the GMLC (e.g. received by the Positioning Information Request message).

In response to the message received from the AMF, the LMC/LMF may take one or more actions. In an example action, based on the one or more information elements/parameters received from the AMF, the (R)AN positioning capability, the UE positioning capability, the UE service area information, and/or the UE velocity information, the LMC/LMF may determine one or more positioning methods for the positioning request. For example, based on the accepted/supported positioning service level, the accepted/supported positioning service area, the accepted/supported enhanced positioning service area, the required QoS, the (R)AN positioning capability, the UE positioning capability, the UE service area information, and/or the UE velocity information, the LMC/LMF may determine one or more positioning methods for the positioning request.

In an example, the accepted/supported positioning service level may indicate a accepted/supported service level (number) 1 and/or a accepted/supported horizontal accuracy of 10 meters, the accepted/supported positioning service area may indicate an outdoor environment with a UE speed of 250 km/h, the requested enhanced positioning service area may indicate an indoor environment with a UE speed of 30 km/h, the (R)AN positioning capability information of the at least one base station may indicate that the (R)AN supports ECID (capability and/or positioning method), the UE positioning capability information may indicate that the UE supports ECID (capability and/or positioning method) and/or OTDOA (capability and/or positioning method), the UE service area information may indicate UE is in an indoor area, the UE velocity information may indicate the speed of UE is 30 km/h, and/or the required QoS may indicate a vertical accuracy 3 meters, based on above information, the LMC/LMF may determine a positioning method of ECID.

In an example, the accepted/supported positioning service level may indicate a accepted/supported service level (number) 7 and/or a accepted/supported vertical accuracy of 0.2 meters, the accepted/supported positioning service area may indicate an outdoor environment with a UE speed of 30 km/h, the accepted/supported enhanced positioning service area may indicate an indoor environment with a UE speed of 30 km/h, the (R)AN positioning capability information of the at least one base station may indicate that the (R)AN supports ECID and/or OTDOA, the UE positioning capability information may indicate that the UE supports ECID, OTDOA, WLAN positioning, and/or high accuracy (HA) GNSS (e.g. Real-time kinematic (RTK) positioning), the UE service area information may indicate UE is in an indoor area, the UE velocity information may indicate the speed of UE is 30 km/h, and/or the required QoS may indicate a horizontal accuracy 0.3 meters, based on above information, the LMC/LMF may determine that a combination of more than one positioning method may meet the requested positioning accuracy, for example, the LMC/LMF may determine the OTDOA positioning method and/or the HA GNSS positioning method.

In response to the determining, the LMC/LMF may send a message (e.g. Positioning Information Request) to the UE. For example, LPP may be used for the positioning signaling between an LMC/LMF and the UE. The Positioning Information Request message may comprise at least one information element/parameter: the determined one or more positioning methods, the UE identity, the required QoS, the Supported GAD shapes, and/or the LCS client type. In an example, the LMC/LMF may send a message (e.g. Positioning Information Request) to the (R)AN comprising the at least one information element/parameter.

In response to the message received from the LMC/LMF, the UE and/or the (R)AN may perform positioning measurement, and report the measurement results to the LMC/LMF, the LMC/LMF may determine UE positioning information based on the measurement results. The LMC/LMF may send to the AMF a response message (e.g. Positioning Information Response) comprising the UE positioning information. The AMF may send to the GMLC a response message (e.g. Positioning Information Response) comprising the UE positioning information. The GMLC may send to the LCS client a response message (e.g. Positioning Information Response) comprising the UE positioning information.

Figure 31:
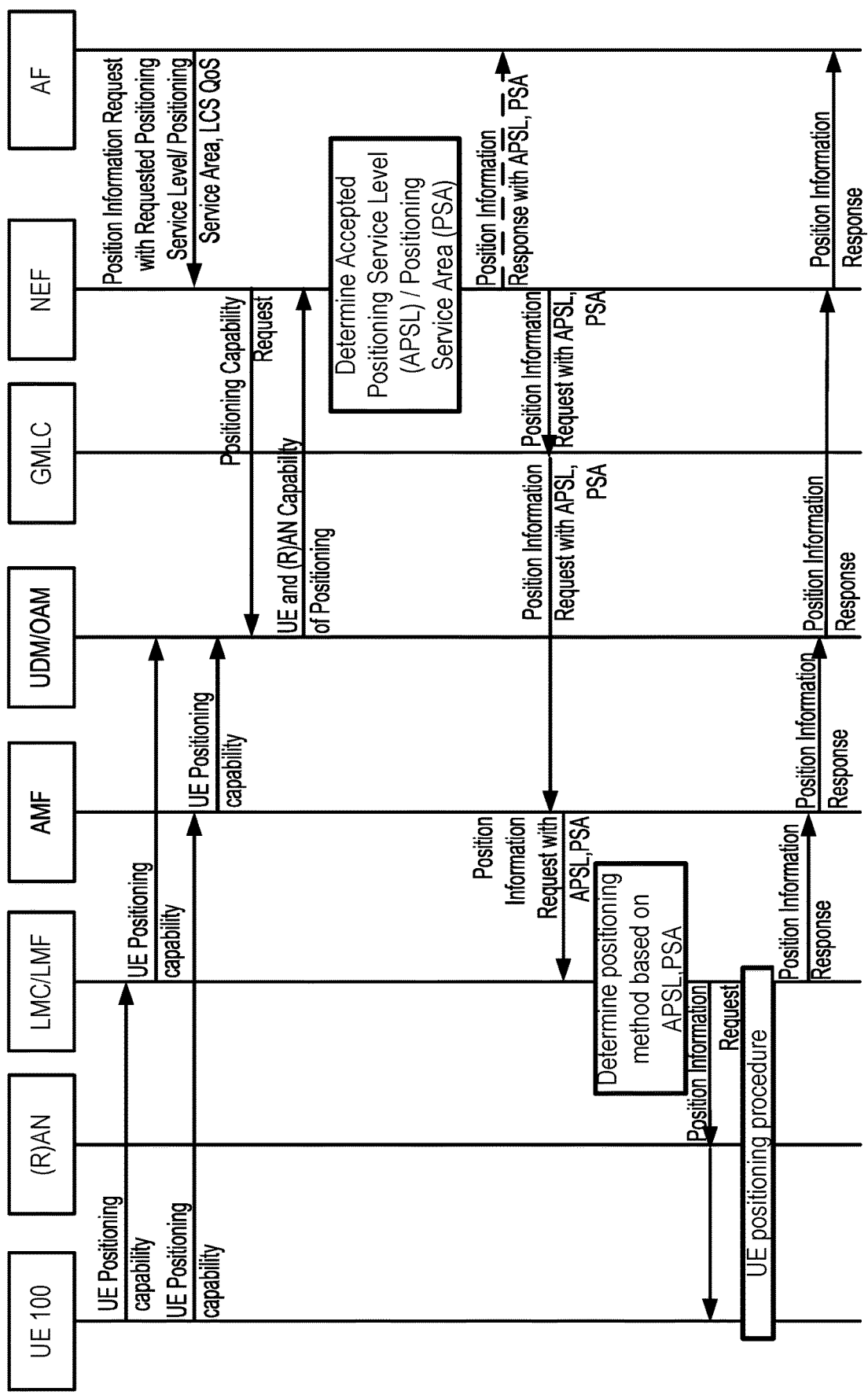
FIG. 31 is an example call flow as per an aspect of an embodiment of the present disclosure.

FIG. 31 shows an example call flow which may comprise one or more actions. In an example, a UE may send a message (e.g. a LPP message, for example, a ProvideCapabilities message)) to an LMC/LMF, the ProvideCapabilities message may comprise at least one of: UE positioning capability information, UE service area information, and/or UE velocity information. These processes may be similar to the processes described above with respect to FIG. 22. For brevity, further description will not be repeated here.

In response to the message received from the UE, the LMC/LMF may send a message (e.g. UE capability notification) to a network function (e.g. a UDM, OAM), the UE capability notification message may comprise one or more parameters of the ProvideCapabilities message (e.g. UE positioning capability information, UE service area information, and/or UE velocity information).

In an example, the UE may send a message (e.g. a NAS message, for example, a REGISTRATION REQUEST message)) to an AMF, the REGISTRATION REQUEST message may comprise at least one of: UE positioning capability information, UE service area information, and/or UE velocity information. In response to the message received from the UE, the AMF may send a message (e.g. UE capability notification) to a network function (e.g. a UDM, OAM), the UE capability notification message may comprise one or more parameters of the REGISTRATION REQUEST message (e.g. UE positioning capability information, UE service area information, and/or UE velocity information).

In an example, a (R)AN may send to the LMC/LMF a message (e.g. a NRPPa message, for example, a Positioning Capability Report message), the Positioning Capability Report message may comprise at least one of: (R)AN positioning capability information, UE positioning capability information, UE service area information, and/or UE velocity information. These processes may be similar to the processes described above with respect to FIG. 22. For brevity, further description will not be repeated here.

In response to the message received from the (R)AN, the LMC/LMF may send a message (e.g. (R)AN capability notification) to a network function (e.g. a UDM, OAM), the (R)AN capability notification message may comprise one or more parameters of the Positioning Capability Report message (e.g. (R)AN positioning capability information, UE positioning capability information, UE service area information, and/or UE velocity information). In an example, the LMC/LMF may receive (R)AN positioning capability information of one or more base stations from the one or more base stations in a registration area of the wireless device. The LMC/LMF may send the (R)AN positioning capability information of one or more base stations to the network function.

In an example, a (R)AN may send to the AMF a message (e.g. an N2 message), the N2 message may comprise at least one of: N2 parameters, a Registration Request message, (R)AN positioning capability information, UE positioning capability information, UE service area information, and/or UE velocity information. These processes may be similar to the processes described above with respect to FIG. 30. For brevity, further description will not be repeated here.

In response to the message received from the (R)AN, the AMF may send a message (e.g. (R)AN capability notification) to a network function (e.g. a UDM, OAM), the (R)AN capability notification message may comprise one or more parameters of the N2 message (e.g. (R)AN positioning capability information, UE positioning capability information, UE service area information, and/or UE velocity information). In an example, the AMF may receive (R)AN positioning capability information of one or more base stations from the one or more base stations in a registration area of the wireless device. The AMF may send the (R)AN positioning capability information of the one or more base stations to the network function.

In an example, a NEF may receive a message (e.g. Positioning Information Request) from an AF. The Positioning Information Request message may indicate requesting/querying positioning information of the UE (e.g., the UE illustrated in the figure). The Positioning Information Request message may comprise one or more information elements/parameters. For example, the Positioning Information Request message may comprise one or more positioning information request parameters indicating one or more of the following: a UE identity of the UE for which position information is requested (e.g. GPSI and/or SUPI), a parameter indicating requested positioning service level, a parameter indicating requested positioning service area, a parameter indicating requested enhanced positioning service area, a required QoS, Supported GAD shapes, and/or an LCS client type. The requested positioning service level may indicate a positioning service level expected by the network function and/or the UE. The requested positioning service area may indicate a positioning service area expected by the network function and/or the UE. The requested enhanced positioning service area may indicate an enhanced positioning service area expected by the network function and/or the UE.

In an example, the requested capability of positioning service level may indicate a requested positioning service level. In an example, the requested capability of positioning service level may comprise at least one parameter as described above with respect to FIG. 30. For brevity, further description will not be repeated here.

In response to the message received, the NEF may send a message (e.g. Nudm_UECM_Get Request, Positioning Capability Query) to a network function. The network function may be an AMF, a UDM, and/or an OAM. For example, the NEF may send a Nudm_UECM_Get Request message to a (home) UDM of the UE. The Nudm_UECM_Get Request message may comprise the one or more information elements/parameters of the Positioning Information Request message described above, for example, the UE identity. In an example, the Nudm_UECM_Get Request message may comprise a parameter indicating requesting/querying (R)AN positioning capability. In an example, the Nudm_UECM_Get Request message may comprise a parameter indicating requesting/querying UE positioning capability.

In response to the message received from the GMLC, the UDM may send a response message (e.g. Nudm_UECM_Get Response) to the GMLC, the Nudm_UECM_Get Response message may comprise at least one of: (R)AN positioning capability information of the at least one base station, UE positioning capability information, UE service area information, and/or UE velocity information. In an example, based on local configuration, the Nudm_UECM_Get Response message may comprise at least one of: a parameter indicating supported positioning service level for the UE and/or PLMN; a parameter indicating supported positioning service area, and/or a parameter indicating the supported enhanced positioning service area.

In response to the message received from the UDM, the NEF may take one or more actions. In an example action, based on the message received from the AF and/or the message received from the UDM, the NEF may determine at least one of: accepted positioning service level for the UE and/or the PLMN, accepted positioning service area for the UE and/or the PLMN, and/or accepted enhanced positioning service area for the UE and/or the PLMN. For example, based on the requested positioning service level, the requested positioning service area, the requested enhanced positioning service area, the required QoS, (R)AN positioning capability information of the at least one base station, the UE positioning capability information, the UE service area information, and/or the UE velocity information, the NEF may determine at least one of: accepted/supported positioning service level, accepted/supported positioning service area, and/or accepted/supported enhanced positioning service area. These processes may be similar to the processes of GMLC described above with respect to FIG. 30. For brevity, further description will not be repeated here.

In an example action, in response to the message received from the AF, the NEF may send to the AF a response message (e.g. Positioning Information Response). The Positioning Information Response message may comprise the accepted/supported positioning service level, the accepted/supported positioning service area, and/or the accepted/supported enhanced positioning service area. In response to the message received from the NEF, based on the accepted/supported positioning service level, accepted/supported positioning service area, and/or accepted/supported enhanced positioning service area, the AF may determine one or more requested parameters for a positioning request message. For example, the determined one or more requested parameters may equal to the supported capability of positioning service level, the supported positioning service area, and/or the supported enhanced positioning service area. For example, the determined one or more requested parameters may different from (e.g. less than) the supported capability of positioning service level, the supported positioning service area, and/or the supported enhanced positioning service area. For example, the determined one or more requested parameters may comprise at least one of: a requested positioning service level, a requested positioning service area, a requested enhanced positioning service area, a requested horizontal positioning accuracy, a requested vertical positioning accuracy, and/or a requested QoS. In an example action, the AF may send to the NEF a message (e.g. positioning request message). The positioning request message may indicate requesting positioning information of the UE. The positioning request message may comprise the determined one or more requested parameters.

In an example action, in response to the message received from the AF and/or in response to the determining, the NEF may send a message (e.g. Positioning Information Request) to the GMLC, the Positioning Information Request may comprise at least one of: the UE identity, the required QoS, the Supported GAD shapes, the LCS client type, the accepted/supported positioning service level, the accepted/supported positioning service area, and/or the accepted/supported enhanced positioning service area. In response to the message received from the NEF, the GMLC may send to the AMF a message (e.g. Positioning Information Request) comprising one or more information elements/parameters received from the NEF. In response to the message received from the GMLC, the AMF may send a message (e.g. Positioning Information Request) to the LMC/LMF, the message may comprise one or more information elements/parameters received from the GMLC (e.g. received by the Positioning Information Request message).

In response to the message received from the AMF, the LMC/LMF may take one or more actions. In an example action, based on the one or more information elements/parameters received from the AMF, the (R)AN positioning capability, the UE positioning capability, the UE service area information, and/or the UE velocity information, the LMC/LMF may determine one or more positioning methods for the positioning request. For example, based on the accepted/supported positioning service level, the accepted/supported positioning service area, the accepted/supported enhanced positioning service area, the required QoS, the (R)AN positioning capability, the UE positioning capability, the UE service area information, and/or the UE velocity information, the LMC/LMF may determine one or more positioning methods for the positioning request. These processes may be similar to the processes described above with respect to FIG. 30. For brevity, further description will not be repeated here.

In response to the determining, the LMC/LMF may send a message (e.g. Positioning Information Request) to the UE. For example, LPP may be used for the positioning signaling between an LMC/LMF and the UE. The Positioning Information Request message may comprise at least one information element/parameter: the determined one or more positioning methods, the UE identity, the required QoS, the Supported GAD shapes, and/or the LCS client type. In an example, the LMC/LMF may send a message (e.g. Positioning Information Request) to the (R)AN comprising the at least one information element/parameter.

In response to the message received from the LMC/LMF, the UE and/or the (R)AN may perform positioning measurement, and report the measurement results to the LMC/LMF, the LMC/LMF may determine UE positioning information based on the measurement results. The LMC/LMF may send to the AMF a response message (e.g. Positioning Information Response) comprising the UE positioning information. The AMF may send to the GMLC a response message (e.g. Positioning Information Response) comprising the UE positioning information. The GMLC may send to the NEF a response message (e.g. Positioning Information Response) comprising the UE positioning information. The NEF may send to the AF a response message (e.g. Positioning Information Response) comprising the UE positioning information.

In an example, a gateway mobile location center (GMLC) may receive from a location services (LCS) client, a first message requesting capability of positioning service level for a wireless device. In an example, the GMLC may receive from a network function, a second message indicating at least one of: positioning capability of the wireless device; or positioning capability of at least one base station. In an example, the GMLC may determine the capability of positioning service level based on the second message. In an example, the GMLC may send to the LCS client, a response message to the first message, wherein the response message may comprise the capability of positioning service level.

In an example embodiment, the at least one base station may be in a registration area of the wireless device. In an example embodiment, the at least one base station may be plural base stations inside a registration area of the wireless device. In an example embodiment, the second message may further comprise service area information of the wireless device. In an example embodiment, the second message may further comprise velocity information of the wireless device. In an example embodiment, the determine may further bases on service area information of the wireless device. In an example embodiment, the determine may further base on velocity information of the wireless device. In an example embodiment, the capability of positioning service level may indicate a supported positioning service level. In an example embodiment, the capability of positioning service level may comprise a positioning service level number. In an example embodiment, the capability of positioning service level may comprise a parameter indicating an absolute or a relative positioning. In an example embodiment, the capability of positioning service level may comprise a parameter indicating a horizontal accuracy. In an example embodiment, the capability of positioning service level may comprise a parameter indicating a vertical accuracy. In an example embodiment, the capability of positioning service level may comprise a parameter indicating a positioning service availability. In an example embodiment, the capability of positioning service level may comprise a parameter indicating a positioning service latency. In an example embodiment, the capability of positioning service level may comprise a parameter indicating a 5G positioning service area. In an example embodiment, the capability of positioning service level may comprise a parameter indicating a 5G enhanced positioning service area.

In an example embodiment, the network function may comprise at least one of: an access and mobility management function (AMF); a unified data management (UDM); or an operations administration and management (OAM). In an example embodiment, the positioning capability of the wireless device positioning capability may comprise at least one of: supporting Enhanced Cell Identity (ECID) capability; supporting Observed Time Difference of Arrival (OTDOA) capability; supporting network-assisted GNSS methods; supporting WLAN positioning; supporting Bluetooth positioning; supporting Terrestrial Beacon System (TBS) positioning; supporting barometric pressure sensor positioning; or no support of a positioning capability. In an example embodiment, the positioning capability of at least one base station comprises at least one of: supporting Enhanced Cell Identity (ECID) capability; supporting Observed Time Difference of Arrival (OTDOA) capability; supporting uplink relative time of arrival; supporting uplink reference signal received power measurements; supporting uplink Angle of Arrival (UL AoA) measurements; supporting multiple RTT positioning; supporting gNB RX-TX time difference measurements; or no support of a positioning capability. In an example embodiment, the first message and the response message may further comprise an identifier of the wireless device.

In an example, an access and mobility management function (AMF) may receive from a gateway mobile location center (GMLC), a first message requesting capability of positioning service level for a public land mobile network (PLMN) and a wireless device. In an example, the AMF may receive from a network function, a second message indicating: positioning capability of the wireless device; and positioning capability of a base station, wherein the wireless device accesses the PLMN via the base station. In an example, based on the second message, the AMF may determine, the capability of positioning service level. In an example, the AMF may send to the GMLC, a response message to the first message, wherein the response message may comprise the capability of positioning service level. In an example embodiment, the network function may comprise at least one of: a location management function; a location management component; a unified data management (UDM); or an operations administration and management (OAM).

In an example, a location management component (LMC) may receive from an access and mobility management function (AMF), a first message requesting capability of positioning service level for a public land mobile network (PLMN) and a wireless device. In an example, the LMC may receive from a network function, a second message indicating: positioning capability of the wireless device; and positioning capability of a base station, wherein the wireless device accesses the PLMN via the base station. In an example, the LMC may determine the capability of positioning service level based on the second message. The LMC may send to the AMF a response message to the first message, wherein the response message may comprise the capability of positioning service level.

In an example, a gateway mobile location center (GMLC) may receive from a location services (LCS) client, a first message comprising a requested positioning service level for a wireless device. In an example, the GMLC may receive from a network function, at least one second message indicating at least one of: positioning capability of the wireless device; or positioning capability of at least one base station. In an example, the GMLC may determine an accepted positioning service level based on the at least one second message. In an example, the GMLC may send to the LCS client, a response message indicating at least one of: whether the requested positioning service level is accepted or not; or the accepted positioning service level. In an example, the determining may be further based on the first message. In an example, the GMLC may send to an access and mobility management function (AMF), a positioning request message comprising the accepted positioning service level. In an example, the first message may further comprise a parameter indicating whether the request is assured.

In an example, a location management component (LMC) may receive from an access and mobility management function (AMF), a first message comprising an accepted positioning service level for a wireless device. In an example, the LMC may receive from a network function, a second message indicating: positioning capability of the wireless device; and positioning capability of a base station, wherein the wireless device registers to the base station. In an example, based on the accepted positioning service level and the second message, the LMC may determine a positioning method for the wireless device. In an example, the LMC may send to the wireless device the positioning method.

In an example, a network exposure function (NEF) may receive from an application function (AF), a first message comprising a requested positioning service level for a wireless device. In an example, the NEF may receive from a network function, a second message indicating: positioning capability of the wireless device; and positioning capability of a base station, wherein the wireless device registers to the base station. In an example, based on the requested positioning service level and the second message, the NEF may determine an accepted positioning service level. In an example, the NEF may send to a gateway mobile location center (GMLC), a positioning request message comprising the accepted positioning service level.

According to various embodiments, one or more devices such as, for example, a wireless device, off-network wireless device, a base station, a core network device, and/or the like, may be employed in a system. One or more of the devices may be configured to perform particular operations or actions by virtue of having software, firmware, hardware, or a combination of them installed on the one or more of the devices, that in operation causes or cause the one or more devices to perform the actions. One or more computer programs can be configured to perform particular operations or actions by virtue of including instructions that, when executed by data processing apparatus, cause the apparatus to perform the actions. Embodiments of example actions are illustrated in the accompanying figures and specification. Features from various embodiments may be combined to create yet further embodiments.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various Examples. If A and B are sets and every element of A is an element of B, A is called a subset of B. In this specification, only non-empty sets and subsets are considered. For example, possible subsets of B={cell1, cell2} are: {cell1}, {cell2}, and {can, cell2}.

In this specification, various Examples are disclosed. Limitations, features, and/or elements from the disclosed example Examples may be combined to create further Examples within the scope of the disclosure.

In this specification, various Examples are disclosed. Limitations, features, and/or elements from the disclosed example Examples may be combined to create further Examples within the scope of the disclosure.

In this specification, parameters (Information elements: IEs) may comprise one or more objects, and one of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example, when one or more messages comprise a plurality of parameters, it implies that a parameter in the plurality of parameters is in at least one of the one or more messages, but does not have to be in one of the one or more messages.

Many of the elements described in the disclosed Examples may be implemented as modules. A module is defined here as an isolatable element that performs a defined function and has a defined interface to other elements. The modules described in this disclosure may be implemented in hardware, software in combination with hardware, firmware, wetware (e.g. hardware with a biological element) or a combination thereof, some of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various Examples have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative Examples. Thus, the present Examples should not be limited by any of the above described exemplary Examples. In particular, it should be noted that, for example purposes, the above explanation has focused on the example(s) using 5G AN. However, one skilled in the art will recognize that Examples of the invention may be implemented in a system comprising one or more legacy systems or LTE. The disclosed methods and systems may be implemented in wireless or wireline systems. The features of various Examples presented in this invention may be combined. One or many features (method or system) of one Example may be implemented in other Examples. A limited number of example combinations are shown to indicate to one skilled in the art the possibility of features that may be combined in various Examples to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some examples.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A gateway mobile location center (GMLC), comprising:
   one or more processors; and
   memory storing instructions that, when executed by the one or more processors, cause the GMLC to perform operations comprising:
   receiving, from a location services (LCS) client, a request for a capability of a positioning service level for a wireless device;
   receiving, from a network function, a second message indicating at least one of:
   a positioning capability of the wireless device; and
   a positioning capability of at least one base station;
   determining the capability of the positioning service level for the wireless device, based on the second message; and
   sending, by the GMLC to the LCS client, a response comprising the capability of the positioning service level, wherein the capability of the positioning service level comprises a parameter indicating an absolute or a relative positioning.

2. The GMLC of claim 1, wherein the determining the capability is based on service area information of the wireless device or is based on velocity information of the wireless device or is based on both the service area information of the wireless device and the velocity information of the wireless device.

3. A method comprising:
   receiving, by a gateway mobile location center (GMLC) from a location services (LCS) client, a request for a capability of a positioning service level for a wireless device;
   receiving, by the GMLC from a network function, a second message indicating at least one of:
   a positioning capability of the wireless device; and
   a positioning capability of at least one base station;
   determining the capability of the positioning service level for the wireless device, based on the second message; and
   sending, by the GMLC to the LCS client after receiving the second message, a response comprising the capability of the positioning service level, wherein the capability of the positioning service level comprises a parameter indicating a horizontal accuracy or a vertical accuracy, or both the horizontal accuracy and the vertical accuracy.

4. The method of claim 3, wherein the at least one base station is in a registration area of the wireless device.

5. The method of claim 4, wherein the at least one base station comprises a plurality of base stations in the registration area of the wireless device.

6. The method of claim 3, wherein the second message further comprises service area information of the wireless device.

7. The method of claim 3, wherein the second message further comprises velocity information of the wireless device.

8. The method of claim 3, wherein the capability of the positioning service level indicates a supported positioning service level or a positioning service level number, or both the supported positioning service level and the positioning service level number.

9. The method of claim 3, wherein the parameter indicates an absolute or a relative positioning.

10. The method of claim 3, wherein the capability of the positioning service level comprises a parameter indicating a positioning service availability or a positioning service latency, or both the positioning service availability and the positioning service latency.

11. The method of claim 3, wherein the capability of the positioning service level comprises a parameter indicating a 5G positioning service area or a 5G enhanced positioning service area, or both the 5G positioning service area and the 5G enhanced positioning service area.

12. The method of claim 3, wherein the request for the capability of the positioning service level for the wireless device and the response comprise an identifier of the wireless device.

13. A gateway mobile location center (GMLC), comprising:
    one or more processors; and
    memory storing instructions that, when executed by the one or more processors, cause the GMLC to:
    receiving, from a location services (LCS) client, a request for a capability of a positioning service level for a wireless device;
    receiving, from a network function, a second message indicating at least one of:
    a positioning capability of the wireless device; and
    a positioning capability of at least one base station;
    determining the capability of the positioning service level for the wireless device, based on the second message; and
    sending, by the GMLC to the LCS client after receiving the second message, a response comprising the capability of the positioning service level, wherein the capability of the positioning service level comprises a parameter indicating a horizontal accuracy or a vertical accuracy, or both the horizontal accuracy and the vertical accuracy.

14. The GMLC of claim 13, wherein the second message further comprises service area information of the wireless device.

15. The GMLC of claim 13, wherein the second message further comprises velocity information of the wireless device.

16. The GMLC of claim 13, wherein the capability of the positioning service level indicates a supported positioning service level or a positioning service level number, or both.

17. The GMLC of claim 13, wherein the parameter indicates an absolute or a relative positioning.

18. The GMLC of claim 13, wherein the capability of the positioning service level comprises a parameter indicating a positioning service availability or a positioning service latency, or both.

19. The GMLC of claim 13, wherein the capability of the positioning service level comprises a parameter indicating a 5G positioning service area or a 5G enhanced positioning service area, or both.

20. The GMLC of claim 13, wherein the request for the capability of the positioning service level for the wireless device and the response comprise an identifier of the wireless device.

* * * * *